United States Patent
Zhang et al.

(10) Patent No.: US 12,388,516 B2
(45) Date of Patent: Aug. 12, 2025

(54) ORBITAL ANGULAR MOMENTUM MULTIPLEXING BASED ON A COMMON FACTOR BETWEEN QUANTITIES OF TRANSMIT AND RECEIVE ANTENNA SUBARRAYS

(71) Applicant: QUALCOMM Incorporated, San Diego, CA (US)

(72) Inventors: Danlu Zhang, San Diego, CA (US); Naga Bhushan, San Diego, CA (US); Thomas Joseph Richardson, South Orange, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 533 days.

(21) Appl. No.: 17/950,899

(22) Filed: Sep. 22, 2022

(65) Prior Publication Data
US 2024/0106516 A1    Mar. 28, 2024

(51) Int. Cl.
*H04B 7/06* (2006.01)
*H01Q 21/20* (2006.01)
*H04B 7/10* (2017.01)

(52) U.S. Cl.
CPC ......... *H04B 7/0697* (2013.01); *H01Q 21/205* (2013.01); *H04B 7/10* (2013.01)

(58) Field of Classification Search
CPC ....... H04B 7/0697; H04B 7/10; H01Q 21/205
See application file for complete search history.

(56) References Cited

U.S. PATENT DOCUMENTS

2016/0043794 A1*    2/2016   Ashrafi ................ H04B 7/0617
370/329

FOREIGN PATENT DOCUMENTS

WO    WO-2022183469 A1 *  9/2022
WO    WO-2024064760 A1 *  3/2024    ........... H01Q 21/205

OTHER PUBLICATIONS

International Search Report and Written Opinion—PCT/US2023/074700—ISA/EPO—Jan. 30, 2024.

(Continued)

*Primary Examiner* — Joseph E Avellino
*Assistant Examiner* — Maryam Emadi
(74) *Attorney, Agent, or Firm* — Paul M. McAdams; Holland & Hart LLP

(57) ABSTRACT

Methods, systems, and devices for wireless communication are described. Some wireless communications systems may support orbital angular momentum (OAM) communications. A transmitting network node may generate signals for transmission via a first circular antenna array that includes a first quantity of antenna subarrays. The transmitting network node may transmit the signals using the first circular antenna array and based on OAM vectors. The receiving network node may receive and decode the signals using a second circular antenna array that includes a second quantity of antenna subarrays and based on the OAM vectors. The OAM vectors may be based on a numerical relationship between the first quantity and the second quantity. The numerical relationship may include the first quantity being equal to a product of the second quantity and a non-integer rational number and a greatest common divisor of the first and second quantities being an integer greater than one.

30 Claims, 15 Drawing Sheets

(56) References Cited

OTHER PUBLICATIONS

Opare K A., et al., "Mode Combination in an Ideal Wireless OAM-MIMO Multiplexing System", IEEE Wireless Communications Letters, vol. 4, No. 4, Piscataway, NJ, USA, Aug. 1, 2015, XP011667139, ISSN: 2162-2337, pp. 449-452, p. 2-p. 3, figure 2, table 1.

* cited by examiner

ORBITAL ANGULAR MOMENTUM MULTIPLEXING BASED ON A COMMON FACTOR BETWEEN QUANTITIES OF TRANSMIT AND RECEIVE ANTENNA SUBARRAYS

INTRODUCTION

The following relates to wireless communications relating to orbital angular momentum (OAM) communications between network nodes, where the OAM multiplexing may be based on a numerical relationship between quantities of antenna subarrays at each of the network nodes. Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support orbital angular momentum (OAM) multiplexing based on a common factor between quantities of transmit and receive antenna subarrays. For example, the described techniques provide for a transmitting network node that includes a first quantity of antenna subarrays to support orbital angular momentum (OAM) communications with a receiving network node that includes a second quantity of antenna subarrays different from the first quantity. The first quantity may be equal to a product of the second quantity and a non-integer rational number. That is, the first and second quantities may not be integer multiples. The first quantity and the second quantity may have a greatest common divisor that is an integer that is greater than one. The network nodes may each include the respective quantities of antenna subarrays disposed in a respective circular antenna array. For example, the transmitting network node may include a first circular antenna array including one or more antenna subarrays, which may be referred to as a transmitter circle, and the receiving network node may include a second circular antenna array including one or more antenna subarrays, which may be referred to as a receiver circle. Each antenna subarray may include one or more antenna elements.

The transmitting network node may generate multiple OAM signals for transmission to the receiving network node via the transmitter circle. The transmitting network node may transmit the OAM signals concurrently to the receiving network node using the transmitter circle and based on one or more sets of OAM weights. Each set of OAM weights may be referred to as an OAM weighting vector and may correspond to a respective OAM mode. The transmitting network node may transmit each signal using a respective OAM mode and corresponding OAM weighting vector. The receiving network node may receive and decode the OAM signals using the receiver circle and based on multiple sets of OAM weights and corresponding OAM modes at the receiving device. In some aspects, the sets of OAM weights at the transmitting network node, the sets of OAM weights at the receiving network node, or both may be based on the numerical relationship between the first quantity of antenna subarrays and the second quantity of antenna subarrays. The numerical relationship may correspond to the first quantity being equal to a product of the second quantity and the non-integer rational number and the greatest common divisor of the first quantity and the second quantity being an integer greater than one.

A method for wireless communication at a first network node is described. The method may include generating one or more signals for transmission from the first network node via a first circular antenna array, the first circular antenna array including a first quantity of antenna subarrays, where each antenna subarray of the first circular antenna array includes one or more antenna elements and transmitting the one or more signals via the first circular antenna array, where each signal of the one or more signals is based on a respective OAM vector of a set of multiple OAM vectors, where the set of multiple OAM vectors is based on a numerical relationship between the first quantity of antenna subarrays of the first circular antenna array and a second quantity of antenna subarrays of a second circular antenna array, where each antenna subarray of the second circular antenna array includes one or more antenna elements, and where the numerical relationship may include the first quantity being equal to a product of the second quantity and a non-integer rational number and the first quantity and the second quantity having a greatest common divisor that is an integer that is greater than one.

A first network node for wireless communications is described. The first network node may include a memory, a first circular antenna array including a first quantity of antenna subarrays, where each antenna subarray of the first circular antenna array includes one or more antenna elements, and at least one processor coupled to the memory. The at least one processor may be configured to generate one or more signals for transmission from the first network node via a first circular antenna array, and transmit the one or more signals via the first circular antenna array, where each signal of the one or more signals is based on a respective OAM vector of a set of multiple OAM vectors, where the set of multiple OAM vectors is based on a numerical relationship between the first quantity of antenna subarrays of the first circular antenna array and a second quantity of antenna subarrays of a second circular antenna array, where each antenna subarray of the second circular antenna array includes one or more antenna elements, and where the instructions to the numerical relationship includes the first quantity being equal to a product of the second quantity and a non-integer rational number and the first quantity and the second quantity having a greatest common divisor that is an integer that is greater than one.

Another apparatus for wireless communication at a first network node is described. The apparatus may include means for generating one or more signals for transmission from the first network node via a first circular antenna array, the first circular antenna array including a first quantity of antenna subarrays, where each antenna subarray of the first circular antenna array includes one or more antenna elements and means for transmitting the one or more signals via the first circular antenna array, where each signal of the one or more signals is based on a respective OAM vector of a set of multiple OAM vectors, where the set of multiple OAM vectors is based on a numerical relationship between the first quantity of antenna subarrays of the first circular antenna array and a second quantity of antenna subarrays of a second circular antenna array, where each antenna subarray of the second circular antenna array includes one or more antenna elements, and where the means for the numerical relationship includes the first quantity being equal to a product of the second quantity and a non-integer rational number and the first quantity and the second quantity having a greatest common divisor that is an integer that is greater than one.

A non-transitory computer-readable medium storing code for wireless communication at a first network node is described. The code may include instructions executable by a processor to generate one or more signals for transmission from the first network node via a first circular antenna array, the first circular antenna array including a first quantity of antenna subarrays, where each antenna subarray of the first circular antenna array includes one or more antenna elements and transmit the one or more signals via the first circular antenna array, where each signal of the one or more signals is based on a respective OAM vector of a set of multiple OAM vectors, where the set of multiple OAM vectors is based on a numerical relationship between the first quantity of antenna subarrays of the first circular antenna array and a second quantity of antenna subarrays of a second circular antenna array, where each antenna subarray of the second circular antenna array includes one or more antenna elements, and where the numerical relationship includes the first quantity being equal to a product of the second quantity and a non-integer rational number and the first quantity and the second quantity having a greatest common divisor that is an integer that is greater than one.

Some examples of the method, apparatuses, and non-transitory computer-readable medium described herein may further include operations, features, means, or instructions for transmitting, via the first quantity of antenna subarrays, of a set of multiple reference signals to the second circular antenna array at a second network node and receiving a feedback message that indicates a channel response vector based on the set of multiple reference signals, where a quantity of elements in the channel response vector may be equal to a least common multiple of the first quantity of antenna subarrays of the first circular antenna array and the second quantity of antenna subarrays of the second circular antenna array.

Some examples of the method, apparatuses, and non-transitory computer-readable medium described herein may further include operations, features, means, or instructions for determining, based on the channel response vector, an upsampled matrix, the upsampled matrix having at least two identical entries based on the greatest common divisor of the first quantity and the second quantity being the integer greater than one and transmitting information based on a discrete Fourier transform (DFT) matrix, where the DFT matrix may be associated with the set of multiple OAM vectors, where the DFT matrix may be based on the upsampled matrix, and where the DFT matrix includes a quantity of null entries based on the upsampled matrix having at least two identical entries.

Some examples of the method, apparatuses, and non-transitory computer-readable medium described herein may further include operations, features, means, or instructions for transmitting, via the first quantity of antenna subarrays, a set of multiple reference signals to the second circular antenna array at a second network node and receiving a feedback message that indicates channel response information related to the set of multiple OAM vectors or information for obtaining the set of multiple OAM vectors based on the set of multiple reference signals.

In some examples of the method, apparatuses, and non-transitory computer-readable medium described herein, the feedback message indicates a DFT matrix including a quantity of DFT values, the quantity of DFT values equal to a least common multiple of the first quantity of antenna subarrays of the first circular antenna array and the second quantity of antenna subarrays of the second circular antenna array and the set of multiple OAM vectors may be based on the quantity of DFT values.

Some examples of the method, apparatuses, and non-transitory computer-readable medium described herein may further include operations, features, means, or instructions for determining a quantity of submatrices of the DFT matrix, the quantity equal to the greatest common divisor of the first quantity and the second quantity and determining a singular value decomposition (SVD) of each submatrix of the quantity of submatrices, where the set of multiple OAM vectors may be based on a combination of the SVDs of the quantity of submatrices.

Some examples of the method, apparatuses, and non-transitory computer-readable medium described herein may further include operations, features, means, or instructions for transmitting a codebook that indicates the set of multiple OAM vectors, where a size of the codebook may be based on the greatest common divisor of the first quantity and the second quantity.

In some examples of the method, apparatuses, and non-transitory computer-readable medium described herein, the first quantity of antenna subarrays of the first circular antenna array includes a set of first antenna groups and the second quantity of antenna subarrays of the second circular antenna array includes a set of second antenna groups, the set of second antenna groups and the set of first antenna groups both including a quantity of antenna groups that is equal to the greatest common divisor of the first quantity and the second quantity. The method, apparatuses, and non-transitory computer-readable medium may include further operations, features, means, or instructions for transmitting, via each first antenna group of the set of first antenna groups, a respective set of one or more reference signals to a respective second antenna group of the set of second antenna groups.

In some examples of the method, apparatuses, and non-transitory computer-readable medium described herein transmitting each of the respective sets of one or more reference signals may be based on a respective subset of OAM vectors of the set of multiple OAM vectors and a quantity of OAM vectors in each respective subset of OAM vectors may be equal to the greatest common devisor of the first quantity and the second quantity.

Some examples of the method, apparatuses, and non-transitory computer-readable medium described herein may further include operations, features, means, or instructions for receiving, via the first circular antenna array and based on the sets of reference signals, a feedback message that indicates a DFT matrix associated with the set of multiple OAM vectors, where a quantity of entries in the DFT matrix may be less than a product of the first quantity of antenna subarrays of the first circular antenna array and the second quantity of antenna subarrays of the second circular antenna array based on the greatest common divisor of the first quantity and the second quantity being the integer greater than one.

Some examples of the method, apparatuses, and non-transitory computer-readable medium described herein may further include operations, features, means, or instructions for transmitting each respective set of reference signals at a different time than each other respective set of reference signals.

Some examples of the method, apparatuses, and non-transitory computer-readable medium described herein may further include operations, features, means, or instructions for transmitting each respective set of reference signals concurrently and based on a respective subset of OAM vectors of the set of multiple OAM vectors.

A method for wireless communication at a first network node is described. The method may include receiving one or more signals via a first circular antenna array including a first quantity of antenna subarrays, where each antenna subarray of the first circular antenna array includes one or more antenna elements and decoding each of the one or more signals received via the first circular antenna array based on a respective OAM vector of the set of multiple OAM vectors, where the set of multiple OAM vectors is based on a numerical relationship between the first quantity of antenna subarrays of the first circular antenna array and a second quantity of antenna subarrays of a second circular antenna array, where each antenna subarray of the second circular antenna array includes one or more antenna elements, and where the numerical relationship may include the first quantity being equal to a product of the second quantity and a non-integer rational number and the first quantity and the second quantity having a greatest common divisor that is an integer that is greater than one.

A first network node for wireless communications is described. The first network node may include a memory, a first circular antenna array including a first quantity of antenna subarrays, where each antenna subarray of the first circular antenna array includes one or more antenna elements, and at least one processor coupled to the memory. The at least one processor may be configured to receive one or more signals via the first circular antenna array and decode each of the one or more signals received via the first circular antenna array based on a respective OAM vector of the set of multiple OAM vectors, where the set of multiple OAM vectors is based on a numerical relationship between the first quantity of antenna subarrays of the first circular antenna array and a second quantity of antenna subarrays of a second circular antenna array, where each antenna subarray of the second circular antenna array includes one or more antenna elements, and where the numerical relationship may include the first quantity being equal to a product of the second quantity and a non-integer rational number and the first quantity and the second quantity having a greatest common divisor that is an integer that is greater than one.

Another apparatus for wireless communication at a first network node is described. The apparatus may include means for receiving one or more signals via a first circular antenna array including a first quantity of antenna subarrays, where each antenna subarray of the first circular antenna array includes one or more antenna elements and means for decoding each of the one or more signals received via the first circular antenna array based on a respective OAM vector of the set of multiple OAM vectors, where the set of multiple OAM vectors is based on a numerical relationship between the first quantity of antenna subarrays of the first circular antenna array and a second quantity of antenna subarrays of a second circular antenna array, where each antenna subarray of the second circular antenna array includes one or more antenna elements, and where the numerical relationship includes the first quantity being equal to a product of the second quantity and a non-integer rational number and the first quantity and the second quantity having a greatest common divisor that is an integer that is greater than one.

A non-transitory computer-readable medium storing code for wireless communication at a first network node is described. The code may include instructions executable by a processor to receive one or more signals via a first circular antenna array including a first quantity of antenna subarrays, where each antenna subarray of the first circular antenna array includes one or more antenna elements and decode each of the one or more signals received via the first circular antenna array based on a respective OAM vector of the set of multiple OAM vectors, where the set of multiple OAM vectors is based on a numerical relationship between the first quantity of antenna subarrays of the first circular antenna array and a second quantity of antenna subarrays of a second circular antenna array, where each antenna subarray of the second circular antenna array includes one or more antenna elements, and where the numerical relationship includes the first quantity being equal to a product of the second quantity and a non-integer rational number and the first quantity and the second quantity having a greatest common divisor that is an integer that is greater than one.

Some examples of the method, apparatuses, and non-transitory computer-readable medium described herein may further include operations, features, means, or instructions for receiving, via the first quantity of antenna subarrays, a set of multiple reference signals from the second quantity of antenna subarrays of the second circular antenna array at a second network node, determining a channel response vector based on the set of multiple reference signals, and transmitting, based on the channel response vector, a feedback message that indicates information for determining the set of multiple OAM vectors.

In some examples of the method, apparatuses, and non-transitory computer-readable medium described herein, determining the channel response vector may include operations, features, means, or instructions for determining a set of multiple channel response values based on receiving the set of multiple reference signals via the first circular antenna array, where each channel response value of the set of multiple channel response values may be associated with a respective pair of antenna subarrays including a first antenna subarray of the first quantity of antenna subarrays and a second antenna subarray of the second quantity of antenna subarrays and grouping the set of multiple channel response values into a quantity of groups, where each group of the quantity of groups corresponds to a respective element in the channel response vector, where the quantity of groups may be equal to a least common multiple of the first quantity of antenna subarrays of the first circular antenna array and the second quantity of antenna subarrays of the second circular antenna array, and where the feedback message indicates the channel response vector.

Some examples of the method, apparatuses, and non-transitory computer-readable medium described herein may further include operations, features, means, or instructions for determining, based on the channel response vector, an upsampled matrix, the upsampled matrix having at least two identical entries based on the greatest common divisor of the first quantity and the second quantity being the integer greater than one and determining a DFT matrix based on the upsampled matrix, where the DFT matrix includes a quantity of null entries based on the at least two entries in the upsampled matrix being identical.

In some examples of the method, apparatuses, and non-transitory computer-readable medium described herein, the feedback message indicates the DFT matrix, the DFT matrix including a quantity of DFT values that may be equal to a least common multiple of the first quantity of antenna subarrays of the first circular antenna array and the second quantity of antenna subarrays of the second circular antenna array and the DFT matrix may be associated with the set of multiple OAM vectors.

Some examples of the method, apparatuses, and non-transitory computer-readable medium described herein may further include operations, features, means, or instructions for determining a quantity of submatrices of the DFT matrix, the quantity equal to the greatest common divisor of the first quantity and the second quantity and determining a respective SVD for each submatrix of the quantity of submatrices, where the set of multiple OAM vectors may be based on a combination of the respective SVDs.

In some examples of the method, apparatuses, and non-transitory computer-readable medium described herein, the feedback message indicates the channel response vector and the method, apparatuses, and non-transitory computer-readable medium may include further operations, features, means, or instructions for receiving, based on the channel response vector indicated via the feedback message, a control message that indicates a DFT matrix including a quantity of DFT values, the quantity of DFT values equal to a least common multiple of the first quantity of antenna subarrays of the first circular antenna array and the second quantity of antenna subarrays of the second circular antenna array and determining an inverse Fourier transform of the DFT matrix, where the set of multiple OAM vectors may be based on the inverse Fourier transform of the DFT matrix.

In some examples of the method, apparatuses, and non-transitory computer-readable medium described herein, the inverse Fourier transform of the DFT matrix corresponds to a set of multiple mode vectors including a quantity of elements that may be less than the first quantity of antenna subarrays in the first circular antenna array and the method, apparatuses, and non-transitory computer-readable medium may include further operations, features, means, or instructions for determining the set of multiple OAM vectors based on upsampling the set of multiple mode vectors to increase the quantity of elements in each of the set of multiple mode vectors.

Some examples of the method, apparatuses, and non-transitory computer-readable medium described herein may further include operations, features, means, or instructions for receiving a codebook that indicates the set of multiple OAM vectors, where a size of the codebook may be based on the greatest common divisor of the first quantity and the second quantity.

In some examples of the method, apparatuses, and non-transitory computer-readable medium described herein, the first quantity of antenna subarrays of the first circular antenna array includes a set of first antenna groups and the second quantity of antenna subarrays of the second circular antenna array includes a set of second antenna groups, the set of second antenna groups and the set of first antenna groups both comprising a quantity of antenna groups that is equal to the greatest common divisor of the first quantity and the second quantity. The method, apparatuses, and non-transitory computer-readable medium may include further operations, features, means, or instructions for receiving, via each first antenna group of the set of first antenna groups, a respective set of one or more reference signals from a respective second antenna group of the set of second antenna groups.

In some examples of the method, apparatuses, and non-transitory computer-readable medium described herein, receiving each of the respective sets of one or more reference signals may be based on a respective subset of OAM vectors of the set of multiple OAM vectors and a quantity of OAM vectors in each respective subset of OAM vectors may be equal to the greatest common divisor of the first quantity and the second quantity.

Some examples of the method, apparatuses, and non-transitory computer-readable medium described herein may further include operations, features, means, or instructions for determining a set of multiple channel response values based on receiving the sets of reference signals via the first circular antenna array, determining a set of multiple matrices based on the set of multiple channel response values, where each matrix of the set of multiple matrices includes one or more channel response values associated with a respective pair of antenna groups including a first antenna group of the quantity of first antenna groups and a second antenna group of the quantity of second antenna groups, concatenating DFTs of each matrix of the set of multiple matrices, and transmitting a feedback message that indicates a DFT matrix based on concatenating the DFTs.

DETAILED DESCRIPTION

Figure 1:
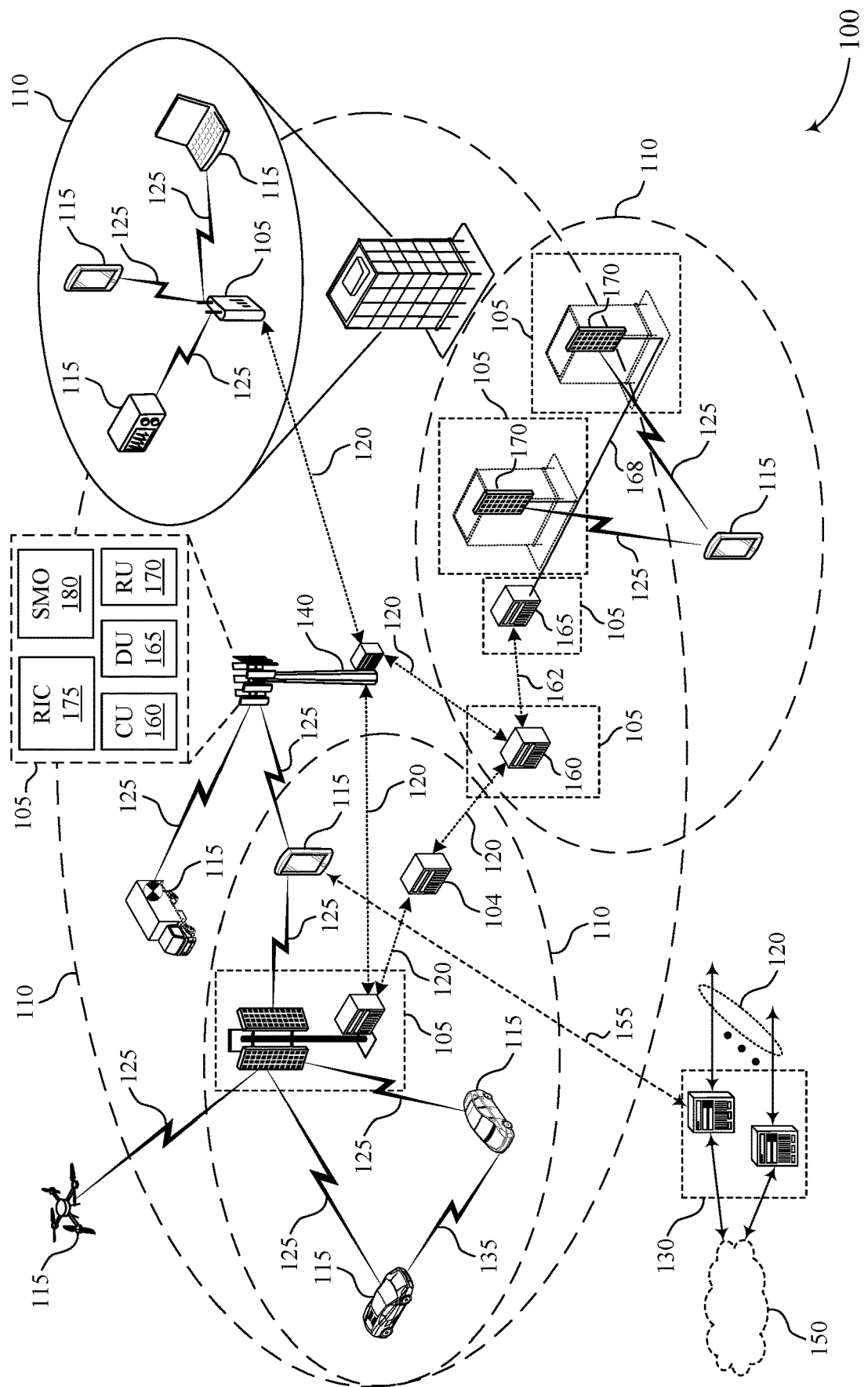
FIG. 1 illustrates an example of a wireless communications system that supports orbital angular momentum (OAM) multiplexing based on a common factor between quantities of transmit and receive antenna subarrays in accordance with one or more aspects of the present disclosure.

In some wireless communications systems, wireless devices, such as base stations, user equipments (UEs), network nodes, or any combination thereof, may communicate directionally, for example, using beams to orient communication signals over one or more directions. Various wireless communication schemes, such as line-of-site multiple-input multiple-output (LoS-MIMO), are being considered for advanced wireless communication systems (e.g., 6G wireless communication systems) to, for example, support high throughput over short distances. In such environments, two network nodes or other devices may communicate using one or more antenna arrays. For example, the network nodes may support orbital angular momentum (OAM) multiplexing, in which a transmitting network node and a receiving network node may each be equipped with antenna subarrays disposed in a circular array, which may be referred to as a transmitter circle and a receiver circle, respectively. As used herein, a transmitter circle or receiver circle may refer to a circular arrangement of antenna subarrays configured to support OAM multiplexing, and the antenna subarrays of a transmitter circle or receiver circle may but need not be disposed in a perfect circle. Either a transmitter circle or a receiver circle may alternatively be referred to as a circular antenna array, and a transmitter circle may alternatively be referred to as a circular transmitter array while a receiver circle may alternatively be referred to as a circular receiver array.

The transmitter and receiver circles may be supportive of communication between the network nodes according to one or more OAM modes. In some cases, a set of orthogonal OAM modes may be configured based on a quantity of antenna subarrays in both the transmitter and receiver circles. Each OAM mode may correspond to a respective vector of OAM weights (e.g., an OAM weighting vector) to be applied to the antenna subarrays of the transmitter and receiver circles to generate and decode signals, respectively. In some cases, the quantity of antenna subarrays may differ between the transmitter circle at a transmitting network node and the receiver circle at a receive network node, in which case the different network nodes may support different quantities of OAM modes and corresponding OAM weighting vectors. However, a maximum quantity of orthogonal OAM modes that may be used for communication between the two network nodes may correspond to the number of antenna subarrays in the circle with the smallest quantity of antenna subarrays. As such, differences in OAM modes due to different antenna subarray quantities may result in increased complexity in decoding signals.

Techniques described herein provide for signaling exchanged between the transmitting and receiving network nodes to indicate an OAM mode and a corresponding OAM weighting vector when a quantity of antenna subarrays of a first circular array at a transmitting network node is different from a quantity of antenna subarrays of a second circular array at a receiving network node and the quantity of antenna subarrays in the receiver circle (M) and the quantity of antenna subarrays in the transmitter circle (N), are not integer multiples (e.g., N=KM+r or M=KN+r, where K is an integer factor greater than one and r is a remainder value). That is, the quantity of antenna subarrays of the first circular array may be equal to a product of the quantity of antenna subarrays of the second circular antenna array and a non-integer rational number, or vice versa. The described techniques leverage a channel structure when the quantity of antenna subarrays of the first circular antenna array and the quantity of antenna subarrays of the second circular antenna array share a greatest common divisor that is an integer greater than one. In such cases, overhead may be reduced by simplifying and combining information that may be exchanged between network nodes. Additionally, processing complexity as well as power consumption by the network nodes may be decreased due to simplified computations.

The transmitting network node may transmit one or more reference signals to the receiving network node using the transmitter circle. The reference signals may include channel state information (CSI) reference signals, sounding reference signals (SRS), or any other type of reference signal. In some aspects, the transmitting network node may transmit the reference signals using each antenna subarray within the transmitter circle and in accordance with one or more OAM modes. The receiving network node may receive the reference signals using each antenna subarray within the receiver circle and in accordance with one or more OAM modes. The receiving network node may perform a channel estimation of a channel between the transmitting network node and the receiving network node based on the reference signals. If there is a common factor between M and N, there may be repetition in the channel response matrix, and the receiving network node may leverage such repetition to reduce an amount of channel information that is fed back to the transmitting network node. For example, the receiving network node may map channel responses associated with a set of pairs of transmit and receive antenna arrays to a same element in a channel response vector. There may be a same quantity of pairs of antenna elements in each set as the greatest common divisor between M and N (e.g., d). The receiving network node may transmit a feedback message that indicates the channel response vector having the reduced quantity of elements, which may decrease overhead as compared with a feedback message that indicates the full channel response matrix.

The transmitting network node may perform a discrete Fourier transform (DFT) of the channel response vector to obtain a DFT matrix indicative of the OAM modes. The transmitting network node may, in some aspects, transmit control information that indicates the DFT matrix to the receiving network node. Additionally, or alternatively, the receiving network node may perform the DFT before transmitting the feedback message. If the receiving network node performs the DFT, the receiving network node may transmit the sparse DFT matrix via the feedback message, which may decrease overhead due to the null entries in the matrix. The DFT matrix may be a sparse matrix that may include some null (e.g., zero) values based on the repetition in the channel response matrix. In some aspects, the quantity of elements in the DFT matrix and the channel response vector may be the same as a least common multiple of M and N (e.g., K, where K=lcm(M,N)).

In some other aspects, the transmitting network node and the receiving network node may group antenna subarrays at each device into a quantity of sets of antenna subarrays. The quantity may be equal to the greatest common divisor of M and N (e.g., d). Each set of antenna arrays at the transmitting network node may be paired with a respective set of antenna arrays at the receiving network node. The transmitting network node may transmit reference signals using OAM modes from each set of antenna subarrays. The receiving network node may estimate a channel response sub-matrix for each pair of antenna array sets. A sparse DFT matrix may be obtained by combining the sub-matrices, which may reduce complexity as compared with obtaining a DFT of a full M-by-N channel matrix.

Once the DFT matrix is obtained, the receiving network node, the transmitting network node, or both may solve the channel response matrix based on the sparse DFT matrix to calculate a set of singular vectors. The singular vectors may correspond to beamforming vectors that the transmitting network node may use to orthogonally transmit signals according to each OAM mode. The network nodes may solve the channel response (e.g., perform a singular value decomposition (SVD)) by constructing a set of submatrices each having a reduced quantity of elements based on the sparseness of the DFT matrix and solving each of the submatrices separately. Solving the submatrices having reduced sizes may decrease processing and power consumption as compared with solving a full DFT matrix.

Aspects of the disclosure are initially described in the context of wireless communications systems. Additional aspects of the disclosure are described with reference to OAM antenna array configurations and process flows. Aspects of the disclosure are further illustrated by and described with reference to apparatus diagrams, system diagrams, and flowcharts that relate to OAM multiplexing based on a common factor between quantities of transmit and receive antenna subarrays.

FIG. 1 illustrates an example of a wireless communications system 100 that supports OAM multiplexing based on a common factor between quantities of transmit and receive antenna subarrays in accordance with one or more aspects of the present disclosure. The wireless communications system 100 may include one or more network entities 105, one or more UEs 115, and a core network 130. In some aspects, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some aspects, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node (which may be referred to as a node, a network node, a network entity, or a wireless node) may include, be, or be included in (e.g., be a component of) a base station (e.g., any base station described herein), a UE (e.g., any UE described herein), a network controller, an apparatus, a device, a computing system, an integrated access and backhauling (IAB) node, a distributed unit (DU), a central unit (CU), a remote/radio unit (RU) (which may also be referred to as a remote radio unit (RRU)), and/or another processing entity configured to perform any of the techniques described herein. For example, a network node may be a UE. As another example, a network node may be a base station or network entity. As another example, a first network node may be configured to communicate with a second network node or a third network node. In one aspect of this example, the first network node may be a UE, the second network node may be a base station, and the third network node may be a UE. In another aspect of this example, the first network node may be a UE, the second network node may be a base station, and the third network node may be a base station. In yet other aspects of this example, the first, second, and third network nodes may be different relative to these examples. Similarly, reference to a UE, base station, apparatus, device, computing system, or the like may include disclosure of the UE, base station, apparatus, device, computing system, or the like being a network node. For example, disclosure that a UE is configured to receive information from a base station also discloses that a first network node is configured to receive information from a second network node. Consistent with this disclosure, once a specific example is broadened in accordance with this disclosure (e.g., a UE is configured to receive information from a base station also discloses that a first network node is configured to receive information from a second network node), the broader example of the narrower example may be interpreted in the reverse, but in a broad open-ended way. In the example above where a UE is configured to receive information from a base station also discloses that a first network node is configured to receive information from a second network node, the first network node may refer to a first UE, a first base station, a first apparatus, a first device, a first computing system, a first set of one or more one or more components, a first processing entity, or the like configured to receive the information; and the second network node may refer to a second UE, a second base station, a second apparatus, a second device, a second computing system, a second set of one or more components, a second processing entity, or the like.

As described herein, communication of information (e.g., any information, signal, or the like) may be described in various aspects using different terminology. Disclosure of one communication term includes disclosure of other communication terms. For example, a first network node may be described as being configured to transmit information to a second network node. In this example and consistent with this disclosure, disclosure that the first network node is configured to transmit information to the second network node includes disclosure that the first network node is configured to provide, send, output, communicate, or transmit information to the second network node. Similarly, in this example and consistent with this disclosure, disclosure that the first network node is configured to transmit information to the second network node includes disclosure that the second network node is configured to receive, obtain, or decode the information that is provided, sent, output, communicated, or transmitted by the first network node.

In some aspects, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some aspects, network entities 105 may communicate with one another via a backhaul communication link 120 (e.g., in accordance with an X2, Xn, or other interface protocol) either directly (e.g., directly between network entities 105) or indirectly (e.g., via a core network 130). In some aspects, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some aspects, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some aspects, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some aspects, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some aspects, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some aspects, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some aspects, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, or referred to as a child IAB node associated with an IAB donor, or both. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, or may directly signal transmissions to a UE 115, or both. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support OAM multiplexing based on a common factor between quantities of transmit and receive antenna subarrays as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some aspects, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some aspects, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some aspects, the wireless communications system 100 may include network entities 105 or UEs 115 that support concurrent communications using carriers associated with multiple carrier bandwidths. In some aspects, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some aspects, a UE 115 may be configured with multiple BWPs. In some aspects, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some aspects, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some aspects, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some aspects, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some aspects, a carrier may support multiple cells, and different cells may be configured according to different protocol types (e.g., MTC, narrowband IoT (NB-IoT), enhanced mobile broadband (eMBB)) that may provide access for different types of devices.

In some aspects, a network entity 105 (e.g., a base station 140, an RU 170) may be movable and therefore provide communication coverage for a moving coverage area 110. In some aspects, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some aspects, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some aspects, half-duplex communications may be performed at a reduced peak rate. Other power conservation techniques for the UEs 115 include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some aspects, a UE 115 may be configured to support communicating directly with other UEs 115 via a device-to-device (D2D) communication link 135 (e.g., in accordance with a peer-to-peer (P2P), D2D, or sidelink protocol). In some aspects, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some aspects, one or more UEs 115 of such a group may be outside the coverage area 110 of a network entity 105 or may be otherwise unable to or not configured to receive transmissions from a network entity 105. In some aspects, groups of the UEs 115 communicating via D2D communications may support a one-to-many (1:M) system in which each UE 115 transmits to each of the other UEs 115 in the group. In some aspects, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some aspects, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some aspects, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some aspects, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some aspects, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some aspects, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some aspects, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some aspects, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some aspects, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some aspects, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some aspects, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

In some aspects, one or more network nodes in the wireless communications system 100, such as a UE 115, a network entity 105, an IAB node 104, an RU 170, a DU 165, a CU 160, or any combination thereof, may support OAM communications. A network node that supports OAM communication may include a circular array including multiple antenna subarrays, which may be referred to as a transmitter circle for a transmitting network node or a receiver circle for a receiving network node. Each antenna subarray may include one or more antenna elements. Techniques described herein provide for a transmitting network node that includes a first quantity of antenna subarrays to support OAM communications with a receiving network node that includes a second quantity of antenna subarrays different from the first quantity. The first and second quantities may not be integer multiples and may share a greatest common divisor that is an integer greater than one. The network nodes may each include the respective quantities of antenna subarrays disposed in a circle, which may be referred to as a transmitter circle and a receiver circle, respectively. Each antenna subarray may include one or more antenna elements.

The transmitting network node may generate multiple OAM signals for transmission to the receiving network node via the transmitter circle. The transmitting network node may transmit the OAM signals concurrently to the receiving network node using the transmitter circle and based on one or more sets of OAM weights. Each set of OAM weights may be referred to as an OAM weighting vector and may correspond to a respective OAM mode. The transmitting network node may transmit each signal using a respective OAM mode and corresponding OAM weighting vector. The receiving network node may receive and decode the OAM signals using the receiver circle and based on multiple sets of OAM weights and corresponding OAM modes at the receiving device. In some aspects, the sets of OAM weights at the transmitting network node, the sets of OAM weights at the receiving network node, or both may be based on the numerical relationship between the first quantity of antenna subarrays and the second quantity of antenna subarrays. The numerical relationship may correspond to the first quantity being equal to a product of the second quantity and the non-integer rational number and the greatest common divisor of the first quantity and the second quantity being an integer greater than one.

Figure 2:
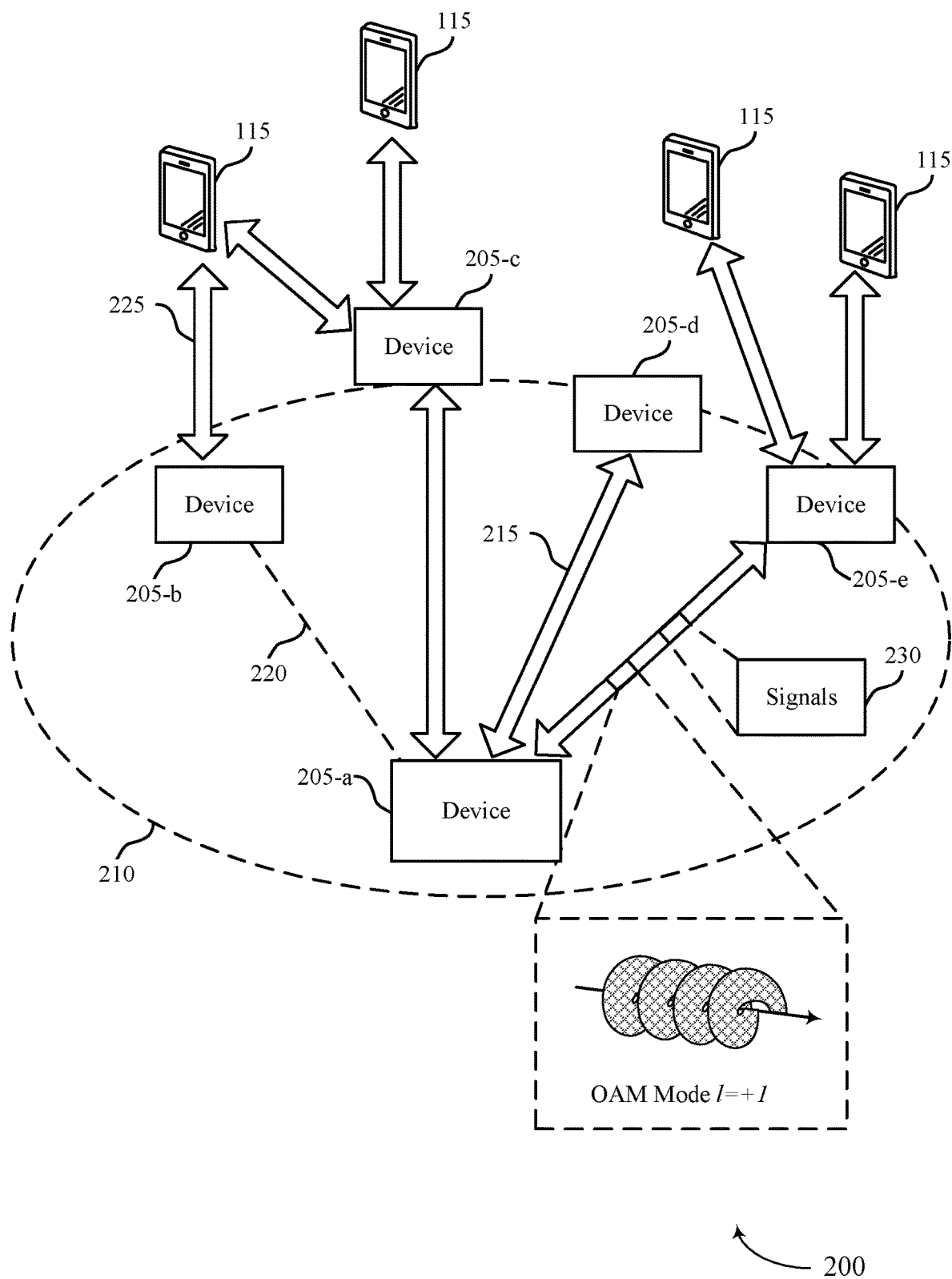
FIG. 2 illustrates an example of a wireless communications system that supports OAM multiplexing based on a common factor between quantities of transmit and receive antenna subarrays in accordance with one or more aspects of the present disclosure.

FIG. 2 illustrates an example of a wireless communications system 200 that supports OAM multiplexing based on a common factor between quantities of transmit and receive antenna subarrays in accordance with one or more aspects of the present disclosure. The wireless communications system 200 may implement or be implemented by aspects of the wireless communications system 100. The wireless communications system may include one or more devices 205 and UEs 115. The devices 205 may each be an example of a UE 115, a network entity 105, a base station 140, an IAB node, a CU, a DU, an RU, or any other wired or wireless device. In some aspects, the devices 205-a, 205-b, 205-c, 205-d, and 205-e may form a network device architecture 210, which may be used to relay signals from a radio access network (RAN) (e.g., using smart coordination) to the UEs 115 or other wireless access devices. The wireless communications system 200 (which may be an example of a sixth generation (6G) system, a fifth generation (5G) system, or another generation system) may support OAM-based communications and, as such, the devices 205 the one or more UEs 115, or both may transmit or receive OAM beams, or OAM-related signals over respective communication links.

The device 205-a may represent an example of a core unit of the network device architecture 210, such as a network entity 105, a RAN CU, a RAN DU, or some other network node. In some cases, the device 205-a may be connected with the other devices 205 via wired fronthaul/backhaul communication links 220 (e.g., fiber-based fronthaul). Additionally, or alternatively, the device 205-a may communicate with one or more other devices 205 of the network device architecture 210 via wireless fronthaul/backhaul communication links 215. The wireless fronthaul/backhaul communication links 215 may reduce cost and deployment complexity as compared with the wired fronthaul/backhaul communication links 220. The other devices 205 may represent aspects of distributed network nodes, such as IAB nodes, repeaters, RUs, or any combination thereof that may relay signals from the RAN to one or more UEs 115 or other wireless devices via wireless access communication links 225.

The wireless communications system 200 may support various communications schemes, such as LoS-MIMO. In such environments, a direct link may be present between two or more devices 205 (e.g., without a physical obstruction). For example, the network device architecture 210 may occupy a relatively small area, such that a distance between the devices 205 is relatively short. The devices 205 may communicate according to one or more LoS-MIMO communication schemes using one or more antenna subarrays based on the relatively small distance between devices. Such LoS-MIMO communication schemes may support relatively high throughput and data capacities over relatively short distances. As such, LoS-MIMO may provide for the wireless fronthaul/backhaul communication links 215 to support sufficient data capacity between devices 205 of the network device architecture 210 without deploying physical fibers or cables. For example, the device 205-a (e.g., a DU or core network node) may be deployed with an aperture array that connects with one or more other devices 205 (e.g., instead of fibers). In some aspects, the performance of the aperture array on the device 205-a may be optimized between the device 205-a and the other devices 205-c, 205-d, and 205-e to support relatively high throughput and capacity of the wireless fronthaul/backhaul communication links 215.

OAM-based communications may be an example of a LoS-MIMO communication scheme supported by the wireless communications system 200. Each of the devices 205, the UEs 115, or both may support OAM communication and may include an OAM antenna system having multiple antenna elements or antenna subarrays arranged in one or more concentric circular arrays. The respective antenna subarrays of the devices 205 may be installed or dynamically adjusted such that they are aligned along a first axis (e.g., a horizontal or vertical axis) as well as rotationally, or such that they are offset by a configured rotational offset. OAM communication may support relatively high-order spatial multiplexing, and in some aspects, the offsets between antenna subarrays may be configured to optimize orthogonality between signals and data throughput. OAM communication may support relatively high data rates between two or more devices 205 over relatively short distances. In some aspects, the devices 205 may perform OAM communications in relatively high frequency spectrums (e.g., sub-THz, THz, etc.). Although OAM communication is described in the context of fronthaul and backhaul, it is to be understood that the communication techniques described herein may be applicable to any two wireless devices, include access devices (e.g., UEs, CPEs), network devices (e.g., base stations, DUs, CUs, RUs, IAB nodes), or both.

The devices 205 may support OAM-based communication by using OAM of electromagnetic waves to distinguish between different signals. For example, a transmitting device 205 may radiate multiple coaxially propagating, spatially-overlapping waves each carrying a data stream through an array of apertures. In some cases, the OAM of the electromagnetic wave may be associated with a field spatial distribution of the electromagnetic wave, which may be in the form of a helical or twisted wavefront shape. For example, an electromagnetic wave may correspond to a helical transverse phase of the form $\exp(i\varphi l)$ may carry an OAM mode waveform, where $\varphi$ may be an azimuthal angle of the waveform and l may be an unbounded integer, which may be referred to as an OAM order, a helical mode, or an OAM mode. Each OAM mode (e.g., OAM modes l= . . . , −2, −1, 0, 1, 2, . . . ) may be orthogonal.

Such OAM modes may be characterized by a wavefront that is shaped as a helix with an optical vortex in the center (e.g., at the beam axis), where each OAM mode is associated with a different helical wavefront structure. The OAM modes may be defined or referred to by the mode index l, where a sign of the mode index l corresponds to a "handedness" (e.g., left or right) of the helix (or helices) and a magnitude of the mode index l (e.g., |l|) corresponds to a quantity of distinct but interleaved helices of the electromagnetic wave.

For example, for an electromagnetic wave associated with an OAM mode index of l=0, the electromagnetic wave may not be helical and the wavefronts of the electromagnetic wave are multiple disconnected surfaces (e.g., the electromagnetic wave is a sequence of parallel planes). For an electromagnetic wave associated with an OAM mode index of l=+1, the electromagnetic wave may propagate in a right-handed pattern (e.g., has a right circular polarization or may be understood as having a clockwise circular polarization) and the wavefront of the electromagnetic wave may be shaped as a single helical surface with a step length equal to a wavelength $\lambda$ of the electromagnetic wave. An example of such an electromagnetic wave is illustrated in FIG. 2. Similarly, for an OAM mode index of l=−1, the electromagnetic wave may propagate in a left-handed pattern (e.g., has a left circular polarization or may be understood as having a counter-clockwise circular polarization) and the wavefront of the electromagnetic wave may also be shaped as a single helical surface with a step length equal to the wavelength $\lambda$ of the electromagnetic wave.

For further example, for an OAM mode index of l=±2, the electromagnetic wave may propagate in either a right-handed pattern (if +2) or in a left-handed pattern (if −2) and the wavefront of the electromagnetic wave may include two distinct but interleaved helical surfaces. In such aspects, the step length of each helical surface may be equal to $\lambda/2$. Likewise, the phase delay over one revolution of the electromagnetic wave may be equal to ±4π. In general terms, a mode-l electromagnetic wave may propagate in either a right-handed pattern or a left-handed pattern (depending on the sign of l) and may include l distinct but interleaved helical surfaces with a step length of each helical surface equal to $\lambda/|l|$. In some aspects, an electromagnetic wave may be indefinitely extended to provide for an infinite number of degrees of freedom of the OAM of the electromagnetic wave (e.g., l=0, ±1, ±2, . . . , ±∞). As such, the OAM of the electromagnetic wave may be associated with infinite degrees of freedom.

In some aspects, the OAM mode index l of an electromagnetic wave may correspond to or otherwise function as (e.g., be defined as) an additional dimension for signal or channel multiplexing. For example, each OAM mode, which may correspond to an OAM state (of which there may be infinite), may function similarly (e.g., or equivalently) to a communication channel, such as a sub-channel. In other words, an OAM mode or state may correspond to a communication channel, and vice versa. For instance, the devices 205 may communicate separate signals 230 using electromagnetic waves having different OAM modes or states similarly to how the devices may transmit separate signals over different communication channels. In some aspects, such use of the OAM modes or states of an electromagnetic wave to carry different signals 230 may be referred to as the use of OAM beams.

Such OAM waveforms associated with different OAM modes may be orthogonally received at a same time and frequency radio resource, which may improve communication spectrum efficiency with relatively low processing complexity at a receiving device 205. For example, a transmitting device 205, such as the device 205-a, may transmit one or more signals 230 to a receiving device 205, such as the device 205-e, using multiple OAM modes. Each signal 230 may be transmitted according to a respective OAM mode, such that the signals 230 do not overlap or interference with each other. In some aspects, two or more signals may be transmitted concurrently. If polarizations are added to the OAM modes, a quantity of orthogonal OAM streams may increase.

To support such OAM communication, each device 205 may be configured with a set of antenna subarrays configured in a circular shape, such as a uniform circular array (UCA) antenna circle (e.g., an antenna circle, a transmitter circle, or a receiver circle). Each device 205 may be equipped with one or more UCA circles that the device 205 may use to communicate according to one or more OAM modes. The OAM antenna array configurations are described in further detail elsewhere herein, including with reference to FIGS. 3 and 4.

In some cases, the transmitting device 205-a and the receiving device 205-e may be configured with a same quantity of antenna subarrays at each device 205. A quantity of OAM modes that can be generated by each device 205 may correspond to the quantity of antenna subarrays. For example, if a device 205 has N antenna subarrays, the device 205 may be configured to generate N OAM modes. Each OAM mode may correspond to a set of OAM weights (e.g., an OAM weighting vector) to be applied to the antenna subarrays of the transmitting device 205-a when generating the transmission. The receiving device 205-e may utilize the OAM modes corresponding to the quantity of antenna subarrays to identify weights applied by the transmitting device 205-a to the OAM signals. The receiving device 205-e may receive and decode the OAM signals based on the weights.

In some aspects, however, a quantity of antenna subarrays at the transmitting device 205-a may be different than a quantity of antenna subarrays at the receiving device 205-e. For example, the devices 205 may be deployed with different quantities of antenna subarrays, or the devices 205 may be configured to dynamically activate or deactivate one or more antenna subarrays of the device 205 based on a set of communication parameters. The quantity of antenna subarrays at a device 205 (e.g., a quantity of configured antenna subarrays or a quantity of activated antenna subarrays) may be based on a condition of a channel between the device 205 and another device 205, a type of the device 205, power consumption of the device 205, a type of communication performed by the device 205, a size of the device 205, beamforming capabilities of the device 205, processing capabilities of the device 205, or any combination thereof. In some aspects, a greater quantity of antenna subarrays may improve an array gain, improve beam refinement and granularity, improve throughput, and reduce aliasing. However, some devices may not be capable of supporting more than a threshold quantity of antenna subarrays due to size and processing constraints, for example. As such, in some cases a first device (e.g., a network entity) may have more antenna subarrays than a second device (e.g., a UE). If the quantity of antenna subarrays of a transmitter circle is different than a quantity of antenna subarrays of a receiver circle, the receiving device 205-$e$, in some cases, may be unable to accurately receive and decode OAM transmissions from the transmitting device 205-$a$ due to relatively complex processing associated with decoding such a channel.

As described herein, the devices 205 may be configured with methods for supporting OAM communications using a different quantity of transmitter antenna subarrays than receiver antenna subarrays. In some aspects, the devices 205 may be configured with a quantity of antenna subarrays. Each device 205 may be configured to communicate with a set of one or more other devices 205 that include a same quantity of antenna subarrays or based on a numerical relationship between quantities of antenna subarrays at the device and the set of one or more other devices 205. Additionally, or alternatively, the devices 205 may exchange signaling to indicate the respective quantity of antenna subarrays, which may be static or may change dynamically (e.g., the device 205 may dynamically activate and deactivate antenna subarrays). For example, the receiving device 205-$e$ may transmit signaling to the transmitting device 205-$a$ to indicate the quantity of receiver antenna subarrays and the transmitting device 205-$a$ may transmit signaling to the receiving device 205-$e$, one or more other devices 205 (e.g., via a broadcast message), or both, to indicate the quantity of transmitter antenna subarrays. The signaling may be RRC signaling, a medium access control-control element (MAC-CE), a physical layer control channel, or any combination thereof configured to indicate the quantity of antenna subarrays. In some aspects, the signaling may be transmitted semi-statically (e.g., an RRC configuration). Additionally, or alternatively, the devices 205 may dynamically transmit the signaling to indicate changes in quantities of antenna subarrays over time.

The receiving device 205-$e$ may use the indicated quantity of antenna subarrays to decode a channel between the transmitting device 205-$a$ and the receiving device 205-$e$ with relatively low complexity. In some aspects, the quantity of antenna subarrays at the transmitting device 205-$a$ and the quantity of antenna subarrays at the receiving device 205-$e$ may be integer multiples, and the integer multiple relationship between the first and second quantities of antenna subarrays may reduce processing and complexity associated with decoding the channel. In some other aspects, the first and second quantities of antenna subarrays may not be integer multiples, which may reduce aliasing and interference. In some aspects described herein, there may be a greatest common divisor that is an integer value greater than one between the first and second quantities, which may improve accuracy and reliability of the channel decoding. Methods for configuring such non-integer multiple quantities of antenna arrays having a greatest common divisor greater than one and decoding the channel are described in further detail elsewhere herein, including with reference to FIGS. 3-5.

Figure 3:
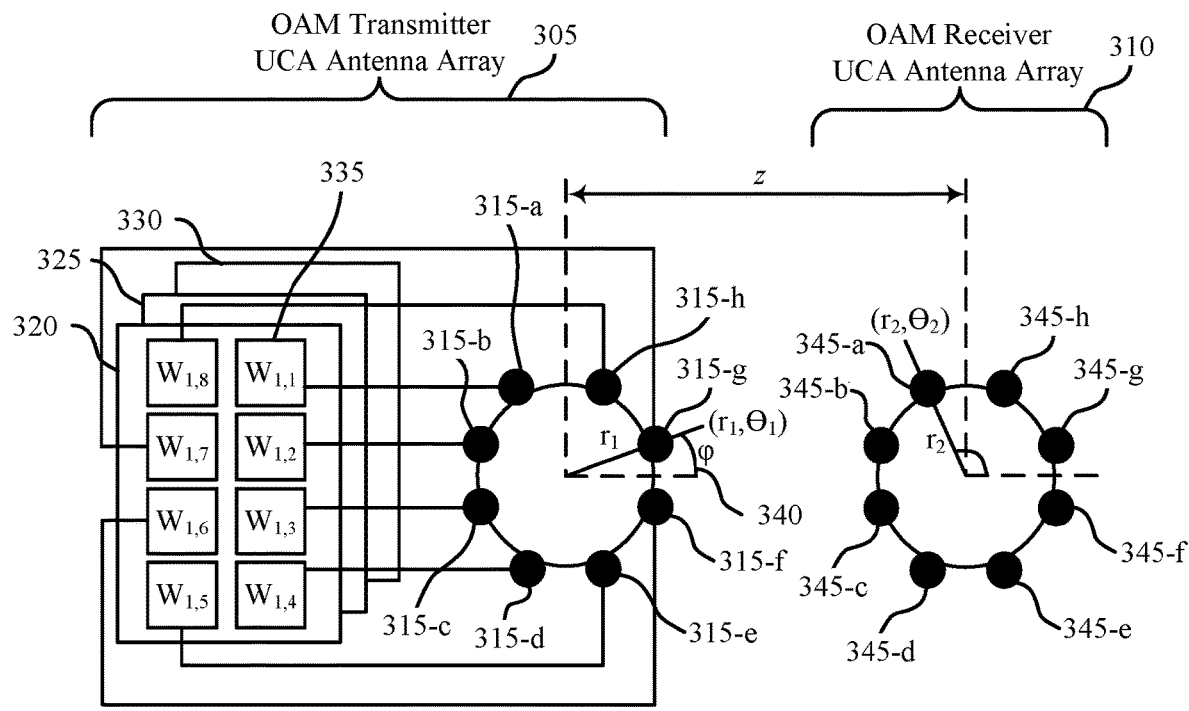
FIG. 3 illustrates an example of an OAM antenna array configuration that supports OAM multiplexing based on a common factor between quantities of transmit and receive antenna subarrays in accordance with one or more aspects of the present disclosure.

FIG. 3 illustrates an example of an OAM antenna array configuration 300 that supports OAM multiplexing based on a common factor between quantities of transmit and receive antenna subarrays in accordance with one or more aspects of the present disclosure. In some aspects, the OAM antenna array configuration 300 may implement aspects of wireless communications systems 100 or 200. In this example, a transmitting device (e.g., a UE, a base station, an RU, a DU, a CU, an IAB node or some other device) may include an OAM transmitter UCA antenna array 305 and a receiving device (e.g., a UE, a base station, an RU, a DU, a CU, an IAB node or some other device) may include an OAM receiver UCA antenna array 310.

In some aspects, one or both of the OAM transmitter UCA antenna array 305 or the OAM receiver UCA antenna array 310 may be implemented as a planar array of antenna elements, or individual antenna arrays or subarrays, which may be an example of or otherwise function as a (massive or holographic) MIMO array or an intelligent surface. In some cases, the transmitting device may identify a set of antenna subarrays 315 of the planar array that form a transmitter UCA (e.g., transmitter antenna subarrays 315-$a$, 315-$b$, 315-$c$, 315-$d$, 315-$e$, 315-$f$, 315-$g$, and 315-$h$), and a receiving device may identify a set of antenna subarrays 345 of the planar array that form a receiver UCA (e.g., receiver antenna subarrays 345-$a$, 345-$b$, 345-$c$, 345-$d$, 345-$e$, 345-$f$, 345-$g$, and 345-$h$).

Upon selecting the set of antenna subarrays from the planar array, the transmitting device may apply a weight 335 to each of the selected antenna subarrays 315 based on the OAM mode index l of the transmitted OAM beam and one or more spatial parameters associated with each antenna subarray 315. In cases in which a UCA methodology is used to generate an OAM beam, the transmitting device may identify the set of antenna subarrays 315 on a circular array of antenna elements and may apply a first set of weights 320 to each of the identified antenna subarrays 315 based on a first OAM mode index (e.g., l=0). Further, for other OAM mode indices, other weights may be used for the set of antenna subarrays 315, such as a second OAM mode index (e.g., l=+1) that may use a second set of weights 325 and a third OAM mode index (e.g., l=−1) that may use a third set of weights 330. Each OAM mode may be characterized by a different helical wave structure, as described with reference to FIG. 2. The helical wave structure for each mode may be generated by applying the respective set of weights to the antenna subarrays 315 of the transmitting device.

For example, to generate an OAM beam with an OAM mode index (e.g., l=0), the transmitting device may apply a weight 335 to each antenna subarray 315 on the UCA based on an angle 340 measured between a reference line on the UCA (e.g., the x-axis of the plane on which the UCA is located, where the origin is at the center of the UCA) and the antenna subarray 315, the OAM mode index l, and i (e.g., for complex-valued weights, which may alternatively be denoted as j in some cases). In some cases, for instance, the weight for an antenna element n may be proportional to $e^{i*l*\varphi_n}$, where $\varphi_n$ is equal to the angle 340 measured between the reference line on the UCA and the antenna element n. By multiplying respective beamforming weights 335 of each the sets of weights 320-330 (e.g., for first set of weights 320, $w_1=[w_{1,1}, w_{1,2}, \ldots, w_{1,8}]^T$) onto each antenna subarray 315, a signal port may be generated. If the weight 335 of each antenna subarray 315 is equal to $e^{i\varphi l}$, where $\varphi$ is the angle of an antenna subarray 315 in the circle (e.g., angle 340 for antenna subarray 315-g), and l is the OAM mode index, then each set of weights 320-330 provides a beamformed port that is equivalent to OAM mode l. By using different beamforming weights $e^{il\varphi'}$, where $l'\neq l$, multiple OAM modes are thus generated.

At the OAM receiver UCA antenna arrays 310, the receiving device may have receive antenna subarrays 345 equipped in a circle. The channel matrix may be denoted from each transmit antenna subarray 315 to each receive antenna subarray 345 as H, and then for the beamformed channel matrix $\tilde{H}=H\cdot[w_1, w_2, \ldots, w_L]$. Any two OAM weighting vectors of $[w_1, w_2, \ldots, w_L]$ (e.g., columns of $\tilde{H}$) may be orthogonal relative to each other, such that different OAM channels may not experience crosstalk. In some aspects, for N transmit antenna subarrays 315 and N receive antenna subarrays 345, the transfer matrix H may be found via discrete angular sampling using Equation 1, shown below.

$$H_{m,n} \propto \frac{\exp\left(jk\sqrt{z^2 + (r_1\cos\theta_1 - r_2\cos\theta_2)^2 + (r_1\sin\theta_1 - r_2\sin\theta_2)^2}\right)}{\sqrt{z^2 + (r_1\cos\theta_1 - r_2\cos\theta_2)^2 + (r_1\sin\theta_1 - r_2\sin\theta_2)^2}} = \frac{\exp\left(jk\sqrt{z^2 + r_1^2 + r_2^2 - 2r_1r_2\cos(\theta_1 - \theta_2)}\right)}{\sqrt{z^2 + r_1^2 + r_2^2 - 2r_1r_2\cos(\theta_1 - \theta_2)}} \quad (1)$$

In the example of Equation 1, beamformed ports may not experience crosstalk because of orthogonality between columns of the transfer matrix H. This may enable OAM-based communication to realize high-level spatial multiplexing more efficiently. Further, the eigen-based transmit precoding weights and receive combining weights of UCA-based OAM procedures may be equal to a matrix composed of DFT vectors. As the transfer matrix H is cyclic or circulant, eigenvectors of the transfer matrix H may be DFT vectors, as described in Equation 2.

$$v_u = \exp\left\{j\frac{2\pi\mu\nu}{N}\right\} \quad (2)$$

In the example of Equation 2, μ and ν may be integers within a range (e.g., μ=0, 1, . . . (N−1), ν=0, 1, . . . (N−1)), where μ is a vector index of a DFT vector and ν is the element index in each DFT vector. With respect to each OAM mode, the μ-th DFT vector may correspond to the μ-th OAM waveform. In some cases, the eigen modes may be identified by performing a singular value decomposition (SVD) on a transfer matrix. In some cases, with N transmit antenna subarrays 315 and receive antenna subarrays 345, all OAM modes (e.g., 0, 1, . . . (N−1) OAM modes) may be orthogonal at the receiver if any of them are transmitted, regardless of distance z and radii of the transmitter and receiver circles. In some cases, it may be beneficial to have both transmitter and receiver planes be co-axial and vertical to the z-axis, although the transmitter and the receiver antenna arrays may have angular offsets, or may be in other configurations.

In some aspects, a quantity of transmit antenna subarrays 315 (N) may be different than a quantity of receive antenna subarrays 345 (M). The quantity of antenna arrays on each device may be based on a condition of a channel between devices, a type of the device (e.g., an RU, a DU, a network entity 105, a UE 115, or some other type of device), a size of the device, one or more capabilities of the device, power consumption of the device, or any combination thereof. If the transmitting device is a different type of device or has different capabilities or power restraints than the receiving device, the quantity of transmit antenna subarrays 315 may be different than a quantity of receive antenna subarrays 345 (e.g., M≠N). In such cases, the transfer matrix H may not be circulant. If a maximum of the quantity of transmit or receive antenna arrays (e.g., max(M, N)) is not a multiple of a minimum of the quantity of transmit and receive antenna arrays (e.g., min(M, N)), the circulant property may not hold, such that a DFT vector may not be a left singular or right singular vector of the transfer matrix H. In such cases, calculating the eigenvectors of the transfer matrix may be relatively complex.

A method for performing an SVD of the transfer matrix when a quantity of transmit antenna subarrays 315 on the transmitting device is different than a quantity of receive antenna subarrays 345 on the receiving device is described. The quantity of transmit antenna subarrays 315 may be equal to a product of the quantity of receive antenna subarrays 345 and a non-integer rational number. That is, the quantity of transmit antenna subarrays 315 and the quantity of receive antenna subarrays 345 may be non-integer multiples, such that a product of the quantity of receive antenna subarrays 345 with any integer may not be equal to the quantity of transmit antenna subarrays 315 (e.g., there is no integer that, when multiplied by the quantity of transmit antenna subarrays 315, yields the quantity of receive antenna subarrays 345), or vice versa (e.g., there is no integer that, when multiplied by the quantity of receive antenna subarrays 345, yields the quantity of transmit antenna subarrays 315). For example, the relationship between the quantity of transmit antenna subarrays 315 and the quantity of receive antenna subarrays 345 may be represented by M=LN+r or N=LM+r, where L is an integer factor that is greater than zero and r is a non-zero integer remainder value, for any integer value of L. Additionally, or alternatively, the relationship may be represented by M=RN, where R is a non-integer rational number. A greatest common divisor (e.g., a greatest common denominator) of the quantity of transmit antenna subarrays 315 and the quantity of receive antenna subarrays 345 (e.g., d=gcd(M, N)) may be an integer number that is greater than one. The quantity of transmit antenna subarrays 315 may be divisible by a first set of one or more integers and the quantity of receive antenna subarrays 345 may be divisible by a second set of one or more integers without a remainder value. There may be one or more common integers that are included in both the first set and the second set. The greatest common divisor may be an integer of the one or more common integers that has a highest value of the one or more common integers. A product of the quantity of transmit antenna subarrays 315 and the quantity of receive antenna subarrays 345 may be equal to a product of the greatest common divisor and a least common multiple of the quantity of transmit antenna subarrays 315 and the quantity of receive antenna subarrays 345 (e.g., M*N=d*K, wherein K=lcm(M, N)).

If the quantity of transmit antenna subarrays 315 is equal to the quantity of receive antenna subarrays 345 and a non-integer rational number (e.g., the quantities are non-integer multiples) and a greatest common divisor of the quantity of transmit antenna subarrays 315 and the quantity of receive antenna subarrays 345 is an integer greater than one, then the solution of the SVD of the channel response may be simplified, in some aspects. Additionally, or alternatively, feedback messages that are exchanged between a transmitting and receiving device may include simplified information, which may reduce overhead and processing, among other advantages. Techniques for configuring such antenna subarrays and performing the SVD with reduced complexity based on the configuration to solve for beamforming vectors are described in further detail elsewhere herein, including with reference to FIGS. 4 and 5.

It is to be understood that antenna arrays including multiple antenna subarrays described herein may alternatively be referred to as transmitter circles or receiver circles. Further, the same circular antenna array may at times act as a transmitter circle and may at times act as a receiver circle, but may be referred to as one or the other for the sake of clarity in related descriptions. It is to be understood that any signaling described as received by a device having a transmitter circle could be received via the transmitter circle or via another antenna array, antenna subarray, or antenna element at the device (e.g., a separate receiver circle at the device or some other antenna array or element at the device). Similarly, any signaling described as transmitted by a device having a receiver circle could be transmitted via the receiver circle or via another antenna array, antenna subarray, or antenna element at the device (e.g., a separate transmitter circle at the device or some other antenna array or element at the device). Additionally, though referred to herein as transmit antenna subarrays 315 and receive antenna subarrays 345, it is to be understood that these aspects may alternatively be referred to as transmit antenna arrays and receive antenna arrays, each of which may include multiple antenna elements.

Figure 4:
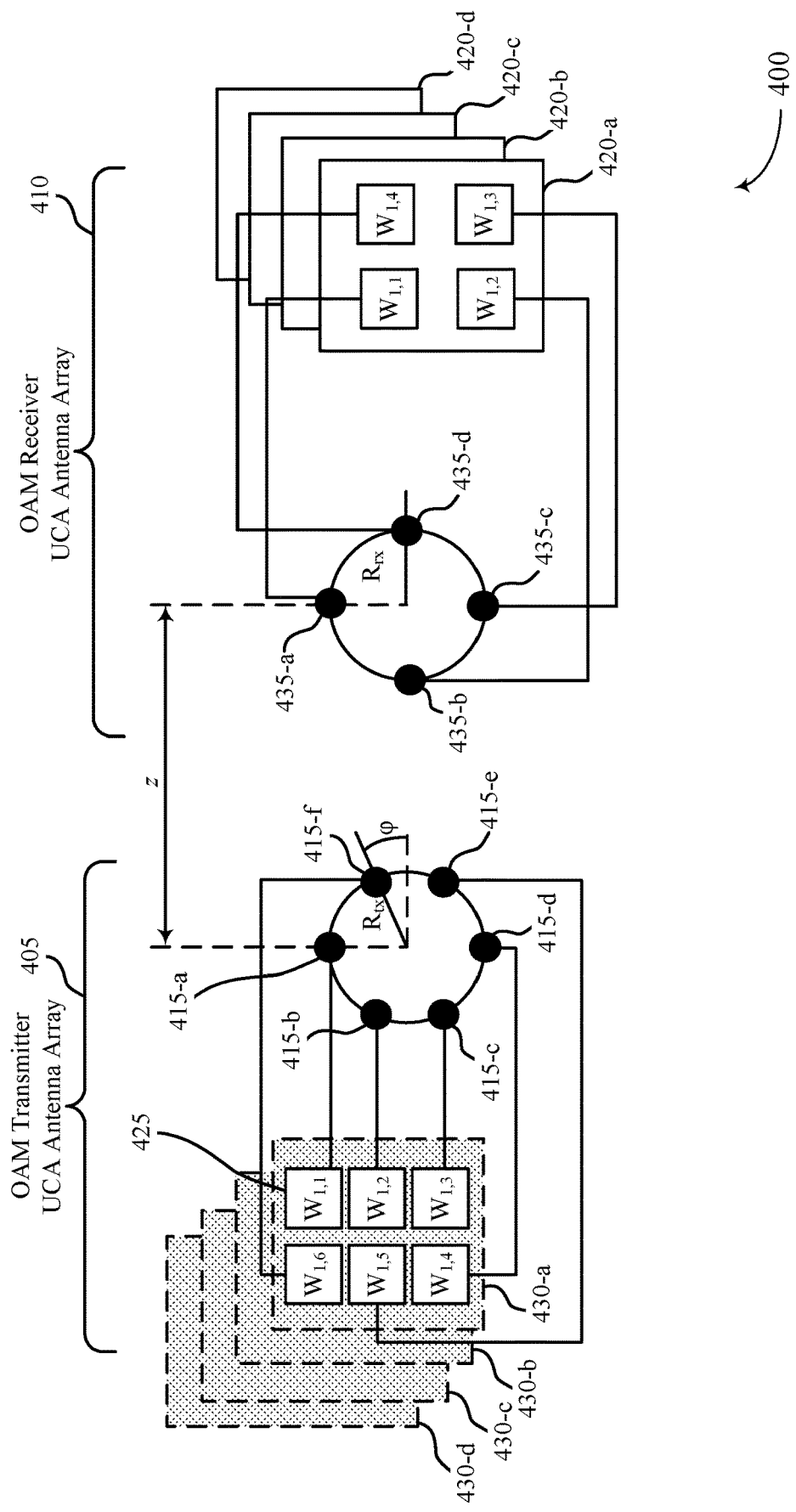
FIG. 4 illustrates an example of an OAM antenna array configuration that supports OAM multiplexing based on a common factor between quantities of transmit and receive antenna subarrays in accordance with one or more aspects of the present disclosure.

FIG. 4 illustrates an example of an OAM antenna array configuration 400 that supports OAM multiplexing based on a common factor between quantities of transmit and receive antenna subarrays in accordance with one or more aspects of the present disclosure. In some aspects, the OAM antenna array configuration 400 may implement or be implemented by aspects of the wireless communications systems 100 or 200 or the OAM antenna array configuration 300, as described with reference to FIGS. 1-3. In this example, a transmitting device (e.g., a UE, a base station, an RU, a DU, a CU, an IAB node or some other device) may include an OAM transmitter UCA antenna array 405 and a receiving device (e.g., a UE, a base station, an RU, a DU, a CU, an IAB node or some other device) may include an OAM receiver UCA antenna array 410.

In some aspects, the transmitting device may identify a set of antenna subarrays 415 of the planar array that form a transmitter UCA (e.g., transmitter antenna subarrays 415-$a$, 415-$b$, 415-$c$, 415-$d$, 415-$e$, and 415-$f$), and a receiving device may identify a set of antenna subarrays 435 of the planar array that form a receiver UCA (e.g., receiver antenna subarrays 435-$a$, 435-$b$, 435-$c$, and 435-$d$). A quantity of antenna subarrays 415 and 435 in each UCA may be based on a condition of a channel between the devices, a type of the device, a size of the device, one or more capabilities of the device, a beamforming and processing capacity of the device, power consumption of the device, or any combination thereof, as described with reference to FIGS. 2 and 3.

In some cases, upon selecting the set of antenna elements from the planar array, the transmitting device may apply a weight 425 to each of the selected antenna subarrays 415 based on an OAM mode index l of the transmitted OAM beam and one or more spatial parameters associated with each antenna subarray. As described with reference to FIG. 3, the receiving device may have receive antenna subarrays 435 equipped in a circle, and the receiving device may perform discrete angular sampling to identify a transfer matrix, H, for a beamformed channel between the devices using Equation 1. If the quantity of transmitter antenna subarrays 415 and the quantity of receiver antenna subarrays 435 is the same, the receiving device may identify the transfer matrix and use Equation 2 to determine the eigenvalues of the transfer matrix based on DFT vectors as the eigenvectors. The receiving device may use the DFT vectors to determine the weights 425 applied to the signal and decode the signals received from the transmitting device. Each weight 425 may, in some aspects, correspond to a DFT value for a DFT vector.

In the example of FIG. 4, however, the OAM transmitter UCA antenna array 405 of the transmitting device may include a first quantity (N) of transmit antenna subarrays 415, that may be different than a second quantity (M) of receive antenna subarrays 435 of the OAM receiver UCA antenna array 410 of the receiving device. The first quantity may be equal to a product of the second quantity and a rational number, such that the first quantity and the second quantity may not be integer multiples (e.g., N=LM+r, where L and r≠0 are both integers or M=RN, where R is a non-integer rational number), and a greatest common divisor (which may also be referred to as a denominator) of the first quantity and the second quantity may be an integer greater than one (e.g., d=gcd(M, N)>1). In this example, if K=lcm (M, N), then M*N=d*K, m=K/M, n=K/N, and m and n are co-prime. In the example of FIG. 4, N may be six and M may be four, such that K=1, r=2 (e.g., 6=4(1)+2), and R=⅔ (e.g., 6=4(⅔)). Additionally, the greatest common divisor of N and M may be two (e.g., d=2).

Non-integer multiple quantities of antenna subarrays may be desirable for OAM multiplexing in some systems. For example, communications between devices that include non-integer multiple quantities of antenna subarrays may be associated with reduced aliasing. Aliasing during OAM communications may reduce data throughput and a reliability of the communications. Aliasing may correspond to an underrepresentation of a system when the system is represented by finite samples. For example, sampling a continuous signal may create interference or may permit at least some misrepresentation of the continuous signal, which may be referred to as aliasing.

In the example of OAM communications, the receiver and transmitter circles may be quantized or digitized to include a finite quantity of antenna subarrays, which may represent the finite samples. For example, the receiving device may sample one or more signals received from the transmitting device at each receive antenna subarray 435, where the receive antenna subarrays 435 disposed in a circle may represent finite samples of the continuous circle. In the example of FIG. 4, the signal transmitted by the transmitting device may be sampled six times (e.g., at each transmitter antenna subarray 415), and the signal may be sampled at the receiving device four times (e.g., at each receiver antenna subarray 435). The receiving device may experience fluctuations or oscillations in the OAM modes used for communications due to interference captured by the finite antenna subarrays (e.g., the antenna subarrays may capture additional signaling or interference different than the intended OAM mode or may not capture signaling that is part of the intended OAM mode).

The transmitting device may excite or generate an OAM waveform by adjusting a phase of the waveform for each transmit antenna subarray 415. In the example of FIG. 4, the phase may change by around 61 degrees between each adjacent transmit antenna subarray 415. For example, the transmit antenna subarray 415-$f$ may have about a 60 degree phase shift relative to the transmit antenna subarray 415-*a*. The receiving device may attempt to receive and decode the signals from the transmitting device by applying a same angular shift between receive antenna subarrays 435. However, when the transmitting device excites the signals using the transmit antenna subarrays 415, one or more signals may be excited at each transmit antenna subarray 415, and each signal may be associated with a respective order of an OAM mode. For example, the transmit antenna subarray 415-*a* may excite signals having a 61 degree phase and signals having a phase of 2π+60, 4π+60, etc.

In some aspects, a higher-order OAM mode (e.g., an OAM mode with an index greater than six) may interfere with a lower-order OAM mode supported by the devices. The receiving device may not be able to distinguish the correct OAM mode from the interfering signals corresponding to other OAM modes. That is, because of the finite samples, the receiver may be unable to differentiate signals generated in accordance with OAM modes corresponding to a faster oscillation from signals generated in according with OAM modes corresponding to a slower oscillation.

Techniques described herein support reliable OAM communications between a transmitting device and a receiving device that have non-integer multiple quantities of antenna subarrays with a greatest common divisor that is greater than one. Systems in which the quantity of transmitter antenna subarrays 415 and the quantity of receiver antenna subarrays 435 are different and non-integer multiples may improve anti-aliasing performance and reduce the effects of aliasing. For example, an observed channel gain at the receiver device may not vary relatively quickly with relatively small changes in receiver position. That is, the receiving device may be able to distinguish higher-order OAM modes more reliably if the quantities of antenna subarrays are not the same.

A transmitting device may utilize a configuration of antenna subarrays 415 such that the quantity of the transmitter antenna subarrays 415 is not an integer multiple of a quantity of receiver antenna subarrays 435 to achieve robust performance against user mobility. The transmitting device may transmit control channels, data channels, or both using the described techniques. Such techniques may thereby improve coverage an enhance mobility and communication reliability.

However, a quantity of OAM modes that a device may use to generate orthogonally isolated signals may be based on or the same as a quantity of antenna subarrays of the device, and each OAM mode may correspond to a DFT vector of a same quantity of OAM weights to apply to the antenna subarrays, as discussed with reference to Equation 2. As such, in the example of FIG. 4, a first maximum quantity of DFT vectors and corresponding OAM modes for the transmitting device may be the same as the quantity of transmitter antenna subarrays 415 (e.g., modes 0, 1, . . . N−1, where each mode corresponds to a respective OAM vector, or set 430 of OAM weights 425), and a second maximum quantity of DFT vectors and corresponding OAM modes for the receiving device may be the same as the quantity of receiver antenna subarrays 435 (e.g., a quantity of M M-ary DFT vectors each including a set 420 of OAM weights 425). A maximum quantity of orthogonal OAM modes that may be used for communication between the two devices may correspond to the quantity of antenna subarrays in the circle with the smallest quantity of antenna subarrays (e.g., M or four in the example of FIG. 4).

As described herein, the transmitting device and the receiving device may utilize feedback information to perform OAM beamforming and determine beamforming vectors to use for communicating when quantities of antenna subarrays at each device are non-integer multiples and have a greatest common divisor that is greater than one. The transmitting device may transmit one or more signals, such as reference signals, to the receiving device. The transmitting device may utilize a set of OAM vectors for transmission of the one or more signals. For example, each signal may correspond to a respective OAM mode (e.g., may be transmitted by applying a respective set 430 of OAM weights 425), such that the one or more signals may correspond to a superposition of each of the OAM vectors or each of the sets 430. The receiving device may receive and decode the reference signals using one or more sets 420 of OAM weights 425 at the receiving device. The receiving device may perform a channel estimation procedure based on the one or more reference signals, which may be CSI reference signals, SRSs, or other types of reference signals. In some aspects, the channel estimation procedure may be performed by the transmitting device, the receiving device, or both (e.g., the transmitting and receiving devices may both transmit and receive reference signals). The channel estimation may be performed regardless of whether the antenna subarray quantities are the same or different. As such, the channel estimation procedure may not provide for increased overhead or latency.

The channel estimation procedure may include estimating a strength of the channel based on the one or more reference signals (e.g., pilot signals). In the example of FIG. 4, the transmitting device may transmit the reference signals to the receiving device. In some aspects, however, the device with fewer antenna subarrays may transmit the reference signals. The transmitting device may choose one or more transmitter antenna subarrays 415 for the channel estimation. The transmitting device may transmit the reference signals from the selected one or more antenna subarrays 415. If the transmitting device transmits the reference signal from more than one antenna subarray 415, each antenna subarray 415 and corresponding reference signal may be distinguishable based on code division multiplexing (CDM) or cyclic shifts applied to the reference signals. The receiving device may estimate multiple sets of channel gains for each selected transmitter antenna subarray 415 and each OAM mode. That is, for each transmit antenna subarray 415, the receiving device may estimate a set of channel gains including a respective channel gain between the transmit antenna subarray 415 and each receive antenna subarray 435. The full channel estimation may be characterized based on the estimation. For example, the estimation may be averaged for multiple transmitter antennas 415. Additionally, or alternatively, the transmitting device may transmit the reference signal from each transmitter antenna subarray 415, and the receiving device may estimate the channel based on channel gains between each receive antenna subarray 435 and each transmit antenna subarray 415. It is to be understood that, in some aspects, the receiving device may transmit the reference signals and the transmitting device may perform the channel estimation according to the described techniques.

The M by N channel response matrix, S, obtained based on the channel estimation procedure may be defined according to Equation 3, where an element, $h_{pq}$, corresponds to the channel response between the p-th receiver antenna subarray and q-th transmit antenna subarray:

$$S = \begin{bmatrix} h_{00} & h_{01} & \ldots & h_{0,N-1} \\ h_{10} & h_{11} & \ldots & h_{1,N-1} \\ \ldots & \ldots & \ldots & \ldots \\ h_{M-1,0} & h_{M-1,1} & \ldots & h_{M-1,N-1} \end{bmatrix} \quad (3)$$

In some cases (not illustrated in FIG. 4), the quantities of transmit antenna subarrays 415 and receive antenna subarrays 435 may be the same (e.g., M=N). In such cases, the channel response matrix may be circulant and include M unique entries. An SVD of the channel response matrix, which may be referred to as a channel response, may produce M-ary DFT vectors, as described with reference to FIG. 3. In other cases (also not shown in FIG. 4), the quantity of transmit antenna subarrays 415 may be an integer multiple of the quantity of receive antenna subarrays 435, or vice versa. In such cases, the channel response matrix may include a quantity of unique entries that is the same as the lowest quantity of antenna subarrays. The device with more antenna subarrays may divide a quantity of OAM modes associated with the respective quantity of antenna subarrays into a set of groups of OAM weighting vectors and combine the OAM weighting vectors in each group to obtain a same quantity of OAM weighting vectors to use for beamforming as the other device. In some other cases (also not shown in FIG. 4), the quantity of transmit antenna subarrays 415 may be mutually prime with the quantity of receive antenna subarrays 435 (e.g., non-integer multiples where lcm(M, N)=1). In such cases, there may not be repetition in the elements of the channel response matrix. As such, there may not be a circulant structure of the channel response matrix shown in Equation 3 based on the quantity of transmit antenna subarrays 415 (N) and the quantity of receive antenna subarrays 435 (M) not being the same, and based on an absence of an integer multiple relationship between the quantities. In such cases, the singular values may be approximated without directly solving the SVD of the channel matrix to reduce complexity.

In some aspects, the receiving device may perform an SVD of the channel response matrix. The receiving device may calculate left and right singular values of the channel response matrix based on the SVD and transmit an indication of the singular values to the transmitting device via a feedback message. The singular values of the channel response matrix may correspond to beamforming vectors of OAM weights 425 that the transmitting device may apply to the transmitter antenna subarrays 415 to generate and transmit orthogonal OAM signals to the receiving device. For example, each beamforming vector may correspond to a respective set 430 of OAM weights 425 of the sets 430-a, 430-b, 430-c, and 430-d illustrated in FIG. 4. A quantity of OAM weights 425 within each set 430 may be the same as the quantity of transmit antenna subarrays 415 within the transmitter circle, and the transmitting device may apply a respective OAM weight 425 of the set 430 to each transmit antenna subarray 415. A quantity of the beamforming vectors (e.g., the sets 430) may be the same as a quantity of the receiver antenna subarrays 435. Each signal transmitted by the transmitting device may thereby correspond to a superposition of each OAM weight 425 of a set 430 of OAM weights 425.

In some other aspects, the receiving device may transmit an indication of the channel response matrix to the transmitting device via the feedback message, and the transmitting device may calculate the SVD of the channel response matrix. The transmitting device may identify the singular values of the channel response matrix based on the SVD. The singular values may correspond to the beamforming vectors of the OAM weights 425 for the transmitting device to use (e.g., the sets 430-a through 430-d of OAM weights 425).

To reduce complexity, in some aspects, techniques are described herein to exploit the structure of the channel response matrix when the quantities of transmit antenna subarrays 415 and receive antenna subarrays 435 are different, when those two quantities are not integer multiples of one each other, and when a greatest common divisor of the two quantities is greater than one. In such cases, there may be repetition in the channel matrix due to the greatest common divisor. As such, processing complexity and power consumption by the devices may be reduced based on the described techniques for simplifying the SVD computation. Additionally, or alternatively, the devices may exchange a reduced quantity of information via the feedback message(s) based on the described techniques, which may reduce overhead, latency, and power consumption, and improve throughput and resource utilization.

Techniques for reducing complexity associated with solving for OAM weights 425 when N and M are non-integer multiples with a greatest common divisor greater than one are described herein. In the example of Equation 3 as applied to the non-integer multiple quantities of antenna subarrays having a greatest common divisor being an integer greater than one, as illustrated in FIG. 4, the full M by N channel response matrix, S, may include some redundant entries. For example, the channel response matrix, S, may be based on the discrete angular sampling, as described with reference to Equation 1. As such, the focus may be on the angular difference ($\theta_1 - \theta_2$) between antenna subarrays, where $\theta_1$ and $\theta_2$ may represent angles associated with a given transmit antenna subarray 415 and a corresponding receive antenna subarray 435, respectively, as illustrated and described with reference to FIG. 3. For a p-th receive antenna subarray 435 (from among M antenna subarrays 435) and a q-th transmit antenna subarray 415 (from among N transmit antenna subarrays 415), the angular difference may be represented by Equation 4.

$$\theta_1 - \theta_2 = \frac{2\pi}{M}p - \frac{2\pi}{N}q + \phi = \frac{2\pi}{K}(pm - qn) + \phi \quad (4)$$

In the example of Equation 4, $\phi$ may be a possible angular offset between an orientation of the transmit and receive circles (e.g., between the OAM transmitter UCA antenna array 405 and the OAM receiver UCA antenna array 410). p and q may represent index values of the antenna subarrays as the receiving device and the transmitting device, respectively (e.g., $p \in \{0, \ldots, M-1\}$ and $q \in \{0, \ldots, N-1\}$). Based on Equation 4, there may be at most K unique values of the angular difference ($\theta_1 - \theta_2$). Accordingly, the channel response matrix may include a quantity of independent elements that may be the same as a least common multiple (lcm) of M and N (e.g., K). The remaining elements in the channel response matrix may be cyclic repetitions of the independent elements.

In some aspects described herein, the redundant structure of the channel response matrix when M and N are not equal or integer multiples and have a greatest common divisor greater than one may be exploited to simplify an SVD calculation, which may be performed by the transmitting device, the receiving device, or both. For example, the optimal MIMO or OAM modes (e.g., the SVD of the channel response matrix) may be solved by solving a set of submatrices based on the channel response matrix. The DFT matrix of the channel response matrix (S), may be reduced by a factor of d in each dimension, where d may represent the greatest common divisor of M and N. The reduction may be due to the repetitive entries in the matrix S. That is, the DFT matrix of the M-by-N channel response matrix may be decomposed or divided into one or more submatrices each including (M/d) by (N/d) elements. The submatrix may be solved d times and the results may be concatenated to obtain the optimal MIMO modes (e.g., OAM weights). In the example of FIG. 4, where d is equal to two, the DFT matrix of the 24-element channel response matrix (S) may be divided or grouped into two submatrices each reduced by a factor of four (e.g., $d^2$).

The complexity of solving the full M-by-N channel response matrix, S, may be represented by $O(M^2N)$ if M is greater than N. By reducing the redundant elements in the channel response matrix by the factor of $d^2$, the complexity may also be reduced. For example, the complexity of solving the (M/d) by (N/d) submatrix may be represented by $$O\left(\frac{M^2N}{d^2}\right),$$

which may be a $d^2$-fold savings in complexity and processing by the wireless devices to determine which OAM modes to use for communications. In some aspects, a codebook for the SVD or OAM modes may be based on the smaller (e.g., reduced) dimensions of the submatrix. For example, the receiving device may feedback an index to a codebook that is associated with the OAM mode(s), and the codebook may be based on the reduced matrix dimensions in accordance with d>1.

In some aspects, the transmitting device may inform the receiving device about the OAM modes (e.g., MIMO modes) the transmitter uses for transmitting a signal to the receiving device. The transmitting device, the receiving device, or both may perform the SVD computation to determine the sets 430 and 420 of OAM weights 425 (e.g., the sets 430-a, 430-b, 430-c, and 430-d, as well as the sets 420-a, 420-b, 420-c, and 420-d) to be applied for transmission and reception of wireless signals exchanged between the devices. As described herein, the devices may exchange control information, feedback messages, or both that indicate information for simplifying the SVD calculation to reduce processing and latency, among other advantages.

Techniques, systems and devices described herein provide for reduced overhead associated with channel feedback, reduced processing and power consumption for calculations performed by the wireless devices, or both based on the redundancy in the channel response matrix when M and N are not equal or integer multiples and have a greatest common divisor greater than one. For example, instead of feeding back the full M-by-N channel response matrix, the receiving device may transmit a feedback message that indicates a channel response vector having K elements or the receiving device may transmit a feedback message that indicates K DFT values of the channel response vector. Techniques for the receiving device to derive and indicate the K-element channel vector, or the K DFT values, or both are described herein.

As described herein, the transmitting and receiving devices may exchange signaling during a configuration state or a connection establishment procedure to indicate quantities of antenna subarrays at each device. Additionally, or alternatively, each device may be deployed with a respective first quantity of antenna subarrays and configured to communicate with another device having a second quantity of antenna subarrays based on a numerical relationship between the first quantity and the second quantity. As such, the values of m, n, K, and d may be derived by each of the devices. The angular offset, ϕ, may not be known by the devices, in some cases. Each transmit antenna subarray 415 may be distinguishable by the receiving device. The receiving device may determine an index, p, of each respective transmit antenna subarray 415 based on a characteristic of a reference signal received from the transmitting device. For example, the index of each transmit antenna subarray 415 may be conveyed as a characteristic of the reference signal for channel sounding from the respective antenna subarray 415 (e.g., a code index, an index for DFT vectors, or the like).

The receiving device may map a channel response associated with a given pair of antenna subarrays (e.g., an antenna pair (p,q), where p represents the index of a receive antenna subarray 435 and q represents an index of a corresponding transmit antenna subarray 415) to a corresponding element in the K-element channel response vector. For example, the receiving device may map a channel response for each antenna subarray pair to an index of modulo K of (pm−qn) in the channel response vector, such that there may be K elements in the channel response vector. By performing such mapping, the receiving device may map d pairs of antenna subarrays (e.g., d (p,q) pairs) to the same element in the channel response vector. The estimation of the channel response between these d pairs may be averaged for the single element in the channel vector that is fed back to the transmitting device.

As such, the structure of the channel response matrix, S, may be exploited by downsampling the matrix to K, where K=lcm(M, N)=mM=nN. The resulting K-element channel response vector may be denoted by $c=[\tilde{h}_0, \tilde{h}_1, \ldots, \tilde{h}_{K-1}]$, where C is a circulant matrix and $C_{i,j}=C_{i-j}$ modulo K (e.g., C may be the channel matrix of a K by K channel). In some aspects, each element of C may be represented by Equation 5.

$$c_k = \frac{1}{\sqrt{K}}\sum_{\gamma=0}^{K-1} C(\gamma)\omega_K^{k\gamma}, \text{ where } \omega_K \triangleq \exp\left\{j\frac{2\pi}{K}\right\}, \text{ and } 0 \leq k \leq K \quad (5)$$

In the example of Equation 5, $\{\tilde{C}(\gamma)\}$ may be the DFT values of $\{c_k\}$ and may represent the spectrum of the circulant matrix C. The M-by-N channel matrix, S, as shown in Equation 3, may be viewed as an upsampled matrix from C. That is, the device may generate an upsampled matrix, $S_{i,j}$, where $S_{i,j}=C(mi-nj)$ modulo K, for all $0 \leq i \leq M$ and $0 \leq j \leq N$. The receiving device may transmit the K-element channel response vector via the feedback message, which may reduce complexity, overhead, and processing by the devices as compared with systems in which the receiving device transmits the full M-by-N channel response via the feedback message.

Additionally, or alternatively, the receiving device may perform a DFT of the channel response vector and transmit the K DFT values of the vector via the feedback message to the transmitting device. Feeding back the DFT values may improve efficiency of the wireless communications, as the DFT values may be directly used for computing the SVD of the channel to obtain the optimal OAM modes. If the quantity of transmit antenna subarrays 415 is not the same as the quantity of receive antenna subarrays 435 (e.g., M≠N), the DFT values of the channel response may not necessarily be the SVD of the channel response (e.g., as may be true if M=N, as described with reference to Equation 2). However, even if M≠N, as illustrated in FIG. 4, the K DFT values may be correlated to the SVD calculation, as described in further detail herein.

To obtain a DFT matrix, the receiving device may take an M-point (e.g., or N-point) DFT along each row of the matrix $S_{i,j}$. The DFT matrix that is obtained (e.g., $A_{\alpha,\beta}$) may be represented by Equation 6.

$$A_{\alpha,\beta} \triangleq \frac{1}{\sqrt{MN}} \sum_{0 \le i < M} \sum_{0 \le j < N} \omega_M^{-i\alpha} S_{i,j} \omega_N^{j\beta} \quad (6)$$

$$= \frac{1}{\sqrt{MN}} \sum_{0 \le i < M} \sum_{0 \le j < N} \omega_M^{-i\alpha} c_{mi-nj} \omega_N^{j\beta}$$

$$= \frac{1}{\sqrt{MN}} \sum_{0 \le i < M} \sum_{0 \le j < N} \omega_M^{-i\alpha} \left\{ \frac{1}{\sqrt{K}} \sum_{0 \le \gamma < K} \tilde{C}(\gamma) \omega_K^{(mi-nj)\gamma} \right\}$$

$$= \frac{\sqrt{d}}{\sqrt{MN}} \sum_{0 \le \gamma < K} \tilde{C}(\gamma) \sum_{0 \le \alpha < M} \omega_M^{i(\gamma-\alpha)} \sum_{0 \le \beta < N} \omega_N^{j(\beta-\gamma)}$$

The DFT matrix may be further simplified based on Equation 7.

$$\sum_{0 \le \alpha < M} \omega_M^{i(\gamma-\alpha)} \sum_{0 \le \beta < N} \omega_N^{j(\beta-\gamma)} = \begin{cases} MN & \text{if } \gamma \equiv \alpha(\text{mod}M) \text{ and } \gamma \equiv \beta(\text{mod}N) \\ 0 & \text{otherwise} \end{cases} \quad (7)$$

Because Equation 7 is true, an index set of $\Gamma(\alpha, \beta)=\{0 \le \gamma < K | \gamma \equiv \alpha \bmod M, \gamma \equiv \beta \bmod N\}$ may be defined, and the DFT matrix may be simplified according to Equation 8.

$$A_{\alpha,\beta} = \sqrt{d} \sum_{\gamma \in \Gamma(\alpha,\beta)} \tilde{C}(\gamma) \quad (8)$$

Based on the Chinese Remainder Theorem, $\Gamma(\alpha, \beta)$ may be a singleton only if $\alpha-\beta$ is a multiple of d. As such, the DFT Matrix, A, may be a sparse matrix and every one out of d entries may be non-zero. Remaining entries may be zero (e.g., based on the repetition in the channel response matrix, S, due to the greatest common divisor, d, being greater than one). That is, the DFT matrix may include a set of null entries based on the identical or repetitive entries in the channel response matrix and the corresponding upsampled matrix, where null entries may correspond to entries that are empty or have a value of zero. In the example of FIG. 4, where there are six transmit antenna subarrays 415 and four receive antenna subarrays 435, d may be equal to two. As such, at least half of the entries in the DFT matrix may be non-zero (e.g., one out of every two entries may be non-zero), and the remaining entries may be zero or null.

The receiving device may, in some aspects, transmit the sparse DFT matrix, A, via the feedback message. In some aspects, some of the DFT values may be relatively small, which may reduce an amount of information that is transmitted via the feedback message. In some aspects, a threshold may be configured and the receiving device may refrain from feeding back DFT values associated with magnitudes that are lower than the threshold. Additionally, or alternatively, quantization of different values may be adjusted to reduce the feedback and thereby reduce overhead and improve resource utilization.

The transmitting device may thereby receive, via the feedback message, an indication of a K-element channel response vector, information based on a DFT matrix, or an indication of a set of DFT values (e.g., the DFT matrix, A). If the transmitting device receives the K-element channel response vector (e.g., or the full M-by-N channel response matrix, S), the transmitting device may generate the upsampled matrix $S_{i,j}$ and perform the DFT to obtain the DFT matrix, A. In some aspects, the transmitting device may transmit control information or feedback information via a control channel to the receiving device. The control information may indicate the DFT matrix, if, for example, the transmitting device calculates the DFT based on receiving the channel response via the feedback message. In such cases, the mode vectors in the control channel may be those of the DFT matrix, A. As such, the receiving device may construct the OAM modes of the transmitted signal by taking an inverse fast Fourier transform (IFFT) of the DFT matrix. In some aspects, the transmitting device may additionally, or alternatively, perform the SVD and obtain the OAM modes.

To obtain the OAM modes with reduced complexity, the devices may leverage the reduced feedback information and the greatest common divisor between the quantities of transmit and receive antenna subarrays. For example, the SVD of the DFT matrix may be constructed in terms of SVDs of d smaller matrices (referred to as submatrices herein) each having a size of (M/d) by (N/d). The submatrices may be downsized from the DFT matrix by a factor of d in each dimension (e.g., a quantity of columns and a quantity of rows may be reduced by a factor of d). Each of the d submatrices may be represented by Equation 9.

$$B_{k,l}^{(\delta)} \triangleq A_{\delta+dk,\delta+dl}, 0 \le \delta < d, 0 \le k < \left(\frac{M}{d}\right), 0 \le l < \left(\frac{N}{d}\right) \quad (9)$$

The SVD of each of the submatrices may be denoted by $B^{(\delta)}=U^{(\delta)}\Lambda^{(\delta)}V^{(\delta)}$, which may imply that Equation 10 is true.

$$B_{k,l}^{(\delta)} = \sum_{s=1}^{r_\delta} \mu_s^{(\delta)} U_{k,s}^{(\delta)} V_{s,l}^{(\delta)}, 0 \le r_\delta = \text{rank}(B^{(\delta)}) \le \min\left(\frac{M}{d}, \frac{N}{d}\right) \quad (10)$$

The device may thereby obtain d SVDs associated with the d submatrices. It may be shown that the singular values of A may be obtained by taking a union of the singular values of each of the submatrices $B^{(\delta)}$. The singular vectors of A may be obtained by upsampling, by a factor of d (e.g., d-fold upsampling), and zero-filling the singular modes of $B^{(\delta)}$ with a shift of δ (e.g., shuffling and reordering the elements), as shown by Equation 11.

$$A_{i,j} = \sum_{\delta=0}^{d-1} \sum_{s=1}^{r_\delta} \mu_s \tilde{U}_{\delta;s,i} \tilde{V}_{\delta;s,j}, \text{ wherein} \quad (11)$$

$$\tilde{U}_{\delta;s,i} \triangleq \begin{cases} U_{k,s}^{(\delta)} & \text{if } i \bmod d = \delta, \text{ and } k \triangleq \frac{i-\delta}{d}, \text{ and} \\ 0 & \text{if } i \bmod d \ne \delta \end{cases}$$

-continued $$\tilde{V}_{\delta;s,j} \triangleq \begin{cases} V_{s,l}^{(\delta)} & \text{if } j \bmod d = \delta, \text{ and } l \triangleq \frac{j-\delta}{d}, \\ 0 & \text{if } j \bmod d \neq \delta \end{cases}$$

That is, each OAM mode vector may be determined based on an IFFT of the DFT matrix, A, where each OAM mode vector may include N elements and may be constructed by shifting, up-sampling, and zero-filling shorter mode vectors with N/d elements. The mode strength (e.g., data rate, packet format) of each OAM mode may correspond to a union of those of the modes of the smaller matrix.

Equations 12-15 show an example SVD calculation of a DFT matrix, A, as applied to the example illustrated in FIG. 4. Equations 12-15 represent an SVD calculation when M=4, N=6, K=12, and d=2, as illustrated in FIG. 4.

$$A = \sqrt{2}\begin{bmatrix} \tilde{C}(0) & 0 & \tilde{C}(8) & 0 & \tilde{C}(4) & 0 \\ 0 & \tilde{C}(1) & 0 & \tilde{C}(9) & 0 & \tilde{C}(5) \\ \tilde{C}(6) & 0 & \tilde{C}(2) & 0 & \tilde{C}(10) & 0 \\ 0 & \tilde{C}(7) & 0 & \tilde{C}(3) & 0 & \tilde{C}(11) \end{bmatrix} \quad (12)$$

$$B^{(0)} = \sqrt{2}\begin{bmatrix} \tilde{C}(0) & \tilde{C}(8) & \tilde{C}(4) \\ \tilde{C}(6) & \tilde{C}(2) & \tilde{C}(10) \end{bmatrix} = U^{(0)}\Lambda^{(0)}V^{(0)} \quad (13)$$

$$= \begin{bmatrix} U_{0,1}^{(0)} & U_{0,2}^{(0)} \\ U_{1,1}^{(0)} & U_{1,2}^{(0)} \end{bmatrix}\begin{bmatrix} \mu_1^{(0)} & 0 \\ 0 & \mu_2^{(0)} \end{bmatrix}\begin{bmatrix} V_{1,0}^{(0)} & V_{1,1}^{(0)} & V_{1,2}^{(0)} \\ V_{2,0}^{(0)} & V_{2,1}^{(0)} & V_{2,2}^{(0)} \end{bmatrix}$$

$$B^{(1)} = \sqrt{2}\begin{bmatrix} \tilde{C}(1) & \tilde{C}(9) & \tilde{C}(5) \\ \tilde{C}(7) & \tilde{C}(3) & \tilde{C}(11) \end{bmatrix} = U^{(1)}\Lambda^{(0)}V^{(1)} \quad (14)$$

$$= \begin{bmatrix} U_{0,1}^{(0)} & U_{0,2}^{(0)} \\ U_{1,1}^{(0)} & U_{1,2}^{(0)} \end{bmatrix}\begin{bmatrix} \mu_1^{(0)} & 0 \\ 0 & \mu_2^{(0)} \end{bmatrix}\begin{bmatrix} V_{1,0}^{(0)} & V_{1,1}^{(0)} & V_{1,2}^{(0)} \\ V_{2,0}^{(0)} & V_{2,1}^{(0)} & V_{2,2}^{(0)} \end{bmatrix}$$

$$A = \begin{bmatrix} U_{0,1}^{(0)} & 0 & U_{0,2}^{(0)} & 0 \\ 0 & U_{0,1}^{(1)} & 0 & U_{0,2}^{(1)} \\ U_{1,1}^{(0)} & 0 & U_{1,2}^{(0)} & 0 \\ 0 & U_{1,1}^{(1)} & 0 & U_{1,2}^{(1)} \end{bmatrix} \quad (15)$$

$$\begin{bmatrix} \mu_1^{(0)} & 0 & 0 & 0 \\ 0 & \mu_1^{(1)} & 0 & 0 \\ 0 & 0 & \mu_2^{(0)} & 0 \\ 0 & 0 & 0 & \mu_2^{(1)} \end{bmatrix}\begin{bmatrix} V_{1,0}^{(0)} & 0 & V_{1,1}^{(0)} & 0 & V_{1,2}^{(0)} & 0 \\ 0 & v_{1,0}^{(1)} & 0 & V_{1,1}^{(1)} & 0 & V_{1,2}^{(1)} \\ V_{2,0}^{(0)} & 0 & U_{1,2}^{(0)} & 0 & V_{2,2}^{(0)} & 0 \\ 0 & V_{2,0}^{(1)} & 0 & V_{2,1}^{(1)} & 0 & V_{2,2}^{(1)} \end{bmatrix}$$

As shown by Equation 12, every other element of the DFT matrix may be zero (e.g., null). Equations 13 and 14 show two submatrices (e.g., $B^{(0)}$ and $B^{(1)}$) that may be constructed from the sparse DFT matrix, A. The two submatrices may be obtained by extracting the non-zero entries from A. The device may solve the SVD of $B^{(0)}$ and $B^{(1)}$. A complexity associated with solving the smaller submatrices may be less than a complexity associated with solving the full DFT matrix, A, by at least a cubic factor, which may reduce processing and power consumption by the devices.

If the transmitting device receives channel state feedback from the receiving device (e.g., the K-element channel response vector), the transmitting device may determine the OAM modes based on the described computations. Processing, latency, and power consumption by the transmitting device may be reduced based on the computations described herein leveraging the channel structure when M and N have a greatest common divisor that is greater than one. The transmitting device may indicate the selected OAM modes to the receiving device via control information. For example, the transmitting device may transmit a codebook or an index to a codebook, and the codebook may quantify the smaller vector(s) (e.g., the vector(s) having N/d elements). The receiving device may construct the OAM modes by taking an IFFT. The indication of the smaller vectors may reduce overhead as compared with systems in which the transmitting device transmits an indication of each of the full vectors.

Additionally, or alternatively, the receiver may solve the SVD for the K-by-K channel response matrix (e.g., the subsampled matrix) by solving d submatrices as described herein to make the OAM mode selection, and the receiving device may transmit a feedback message to the transmitting device that indicates the OAM modes. In some other aspects, both the transmitting and receiving device may perform the OAM mode computations simultaneously, or at least partially concurrently.

As such, the transmitting device, the receiving device, or both may utilize the described techniques to calculate the singular values with reduced complexity by leveraging the greatest common divisor of M and N. The approximated singular values may correspond to the beamforming vectors for transmission of orthogonal OAM signals. Stated alternatively, each of the calculated singular values may correspond to a respective set 430 of OAM weights 425 for the transmitting device to use for communications. Each of the sets 430-*a* through 430-*d* may correspond to a respective beamforming vector.

For example, the transmitting device (e.g., the device with more antenna elements) may support a first quantity of OAM modes and corresponding OAM weighting vectors that is the same as the quantity of transmitter antenna subarrays 415 (e.g., N). The receiving device may support a second quantity of OAM modes and corresponding OAM weighting vectors that is the same as the quantity of receiver antenna subarrays 435 (e.g., M). To determine the first quantity of OAM weighting vectors to be used by the transmitting device, the devices may calculate singular vectors of a channel response based on reference signals transmitted between the devices and the corresponding channel estimation procedures described herein. The devices may exchange control information and feedback information to assist with the calculation process. The receiving device (e.g., the device having fewer antenna elements) may utilize the M OAM weighting vectors initially supported by the receiving device, which may correspond to the M sets 420 of OAM weights 425 (e.g., the sets 420-*a*, 420-*b*, 420-*c*, and 420-*d*).

Although FIG. 4 illustrates more transmitter antenna subarrays 415 than receiver antenna subarrays 435, it is to be understood that either device may have more antenna subarrays than the other. For example, in some cases there may be more receiver antenna subarrays 435 than transmitter antenna subarrays 415, and the described methods and properties may still apply. In some aspects, the receiving device may transmit the reference signals and the transmitting device may perform the channel estimation procedure and transmit a feedback message to the receiving device.

Additionally, or alternatively, in some aspects, the transmitting device and the receiving device may exchange reference signals, and each device may perform its own channel estimation based on the reference signals assuming that the channel is reciprocal (e.g., channel conditions in one direction are the same as channel conditions in the other direction). For example, one side may transmit the reference signals, which may correspond to the channel matrix at the respective side of the communication, and the other side may receive the reference signals and estimate the channel matrix. Such reciprocity of the channel may ensure that channels for both directions of communication are the same. In either case (e.g., with and without channel feedback), the methods of determining the OAM modes may remain substantively similar.

In some other aspects described herein, the transmitting and receiving devices may utilize groupings between pairs of antenna subarrays at the devices to assist with obtaining the OAM modes. The transmitting device may decompose OAM modes and indicate the distinguished OAM modes to the receiving device instead of indicating a distinction between each transmit antenna subarray 415. For example, the antenna subarrays may be grouped into d sets at each device, and the devices may exchange reference signals according to the antenna subarray grouping. The N transmit antenna subarrays 415 may be divided or grouped into d sets of transmit antenna subarrays 415 and the M receive antenna subarrays 435 may be divided or grouped into d sets of receive antenna subarrays 435. The antenna subarrays in each group may be consecutive or staggered (e.g., alternating). In the example of FIG. 4, the transmit antenna subarrays 415 may be divided into two sets: a first set including the transmit antenna subarrays 415-a, 415-c, and 415-e; and a second set including the transmit antenna subarrays 415-b, 415-d, and 415-f. The receive antenna subarrays 435 may be divided into two sets, including: a first set including the receive antenna subarrays 435-a and 435-c; and a second set including the receive antenna subarrays 435-b and 435-d.

The sets of antenna subarrays may be indexed according to index values (0, 1, . . . , d−1). Each set of transmit antenna subarrays 415 may be paired with a respective or corresponding set of receive antenna subarrays 435 having the same index value. As described with reference to FIGS. 2 and 3, the transmitting device may be configured with a same quantity of OAM modes (e.g., DFT vectors) as the quantity of transmit antenna subarrays 415 (e.g., N). As such, when the transmit antenna subarrays are divided into d sets that each include N/d transmit antenna subarrays 415, the transmitting device may apply N/d-point OAM modes (e.g., DFT vectors) to the N/d transmit antenna subarrays 415 in each set to generate reference signals.

The transmitting device may transmit the reference signals from each set in a time division multiplexing (TDM) manner, a frequency division multiplexing (FDM) manner, or a hybrid TDM and FDM manner. For example, the transmitting device may transmit reference signals from each set of transmit antenna subarrays 415 at different times (e.g., TDM). Or, the transmitting device may transmit reference signals from each set of transmit antenna subarrays 415 at the same time but using different OAM modes and corresponding DFT vectors (e.g., FDM).

The receiving device may receive the reference signals by applying M/d-point DFT vectors as OAM modes to the M/d receive antenna subarrays 435 in each respective set. The receiving device may observe a channel response of each of the d antenna set pairs. The channel response for each pair may be mapped to a submatrix represented by $\mu_\delta \tilde{U}_\delta \tilde{V}_\delta^H$. The receiving device may, in some cases, transmit a feedback message that indicates the channel response for each of the d antenna set pairs, the submatrix for each pair, or both Additionally, or alternatively, the transmitting device may independently generate the submatrices based on the OAM modes generated at the transmitting device.

The overall DFT matrix, A, may subsequently be obtained (e.g., by the transmitting device, the receiving device, or both) by concatenating the submatrices. The derivation of A may be simplified based on the common divisor being greater than one. For example, the overall DFT matrix may be obtained by upsampling, by a factor of d (e.g., d-fold upsampling), and zero-filling the singular modes of $B^{(\delta)}$ with a shift of δ, as shown by Equation 11.

The transmitting device may thereby sound reference signals in one of two manners. In a first aspect, the transmitting device may sound the reference signals subarray by subarray. That is, the transmitting device may transmit reference signals that include information to distinguish a respective transmit antenna subarray 415 and receive antenna subarray 435 pair. The receiving device may obtain a channel response matrix with entries corresponding to each antenna subarray pair, or a K-element channel response vector with no zero entries. The devices may perform a DFT of the channel response leveraging the greatest common divisor to obtain the OAM modes. In a second aspect, the transmitting device may sound the reference signals OAM mode by OAM mode. For example, the transmitting device may transmit reference signals based on N/d-point DFT vectors corresponding to the OAM modes and the receiving device may receive the reference signals using M/d-point DFT vectors corresponding to the OAM modes. The devices may obtain multiple (e.g., d) DFT submatrices and concatenate an SVD of each of the d submatrices to obtain the OAM modes.

In any aspect described herein, the structure of the channel when the quantity of transmit antenna subarrays 415 is a non-integer multiple of the quantity of receive antenna subarrays 435 and the quantities share a greatest common divisor that is an integer greater than one may be leveraged to reduce an amount of control and feedback information exchanged between the devices, as well as an amount of processing complexity associated with computations by the devices.

In some aspects, the transmitter antenna subarrays 415 may be aligned with the receiver antenna subarrays 435. That is, the antenna subarrays on each device may be installed or dynamically adjusted or activated such that they are aligned along a first axis (e.g., a horizontal or vertical axis) as well as rotationally (e.g., the transmitter antenna subarrays 415 may be aligned with the receiver antenna subarrays 435 in various rotational axes). Additionally, or alternatively, any angular offset may be applied between antenna subarrays. For example, OAM communications may support relatively high-order spatial multiplexing, and in some aspects, angular offsets between antenna subarrays may be configured to optimize orthogonality between signals and improve data throughput.

Figure 5:
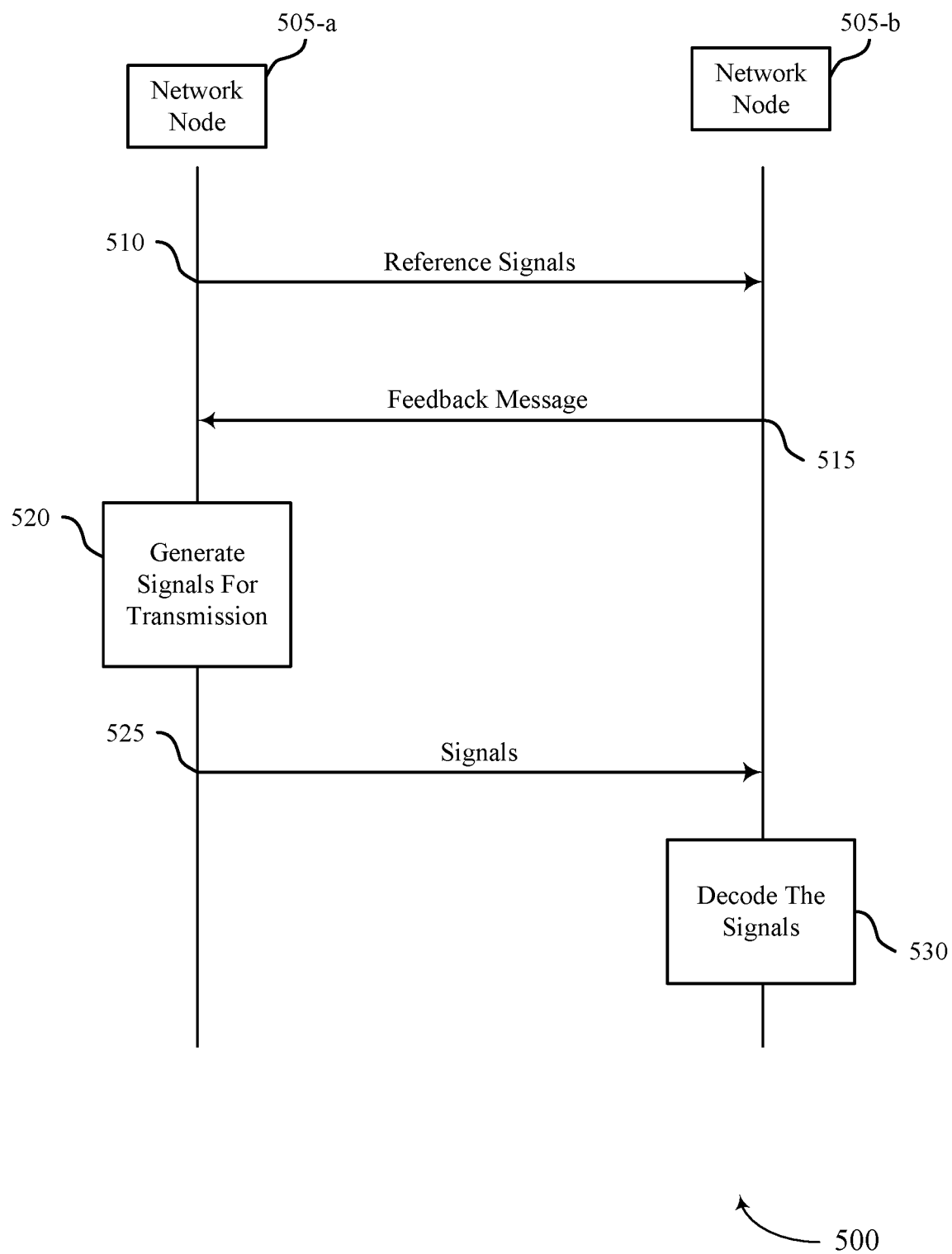
FIG. 5 illustrates an example of a process flow that supports OAM multiplexing based on a common factor between quantities of transmit and receive antenna subarrays in accordance with one or more aspects of the present disclosure.

FIG. 5 illustrates an example of a process flow 500 that supports OAM multiplexing based on a common factor between quantities of transmit and receive antenna subarrays in accordance with one or more aspects of the present disclosure. The process flow 500 may implement or be implemented by aspects of the wireless communications systems 100 and 200 or the OAM antenna array configurations 300 and 400. For example, the process flow 500 illustrates OAM communications between a network node 505-a and a network node 505-b, which may represent aspects of corresponding devices or network nodes as described with reference to FIGS. 2-4. The network nodes 505 may be UEs, network entities, IAB nodes, RUs, CUs, DUs, any other network node, or any combination thereof, that support OAM communications.

The network node 505-a may include a first circular antenna array including a first quantity of antenna subarrays and the network node 505-b may include a second circular antenna array including a second quantity of antenna subarrays, where the first and second quantities are different. Each antenna subarray may include one or more antenna elements. In some aspects, the first quantity of antenna subarrays may be equal to a product of the second quantity of antenna subarrays and a rational number (e.g., the first and second quantities of antenna subarrays may not be integer multiples of on another). A greatest common divisor of the first quantity and the second quantity may be an integer that is greater than one.

In the following description of the process flow 500, the operations between the network node 505-a and the network node 505-b may be performed in different orders or at different times. Some operations may also be left out of the process flow 500, or other operations may be added. Although the network node 505-a and the network node 505-b are shown performing the operations of the process flow 500, some aspects of some operations may also be performed by one or more other wireless devices.

At 510, in some aspects, the network node 505-a may transmit a set of one or more reference signals to the network node 505-b. The network node 505-a may cause the transmission of the set of one or more reference signals via a first quantity of antenna subarrays of a first circular antenna array at the network node 505-a. The network node 505-b may receive the set of one or more reference signals via a second quantity of antenna subarrays of a second circular antenna array at the network node 505-b. In some aspects, each reference signal may be associated with a respective OAM vector of a set of multiple OAM vectors (e.g., OAM modes), and the transmission of the one or more reference signals (e.g., a concurrent or overlapping transmission) may correspond to a superposition of the multiple OAM vectors. The network node 505-a may transmit the reference signals based on the OAM vectors and the network node 505-b may receive and decode the reference signals based on the OAM vectors. As described with reference to FIG. 4, the reference signals may be transmitted and received by different antenna subarrays of the first and second circular antenna subarrays, or the first and second quantities of antenna subarrays may be grouped into a same quantity of groups, and the reference signals may be transmitted per antenna group.

At 515, in some aspects, the network node 505-b may transmit a feedback message to the network node 505-a based on receiving the set of one or more reference signals. The network node 505-b may perform a channel response measurement procedure based on the reference signals and transmit a result of the channel response measurement procedure to the network node 505-a via the feedback message. In some aspects, the network node 505-b may determine a channel response vector based on the reference signals, and the feedback message may indicate the channel response vector. A quantity of elements in the channel response vector may be equal to a least common multiple of the first quantity and the second quantity of antenna subarrays. In some other aspects, the network node 505-b may determine or calculate a DFT matrix including the DFT values corresponding to multiple DFT vectors, and the feedback message may indicate the DFT matrix. A quantity of DFT values may be equal to the least common multiple of the first quantity and the second quantity of antenna subarrays, and OAM vectors for communications between the network node 505-a and the network node 505-b may be based on the DFT vectors.

In some aspects, the network node 505-a may determine OAM vectors based on the information obtained via the feedback message. For example, if the feedback message indicates a channel response vector, the network node 505-a may determine a DFT matrix based on the channel response vector. The network node 505-a may perform an SVD of the channel response based on the DFT matrix, or the network node 505-a may transmit a control message to the network node 505-b that indicates the DFT matrix and the network node 505-b may perform the SVD, or both. In some other aspects, if the feedback message indicates a DFT matrix, the network node 505-a may perform an SVD based on the DFT matrix to determine a set of OAM vectors. The network node 505-b may similarly perform the SVD to determine the set of OAM vectors, or the network node 505-a may transmit a control message that indicates the set of OAM vectors.

At 520, the network node 505-a may generate one or more signals for transmission from the first circular antenna array of the network node 505-a to the second circular antenna array of the network node 505-b. At 525, the network node 505-a may transmit the one or more signals to the network node 505-b using the first circular antenna array. The network node 505-a may transmit the one or more signals via the first circular antenna array and based on a set of multiple OAM vectors. The network node 505-b may receive the one or more signals at the second circular antenna array of the network node 505-b. At 530, the network node 505-b may decode the one or more signals using the second circular antenna array and based on a set of multiple OAM vectors. Each signal may be associated with a respective OAM vector of the set of multiple OAM vectors.

The set of multiple OAM vectors used by the devices may be based on a numerical relationship between the first quantity of antenna subarrays of the first circular antenna array at the network node 505-a and the second quantity of antenna subarrays of the second circular antenna array at the network node 505-b. The numerical relationship may correspond to the first quantity being equal to a product of the second quantity and a non-integer rational number (e.g., the first quantity and the second quantity being non-integer multiples) and a greatest common divisor of the first quantity and the second quantity being an integer that is greater than one. The set of multiple OAM vectors may be determined based on the information exchanged via the feedback and control messages. In some aspects, the information exchanged between the network nodes 505 and the processing complexity associated with determining the OAM vectors may be reduced based on the numerical relationship between the first and second quantities of antenna subarrays. For example, because the greatest common divisor of the first and second quantities is an integer greater than one, the network nodes 505 may simplify calculations of the OAM vectors, as described in further detail elsewhere herein, including with reference to FIG. 4.

Figure 6:
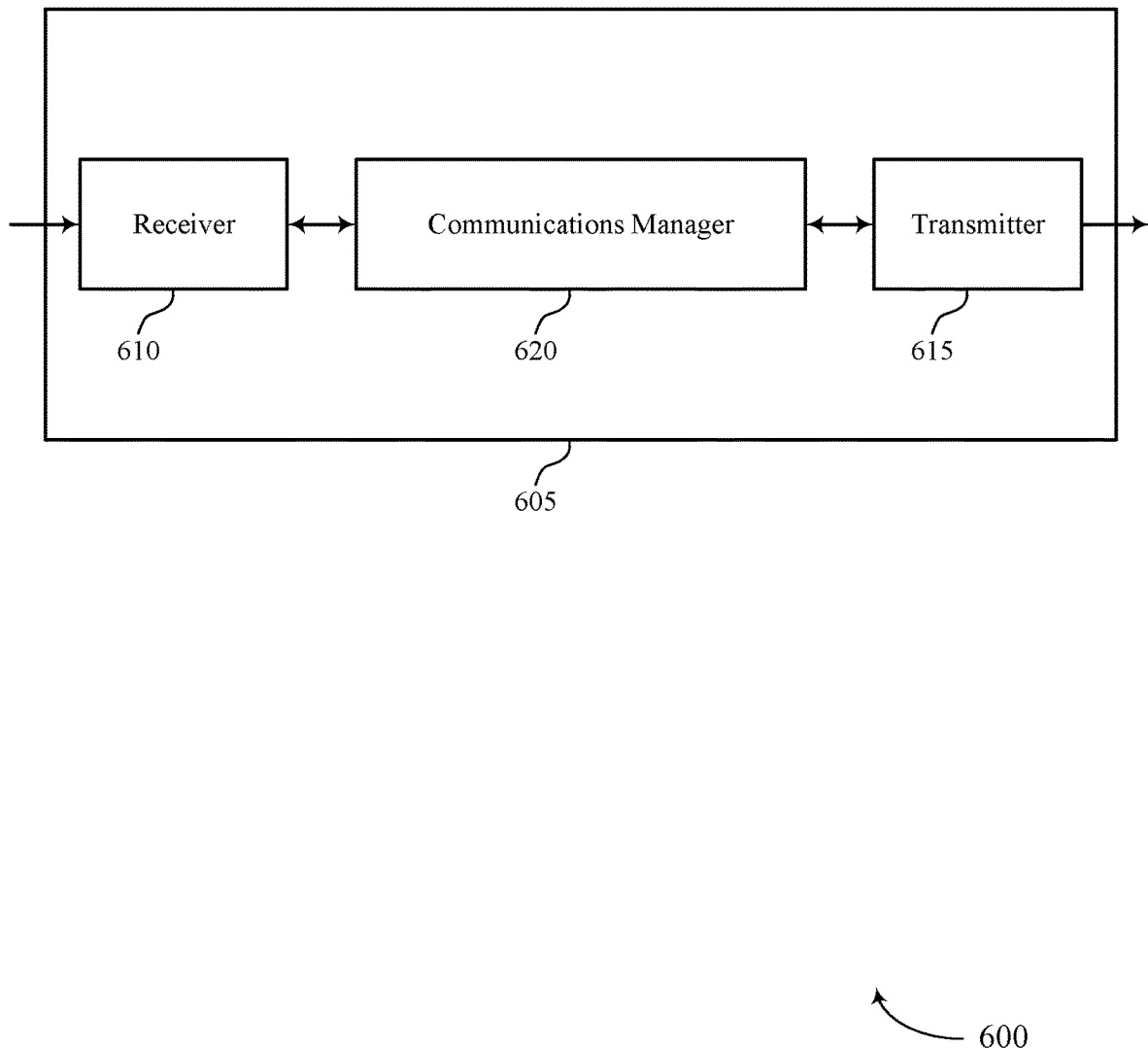
FIGS. 6 and 7 show block diagrams of devices that support OAM multiplexing based on a common factor between quantities of transmit and receive antenna subarrays in accordance with one or more aspects of the present disclosure.

FIG. 6 shows a block diagram 600 of a device 605 that supports OAM multiplexing based on a common factor between quantities of transmit and receive antenna subarrays in accordance with one or more aspects of the present disclosure. The device 605 may be an example of aspects of a UE 115 or a network entity 105 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to OAM multiplexing based on a common factor between quantities of transmit and receive antenna subarrays). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to OAM multiplexing based on a common factor between quantities of transmit and receive antenna subarrays). In some aspects, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of OAM multiplexing based on a common factor between quantities of transmit and receive antenna subarrays as described herein. For example, the communications manager 620, the receiver 610, the transmitter 615, or various combinations or components thereof may support a method for performing one or more of the functions described herein.

In some aspects, the communications manager 620, the receiver 610, the transmitter 615, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some aspects, a processor and memory coupled with the processor may be configured to perform one or more of the functions described herein (e.g., by executing, by the processor, instructions stored in the memory).

Additionally, or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some aspects, the communications manager 620 may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communication at a first network node in accordance with examples as disclosed herein. For example, the communications manager 620 may be configured as or otherwise support a means for generating one or more signals for transmission from the first network node via a first circular antenna array including a first quantity of antenna subarrays, where each antenna subarray of the first circular antenna array includes one or more antenna elements. The communications manager 620 may be configured as or otherwise support a means for causing transmission of the one or more signals via the first circular antenna array, where transmission of each signal of the one or more signals may be based on a respective OAM vector of a set of multiple OAM vectors, where the set of multiple OAM vectors is based on a numerical relationship between the first quantity of antenna subarrays of the first circular antenna array and a second quantity of antenna subarrays of a second circular antenna array, and where each antenna subarray of the second circular antenna array includes one or more antenna elements. In some aspects, the numerical relationship may include the first quantity being equal to a product of the second quantity and a non-integer rational number and the first quantity and the second quantity having a greatest common divisor that is an integer that is greater than one.

Additionally, or alternatively, the communications manager 620 may support wireless communication at a first network node in accordance with examples as disclosed herein. For example, the communications manager 620 may be configured as or otherwise support a means for receiving one or more signals via a first circular antenna array, the first circular antenna array including a first quantity of antenna subarrays, where each antenna subarray of the first circular antenna array includes one or more antenna elements. The communications manager 620 may be configured as or otherwise support a means for decoding each of the one or more signals received via the first circular antenna array based on a respective OAM vector of a set of multiple OAM vectors, where the set of multiple OAM vectors is based on a numerical relationship between the first quantity of antenna subarrays of the first circular antenna array and a second quantity of antenna subarrays of a second circular antenna array, and where each antenna subarray of the second circular antenna array includes one or more antenna elements. In some aspects, the numerical relationship may include the first quantity being equal to a product of the second quantity and a non-integer rational number and the first quantity and the second quantity having a greatest common divisor that is an integer that is greater than one.

By including or configuring the communications manager 620 in accordance with examples as described herein, the device 605 (e.g., a processor controlling or otherwise coupled with the receiver 610, the transmitter 615, the communications manager 620, or a combination thereof) may support techniques for reduced processing, reduced power consumption, and more efficient utilization of communication resources, among other advantages.

Figure 7:
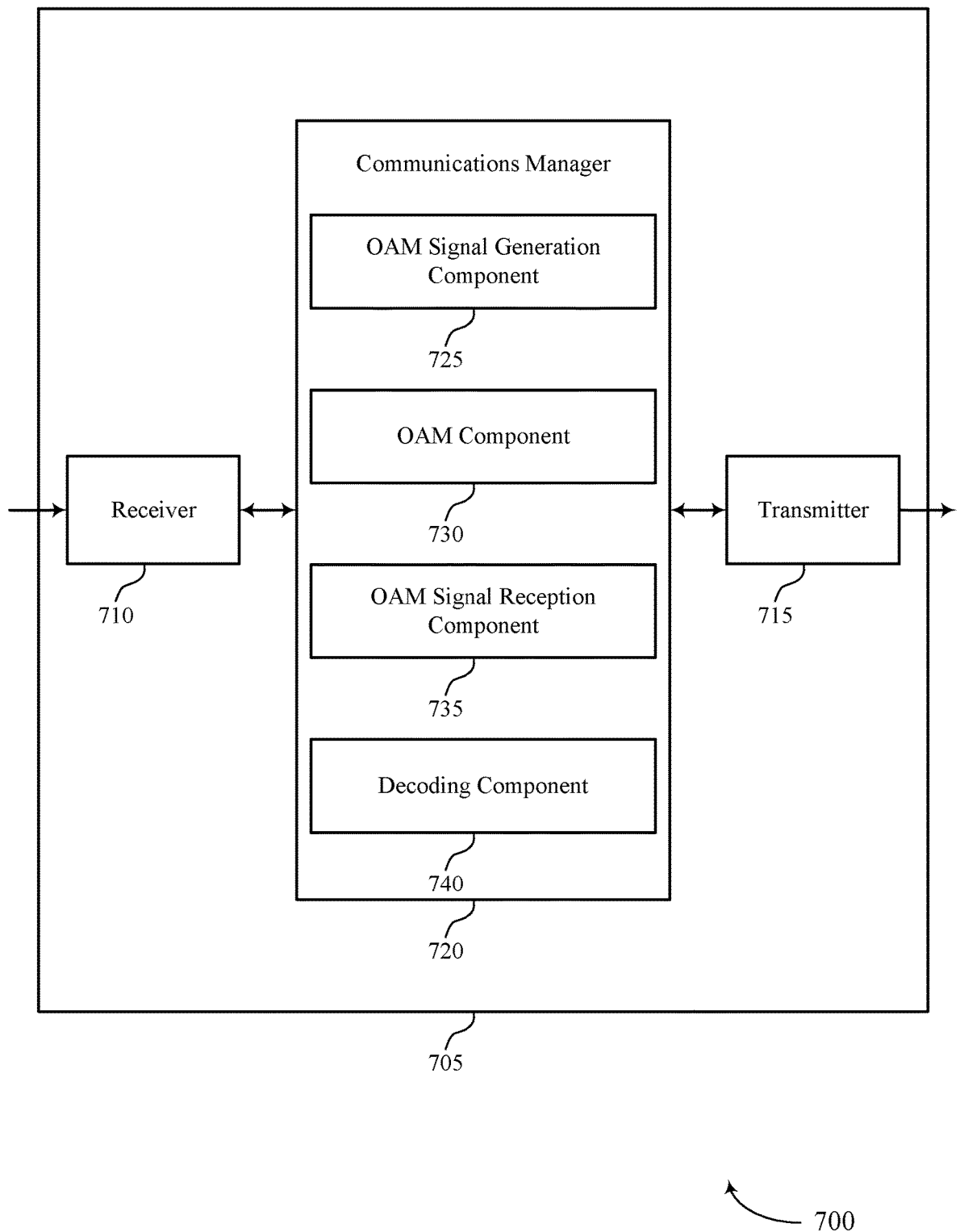

FIG. 7 shows a block diagram 700 of a device 705 that supports OAM multiplexing based on a common factor between quantities of transmit and receive antenna subarrays in accordance with one or more aspects of the present disclosure. The device 705 may be an example of aspects of a device 605, a UE 115, or a network entity 105 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to OAM multiplexing based on a common factor between quantities of transmit and receive antenna subarrays). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to OAM multiplexing based on a common factor between quantities of transmit and receive antenna subarrays). In some aspects, the transmitter 715 may be co-located with a receiver 710 in a transceiver module. The transmitter 715 may utilize a single antenna or a set of multiple antennas.

The device 705, or various components thereof, may be an example of means for performing various aspects of OAM multiplexing based on a common factor between quantities of transmit and receive antenna subarrays as described herein. For example, the communications manager 720 may include a OAM signal generation component 725, a OAM component 730, a OAM signal reception component 735, a decoding component 740, or any combination thereof. The communications manager 720 may be an example of aspects of a communications manager 620 as described herein. In some aspects, the communications manager 720, or various components thereof, may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communication at a first network node in accordance with examples as disclosed herein. The OAM signal generation component 725 may be configured as or otherwise support a means for generating one or more signals for transmission from the first network node via a first circular antenna array including a first quantity of antenna subarrays, where each antenna subarray of the first circular antenna array includes one or more antenna elements. The OAM component 730 may be configured as or otherwise support a means for causing transmission of the one or more signals via the first circular antenna array, where transmission of each signal of the one or more signals may be based on a respective OAM vector of a set of multiple OAM vectors, where the set of multiple OAM vectors is based on a numerical relationship between the first quantity of antenna subarrays of the first circular antenna array and a second quantity of antenna subarrays of a second circular antenna array, and where each antenna subarray of the second circular antenna array includes one or more antenna elements. In some aspects, the numerical relationship may include the first quantity being equal to a product of the second quantity and a non-integer rational number and the first quantity and the second quantity having a greatest common divisor that is an integer that is greater than one.

Additionally, or alternatively, the communications manager 720 may support wireless communication at a first network node in accordance with examples as disclosed herein. The OAM signal reception component 735 may be configured as or otherwise support a means for receiving one or more signals via a first circular antenna array, the first circular antenna array including a first quantity of antenna subarrays, where each antenna subarray of the first circular antenna array includes one or more antenna elements. The decoding component 740 may be configured as or otherwise support a means for decoding each of the one or more signals received via the first circular antenna array based on a respective OAM vector of a set of multiple OAM vectors, where the set of multiple OAM vectors is based on a numerical relationship between the first quantity of antenna subarrays of the first circular antenna array and a second quantity of antenna subarrays of a second circular antenna array, and where each antenna subarray of the second circular antenna array includes one or more antenna elements. In some aspects, the numerical relationship may include the first quantity being equal to a product of the second quantity and a non-integer rational number and the first quantity and the second quantity having a greatest common divisor that is an integer that is greater than one.

Figure 8:
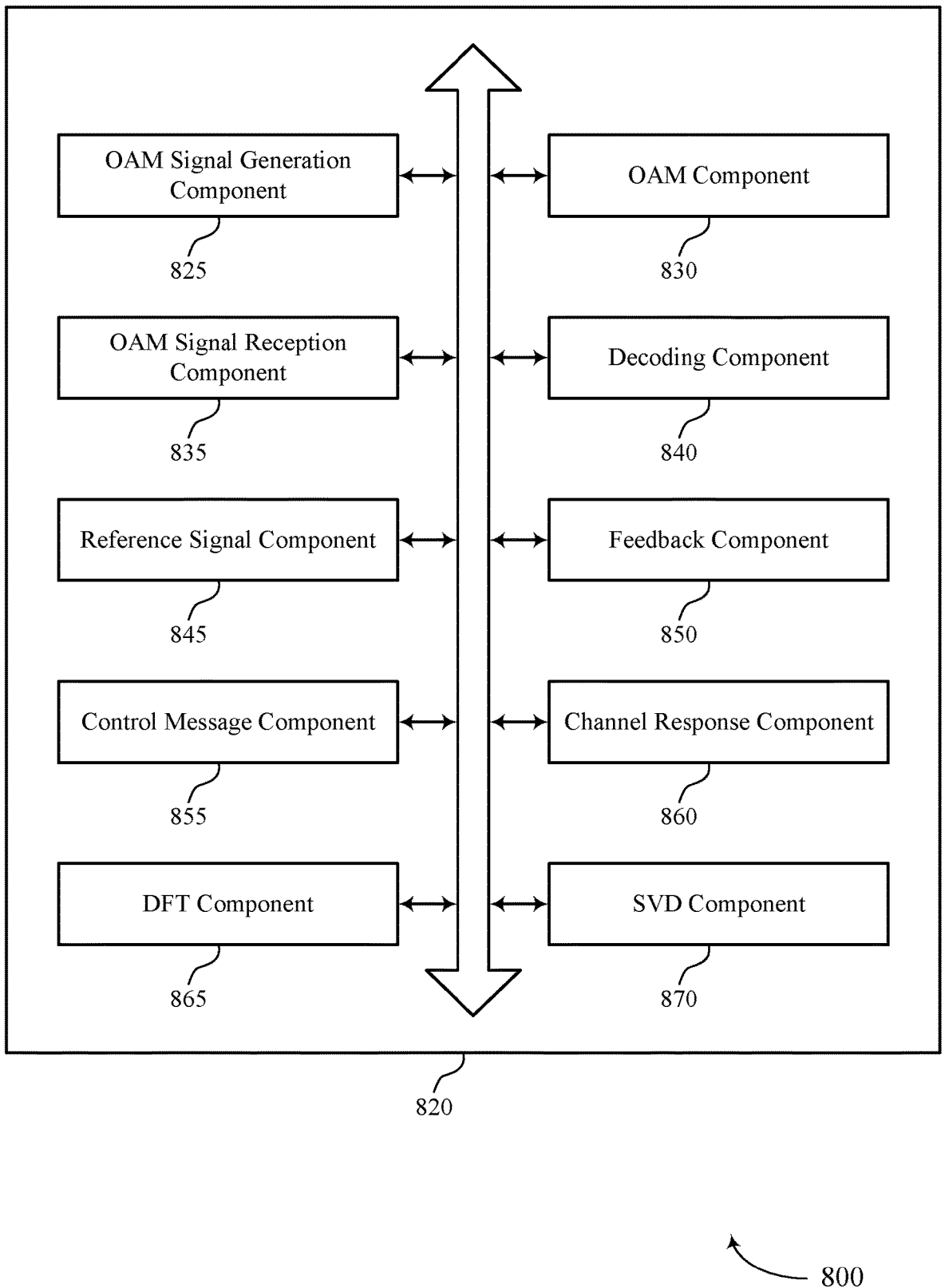
FIG. 8 shows a block diagram of a communications manager that supports OAM multiplexing based on a common factor between quantities of transmit and receive antenna subarrays in accordance with one or more aspects of the present disclosure.

FIG. 8 shows a block diagram 800 of a communications manager 820 that supports OAM multiplexing based on a common factor between quantities of transmit and receive antenna subarrays in accordance with one or more aspects of the present disclosure. The communications manager 820 may be an example of aspects of a communications manager 620, a communications manager 720, or both, as described herein. The communications manager 820, or various components thereof, may be an example of means for performing various aspects of OAM multiplexing based on a common factor between quantities of transmit and receive antenna subarrays as described herein. For example, the communications manager 820 may include a OAM signal generation component 825, a OAM component 830, a OAM signal reception component 835, a decoding component 840, a reference signal component 845, a feedback component 850, a control message component 855, a channel response component 860, a DFT component 865, an SVD component 870, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 820 may support wireless communication at a first network node in accordance with examples as disclosed herein. The OAM signal generation component 825 may be configured as or otherwise support a means for generating one or more signals for transmission from the first network node via a first circular antenna array including a first quantity of antenna subarrays, where each antenna subarray of the first circular antenna array includes one or more antenna elements. The OAM component 830 may be configured as or otherwise support a means for causing transmission of the one or more signals via the first circular antenna array, where transmission of each signal of the one or more signals may be based on a respective OAM vector of a set of multiple OAM vectors, where the set of multiple OAM vectors is based on a numerical relationship between the first quantity of antenna subarrays of the first circular antenna array and a second quantity of antenna subarrays of a second circular antenna array, and where each antenna subarray of the second circular antenna array includes one or more antenna elements. In some aspects, the numerical relationship may include the first quantity being equal to a product of the second quantity and a non-integer rational number and the first quantity and the second quantity having a greatest common divisor that is an integer that is greater than one.

In some aspects, the reference signal component 845 may be configured as or otherwise support a means for causing transmission, via the first quantity of antenna subarrays, of a set of multiple reference signals to the second circular antenna array at a second network node. In some aspects, the feedback component 850 may be configured as or otherwise support a means for receiving a feedback message that indicates a channel response vector based on the set of multiple reference signals, where a quantity of elements in the channel response vector is equal to a least common multiple of the first quantity of antenna subarrays of the first circular antenna array and the second quantity of antenna subarrays of the second circular antenna array.

In some aspects, the DFT component 865 may be configured as or otherwise support a means for determining, based on the channel response vector, an upsampled matrix, the upsampled matrix having at least two identical entries based on the greatest common divisor of the first quantity and the second quantity being the integer greater than one. In some aspects, the DFT component 865 may be configured as or otherwise support a means for determining a DFT matrix based on the upsampled matrix, where the DFT matrix includes a quantity of null entries based on the subsampled matrix having at least two identical entries. In some aspects, the control message component 855 may be configured as or otherwise support a means for transmitting a control message that indicates the DFT matrix, where the DFT matrix is associated with the set of multiple OAM vectors, where the DFT matrix is based on the upsampled matrix, and where the DFT matrix includes a quantity of null entries based on the upsampled matrix having at least two identical entries.

In some aspects, the reference signal component 845 may be configured as or otherwise support a means for causing transmission, via the first quantity of antenna subarrays, of a set of multiple reference signals to the second circular antenna array at a second network node. In some aspects, the feedback component 850 may be configured as or otherwise support a means for receiving a feedback message that indicates channel response information related to the set of multiple OAM vectors or information for obtaining the set of multiple OAM vectors based on the set of multiple reference signals.

In some aspects, the feedback message indicates a DFT matrix including a quantity of DFT values, the quantity of DFT values equal to a least common multiple of the first quantity of antenna subarrays of the first circular antenna array and the second quantity of antenna subarrays of the second circular antenna array. In some aspects, the set of multiple OAM vectors is based on the quantity of DFT values.

In some aspects, the DFT component 865 may be configured as or otherwise support a means for determining a quantity of submatrices of the DFT matrix, the quantity equal to the greatest common divisor of the first quantity and the second quantity. In some aspects, the SVD component 870 may be configured as or otherwise support a means for determining an SVD of each submatrix of the quantity of submatrices, where the set of multiple OAM vectors is based on a combination of the SVDs of the quantity of submatrices.

In some aspects, the control message component 855 may be configured as or otherwise support a means for causing transmission of a codebook that indicates the set of multiple OAM vectors, where a size of the codebook is based on the greatest common divisor of the first quantity and the second quantity.

In some aspects, the first quantity of antenna subarrays of the first circular antenna array includes a set of first antenna groups and the second quantity of antenna subarrays of the second circular antenna array includes a set of second antenna groups, the set of second antenna groups and the set of first antenna groups both including a quantity of antenna groups that is equal to the greatest common divisor of the first quantity and the second quantity, and the reference signal component 845 may be configured as or otherwise support a means for causing transmission, via each first antenna group of the set of first antenna groups, a respective set of one or more reference signals to a respective second antenna group of the set of second antenna groups.

In some aspects, causing transmission of each of the respective sets of one or more reference signals is based on a respective subset of OAM vectors of the set of multiple OAM vectors. In some aspects, a quantity of OAM vectors in each respective subset of OAM vectors is equal to the greatest common divisor of the first quantity and the second quantity.

In some aspects, the feedback component 850 may be configured as or otherwise support a means for receiving, via the first circular antenna array and based on the sets of reference signals, a feedback message that indicates a DFT matrix associated with the set of multiple OAM vectors, where a quantity of entries in the DFT matrix is less than a product of the first quantity of antenna subarrays of the first circular antenna array and the second quantity of antenna subarrays of the second circular antenna array based on the greatest common divisor of the first quantity and the second quantity being the integer greater than one.

In some aspects, the reference signal component 845 may be configured as or otherwise support a means for causing transmission of each respective set of reference signals at a different time than each other respective set of reference signals. In some aspects, the reference signal component 845 may be configured as or otherwise support a means for causing transmission of each respective set of reference signals concurrently and based on a respective subset of OAM vectors of the set of multiple OAM vectors.

Additionally, or alternatively, the communications manager 820 may support wireless communication at a first network node in accordance with examples as disclosed herein. The OAM signal reception component 835 may be configured as or otherwise support a means for receiving one or more signals via a first circular antenna array including a first quantity of antenna subarrays, where each antenna subarray of the first circular antenna array includes one or more antenna elements. The decoding component 840 may be configured as or otherwise support a means for decoding each of the one or more signals received via the first circular antenna array based on a respective OAM vector of a set of multiple OAM vectors, where the set of multiple OAM vectors is based on a numerical relationship between the first quantity of antenna subarrays of the first circular antenna array and a second quantity of antenna subarrays of a second circular antenna array, and where each antenna subarray of the second circular antenna array includes one or more antenna elements. In some aspects, the numerical relationship may include the first quantity being equal to a product of the second quantity and a non-integer rational number and the first quantity and the second quantity having a greatest common divisor that is an integer that is greater than one.

In some aspects, the reference signal component 845 may be configured as or otherwise support a means for receiving, via the first quantity of antenna subarrays, a set of multiple reference signals from the second quantity of antenna subarrays of the second circular antenna array at a second network node. In some aspects, the channel response component 860 may be configured as or otherwise support a means for determining a channel response vector based on the set of multiple reference signals. In some aspects, the feedback component 850 may be configured as or otherwise support a means for causing transmission, based on the channel response vector, of a feedback message that indicates information for determining the set of multiple OAM vectors.

In some aspects, to support determining the channel response vector, the channel response component 860 may be configured as or otherwise support a means for determining a set of multiple channel response values based on receiving the set of multiple reference signals via the first circular antenna array, where each channel response value of the set of multiple channel response values is associated with a respective pair of antenna subarrays including a first antenna subarray of the first quantity of antenna subarrays and a second antenna subarray of the second quantity of antenna subarrays. In some aspects, to support determining the channel response vector, the channel response component 860 may be configured as or otherwise support a means for grouping the set of multiple channel response values into a quantity of groups, where each group of the quantity of groups corresponds to a respective element in the channel response vector, where the quantity of groups is equal to a least common multiple of the first quantity of antenna subarrays of the first circular antenna array and the second quantity of antenna subarrays of the second circular antenna array, and where the feedback message indicates the channel response vector.

In some aspects, the DFT component 865 may be configured as or otherwise support a means for determining, based on the channel response vector, an upsampled matrix, the upsampled matrix having at least two identical entries based on the greatest common divisor of the first quantity and the second quantity being the integer greater than one. In some aspects, the DFT component 865 may be configured as or otherwise support a means for determining a DFT matrix based on the upsampled matrix, where the DFT matrix includes a quantity of null entries based on the upsampled matrix having at least two identical entries.

In some aspects, the feedback message indicates the DFT matrix, the DFT matrix including a quantity of DFT values that is equal to a least common multiple of the first quantity of antenna subarrays of the first circular antenna array and the second quantity of antenna subarrays of the second circular antenna array. In some aspects, the DFT matrix is associated with the set of multiple OAM vectors.

In some aspects, the DFT component 865 may be configured as or otherwise support a means for determining a quantity of submatrices of the DFT matrix, the quantity equal to the greatest common divisor of the first quantity and the second quantity. In some aspects, the SVD component 870 may be configured as or otherwise support a means for determining a respective SVD for each submatrix of the quantity of submatrices, where the set of multiple OAM vectors is based on a combination of the respective SVDs.

In some aspects, the feedback message indicates the channel response vector, and the control message component 855 may be configured as or otherwise support a means for receiving, based on the channel response vector indicated via the feedback message, a control message that indicates a DFT matrix including a quantity of DFT values, the quantity of DFT values equal to a least common multiple of the first quantity of antenna subarrays of the first circular antenna array and the second quantity of antenna subarrays of the second circular antenna array. In some aspects, the feedback message indicates the channel response vector, and the DFT component 865 may be configured as or otherwise support a means for determining an inverse Fourier transform of the DFT matrix, where the set of multiple OAM vectors is based on the inverse Fourier transform of the DFT matrix.

In some aspects, the inverse Fourier transform of the DFT matrix corresponds to a set of multiple mode vectors including a quantity of elements that is less than the first quantity of antenna subarrays in the first circular antenna array, and the OAM component 830 may be configured as or otherwise support a means for determining the set of multiple OAM vectors based on upsampling the set of multiple mode vectors to increase the quantity of elements in each of the set of multiple mode vectors.

In some aspects, the control message component 855 may be configured as or otherwise support a means for receiving a control message including a codebook that indicates the set of multiple OAM vectors, where a size of the codebook is based on the greatest common divisor of the first quantity and the second quantity.

In some aspects, the first quantity of antenna subarrays of the first circular antenna array includes a set of first antenna groups and the second quantity of antenna subarrays of the second circular antenna array includes a set of second antenna groups, the set of second antenna groups and the set of first antenna groups both including a quantity of antenna groups that is equal to the greatest common divisor of the first quantity and the second quantity, and the reference signal component 845 may be configured as or otherwise support a means for receiving, via each first antenna group of the set of first antenna groups, a respective set of one or more reference signals from a respective second antenna group of the set of second antenna groups.

In some aspects, receiving each of the respective sets of one or more reference signals is based on a respective subset of OAM vectors of the set of multiple OAM vectors. In some aspects, a quantity of OAM vectors in each respective subset of OAM vectors is equal to the greatest common divisor of the first quantity and the second quantity.

In some aspects, the channel response component 860 may be configured as or otherwise support a means for determining a set of multiple channel response values based on receiving the sets of reference signals via the first circular antenna array. In some aspects, the channel response component 860 may be configured as or otherwise support a means for determining a set of multiple matrices based on the set of multiple channel response values, where each matrix of the set of multiple matrices includes one or more channel response values associated with a respective pair of antenna groups including a first antenna group of the quantity of first antenna groups and a second antenna group of the quantity of second antenna groups. In some aspects, the DFT component 865 may be configured as or otherwise support a means for concatenating DFTs of each matrix of the set of multiple matrices. In some aspects, the feedback component 850 may be configured as or otherwise support a means for causing transmission of a feedback message that indicates a DFT matrix based on concatenating the DFTs.

Figure 9:
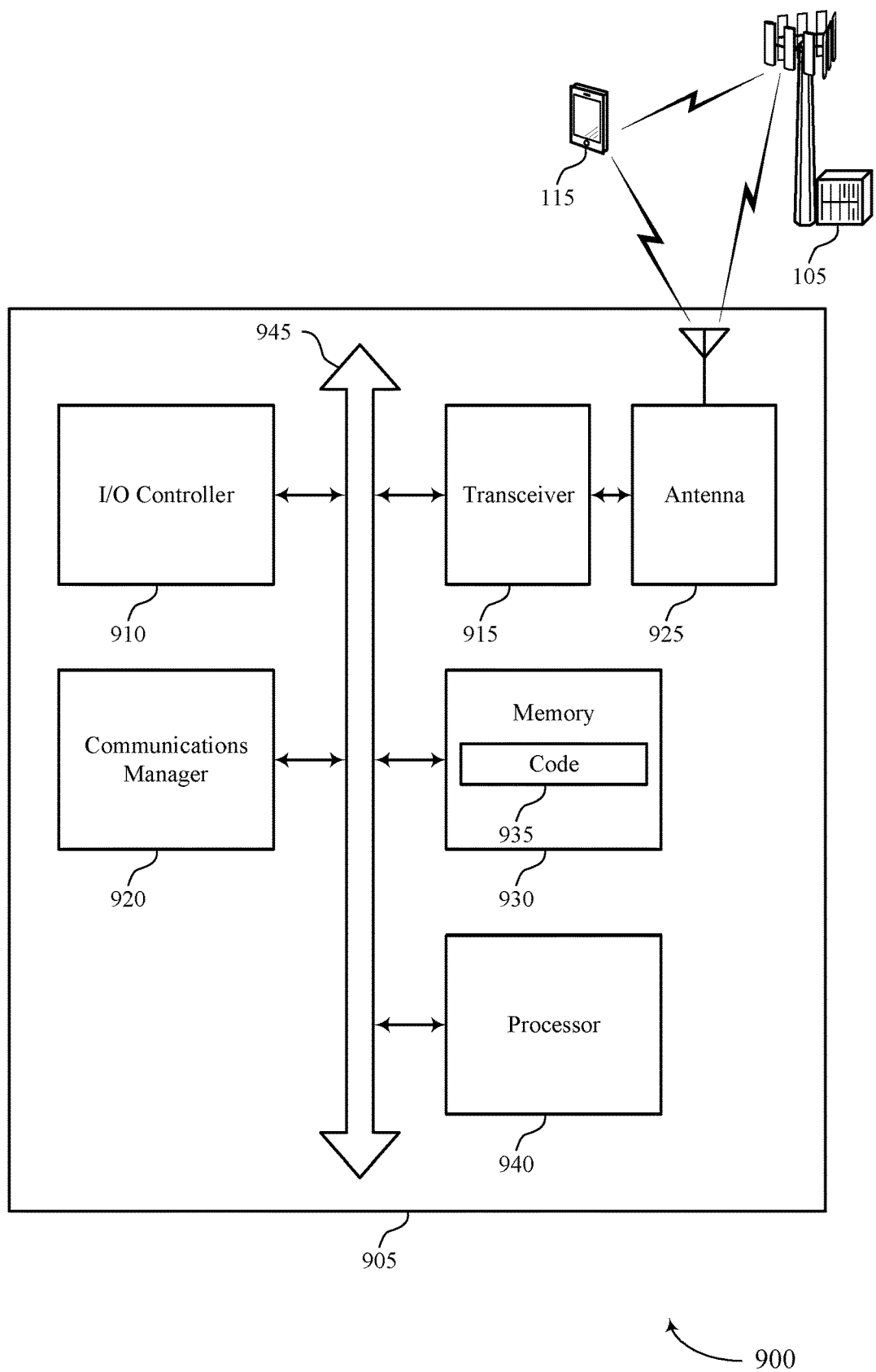
FIG. 9 shows a diagram of a system including a UE that supports OAM multiplexing based on a common factor between quantities of transmit and receive antenna subarrays in accordance with one or more aspects of the present disclosure.

FIG. 9 shows a diagram of a system 900 including a device 905 that supports OAM multiplexing based on a common factor between quantities of transmit and receive antenna subarrays in accordance with one or more aspects of the present disclosure. The device 905 may be an example of or include the components of a device 605, a device 705, a network node, or a UE 115 as described herein. The device 905 may communicate (e.g., wirelessly) with one or more network entities 105, one or more UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally, or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting OAM multiplexing based on a common factor between quantities of transmit and receive antenna subarrays). For example, the device 905 or a component of the device 905 may include a processor 940 and memory 930 coupled with or to the processor 940, the processor 940 and memory 930 configured to perform various functions described herein.

The communications manager 920 may support wireless communication at a first network node in accordance with examples as disclosed herein. For example, the communications manager 920 may be configured as or otherwise support a means for generating one or more signals for transmission from the first network node via a first circular antenna array including a first quantity of antenna subarrays, where each antenna subarray of the first circular antenna array includes one or more antenna elements. The communications manager 920 may be configured as or otherwise support a means for causing transmission of the one or more signals via the first circular antenna array, where transmission of each signal of the one or more signals is based on a respective OAM vector of a set of multiple OAM vectors, where the set of multiple OAM vectors is based on a numerical relationship between the first quantity of antenna subarrays of the first circular antenna array and the second quantity of antenna subarrays of a second circular antenna array, and where each antenna subarray of the second circular antenna array includes one or more antenna elements. In some aspects, the numerical relationship may include the first quantity being equal to a product of the second quantity and a non-integer rational number and the first quantity and the second quantity having a greatest common divisor that is an integer that is greater than one.

Additionally, or alternatively, the communications manager 920 may support wireless communication at a first network node in accordance with examples as disclosed herein. For example, the communications manager 920 may be configured as or otherwise support a means for receiving one or more signals via a first circular antenna array including a first quantity of antenna subarrays, where each antenna subarray of the first circular antenna array includes one or more antenna elements. The communications manager 920 may be configured as or otherwise support a means for decoding each of the one or more signals received via the first circular antenna array based on a respective OAM vector of a set of multiple OAM vectors, where the set of multiple OAM vectors is based on a numerical relationship between the first quantity of antenna subarrays of the first circular antenna array and a second quantity of antenna subarrays of the second circular antenna array, and where each antenna subarray of the second circular antenna array includes one or more antenna elements. In some aspects, the numerical relationship may include the first quantity being equal to a product of the second quantity and a non-integer rational number and the first quantity and the second quantity having a greatest common divisor that is an integer that is greater than one.

By including or configuring the communications manager 920 in accordance with examples as described herein, the device 905 may support techniques for improved communication reliability, reduced latency, improved user experience related to reduced processing, reduced power consumption, more efficient utilization of communication resources, and improved coordination between devices, among other advantages.

In some aspects, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of OAM multiplexing based on a common factor between quantities of transmit and receive antenna subarrays as described herein, or the processor 940 and the memory 930 may be otherwise configured to perform or support such operations.

Figure 10:
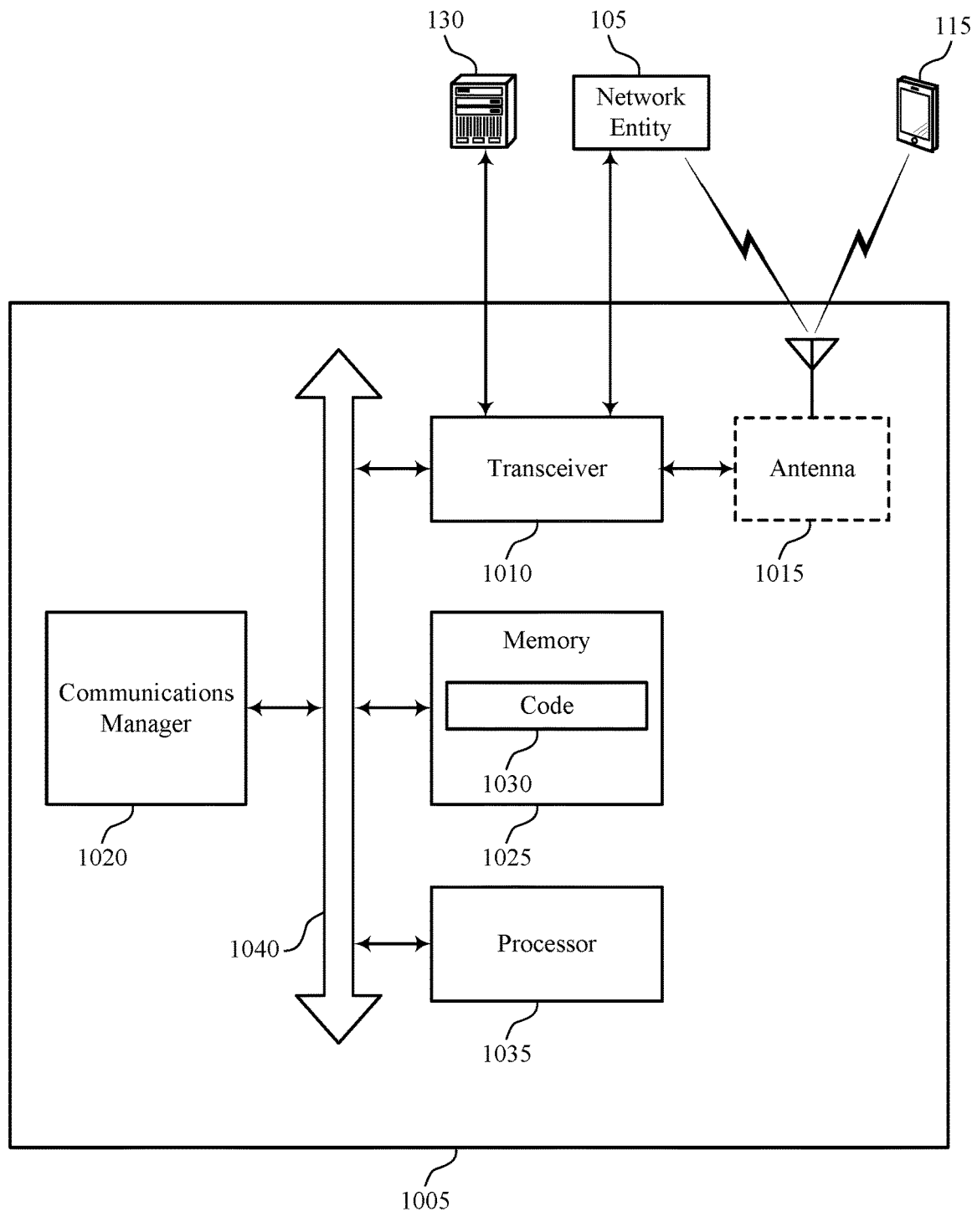
FIG. 10 shows a diagram of a system including a network entity that supports OAM multiplexing based on a common factor between quantities of transmit and receive antenna subarrays in accordance with one or more aspects of the present disclosure.

FIG. 10 shows a diagram of a system 1000 including a device 1005 that supports OAM multiplexing based on a common factor between quantities of transmit and receive antenna subarrays in accordance with one or more aspects of the present disclosure. The device 1005 may be an example of or include the components of a device 605, a device 705, a network node, or a network entity 105 as described herein. The device 1005 may communicate with one or more network entities 105, one or more UEs 115, or any combination thereof, which may include communications over one or more wired interfaces, over one or more wireless interfaces, or any combination thereof. The device 1005 may include components that support outputting and obtaining communications, such as a communications manager 1020, a transceiver 1010, an antenna 1015, a memory 1025, code 1030, and a processor 1035. These components may be in electronic communication or otherwise coupled (e.g., operatively, communicatively, functionally, electronically, electrically) via one or more buses (e.g., a bus 1040).

The transceiver 1010 may support bi-directional communications via wired links, wireless links, or both as described herein. In some aspects, the transceiver 1010 may include a wired transceiver and may communicate bi-directionally with another wired transceiver. Additionally, or alternatively, in some examples, the transceiver 1010 may include a wireless transceiver and may communicate bi-directionally with another wireless transceiver. In some aspects, the device 1005 may include one or more antennas 1015, which may be capable of transmitting or receiving wireless transmissions (e.g., concurrently). The transceiver 1010 may also include a modem to modulate signals, to provide the modulated signals for transmission (e.g., by one or more antennas 1015, by a wired transmitter), to receive modulated signals (e.g., from one or more antennas 1015, from a wired receiver), and to demodulate signals. In some implementations, the transceiver 1010 may include one or more interfaces, such as one or more interfaces coupled with the one or more antennas 1015 that are configured to support various receiving or obtaining operations, or one or more interfaces coupled with the one or more antennas 1015 that are configured to support various transmitting or outputting operations, or a combination thereof. In some implementations, the transceiver 1010 may include or be configured for coupling with one or more processors or memory components that are operable to perform or support operations based on received or obtained information or signals, or to generate information or other signals for transmission or other outputting, or any combination thereof. In some implementations, the transceiver 1010, or the transceiver 1010 and the one or more antennas 1015, or the transceiver 1010 and the one or more antennas 1015 and one or more processors or memory components (for example, the processor 1035, or the memory 1025, or both), may be included in a chip or chip assembly that is installed in the device 1005. In some aspects, the transceiver may be operable to support communications via one or more communications links (e.g., a communication link 125, a backhaul communication link 120, a midhaul communication link 162, a fronthaul communication link 168).

The memory 1025 may include RAM and ROM. The memory 1025 may store computer-readable, computer-executable code 1030 including instructions that, when executed by the processor 1035, cause the device 1005 to perform various functions described herein. The code 1030 may be stored in a non-transitory computer-readable medium such as system memory or another type of memory. In some cases, the code 1030 may not be directly executable by the processor 1035 but may cause a computer (e.g., when compiled and executed) to perform functions described herein. In some cases, the memory 1025 may contain, among other things, a BIOS which may control basic hardware or software operation such as the interaction with peripheral components or devices.

The processor 1035 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1035 may be configured to operate a memory array using a memory controller. In some other cases, a memory controller may be integrated into the processor 1035. The processor 1035 may be configured to execute computer-readable instructions stored in a memory (e.g., the memory 1025) to cause the device 1005 to perform various functions (e.g., functions or tasks supporting OAM multiplexing based on a common factor between quantities of transmit and receive antenna subarrays). For example, the device 1005 or a component of the device 1005 may include a processor 1035 and memory 1025 coupled with the processor 1035, the processor 1035 and memory 1025 configured to perform various functions described herein. The processor 1035 may be an example of a cloud-computing platform (e.g., one or more physical nodes and supporting software such as operating systems, virtual machines, or container instances) that may host the functions (e.g., by executing code 1030) to perform the functions of the device 1005. The processor 1035 may be any one or more suitable processors capable of executing scripts or instructions of one or more software programs stored in the device 1005 (such as within the memory 1025). In some implementations, the processor 1035 may be a component of a processing system. A processing system may generally refer to a system or series of machines or components that receives inputs and processes the inputs to produce a set of outputs (which may be passed to other systems or components of, for example, the device 1005). For example, a processing system of the device 1005 may refer to a system including the various other components or subcomponents of the device 1005, such as the processor 1035, or the transceiver 1010, or the communications manager 1020, or other components or combinations of components of the device 1005. The processing system of the device 1005 may interface with other components of the device 1005, and may process information received from other components (such as inputs or signals) or output information to other components. For example, a chip or modem of the device 1005 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1005 may transmit information output from the chip or modem. Additionally, or alternatively, in some implementations, the one or more interfaces may refer to an interface between the processing system of the chip or modem and a receiver, such that the device 1005 may obtain information or signal inputs, and the information may be passed to the processing system. A person having ordinary skill in the art will readily recognize that a first interface also may obtain information or signal inputs, and a second interface also may output information or signal outputs.

In some aspects, a bus 1040 may support communications of (e.g., within) a protocol layer of a protocol stack. In some aspects, a bus 1040 may support communications associated with a logical channel of a protocol stack (e.g., between protocol layers of a protocol stack), which may include communications performed within a component of the device 1005, or between different components of the device 1005 that may be co-located or located in different locations (e.g., where the device 1005 may refer to a system in which one or more of the communications manager 1020, the transceiver 1010, the memory 1025, the code 1030, and the processor 1035 may be located in one of the different components or divided between different components).

In some aspects, the communications manager 1020 may manage aspects of communications with a core network 130 (e.g., via one or more wired or wireless backhaul links). For example, the communications manager 1020 may manage the transfer of data communications for client devices, such as one or more UEs 115. In some aspects, the communications manager 1020 may manage communications with other network entities 105, and may include a controller or scheduler for controlling communications with UEs 115 in cooperation with other network entities 105. In some aspects, the communications manager 1020 may support an X2 interface within an LTE/LTE-A wireless communications network technology to provide communication between network entities 105.

The communications manager 1020 may support wireless communication at a first network node in accordance with examples as disclosed herein. For example, the communications manager 1020 may be configured as or otherwise support a means for generating one or more signals for transmission from the first network node via a first circular antenna array including a first quantity of antenna subarrays, where each antenna subarray of the first circular antenna array includes one or more antenna elements. The communications manager 1020 may be configured as or otherwise support a means for causing transmission of the one or more signals via the first circular antenna array, where transmission of each signal of the one or more signals is based on a respective OAM vector of a set of multiple OAM vectors, where the set of multiple OAM vectors is based on a numerical relationship between the first quantity of antenna subarrays of the first circular antenna array and the second quantity of antenna subarrays of the second circular antenna array, and where the each antenna subarray of the second circular antenna array includes one or more antenna elements. In some aspects, the numerical relationship may include the first quantity being equal to a product of the second quantity and a non-integer rational number and the first quantity and the second quantity having a greatest common divisor that is an integer that is greater than one.

Additionally, or alternatively, the communications manager 1020 may support wireless communication at a first network node in accordance with examples as disclosed herein. For example, the communications manager 1020 may be configured as or otherwise support a means for receiving one or more signals via a first circular antenna array including a first quantity of antenna subarrays, where each antenna subarray of the first circular antenna array includes one or more antenna elements. The communications manager 1020 may be configured as or otherwise support a means for decoding each of the one or more signals received via the first circular antenna array based on a respective OAM vector of a set of multiple OAM vectors, where the set of multiple OAM vectors is based on a numerical relationship between the first quantity of antenna subarrays of the first circular antenna array and a second quantity of antenna subarrays of a second circular antenna array, and where each antenna subarray of the second circular antenna array includes one or more antenna elements. In some examples the numerical relationship may include the first quantity being equal to a product of the second quantity and a non-integer rational number and the first quantity and the second quantity having a greatest common divisor that is an integer that is greater than one.

By including or configuring the communications manager 1020 in accordance with examples as described herein, the device 1005 may support techniques for improved communication reliability, reduced latency, improved user experience related to reduced processing, reduced power consumption, more efficient utilization of communication resources, and improved coordination between devices, among other advantages.

In some aspects, the communications manager 1020 may be configured to perform various operations (e.g., receiving, obtaining, monitoring, outputting, transmitting) using or otherwise in cooperation with the transceiver 1010, the one or more antennas 1015 (e.g., where applicable), or any combination thereof. Although the communications manager 1020 is illustrated as a separate component, in some examples, one or more functions described with reference to the communications manager 1020 may be supported by or performed by the transceiver 1010, the processor 1035, the memory 1025, the code 1030, or any combination thereof. For example, the code 1030 may include instructions executable by the processor 1035 to cause the device 1005 to perform various aspects of OAM multiplexing based on a common factor between quantities of transmit and receive antenna subarrays as described herein, or the processor 1035 and the memory 1025 may be otherwise configured to perform or support such operations.

Figure 11:
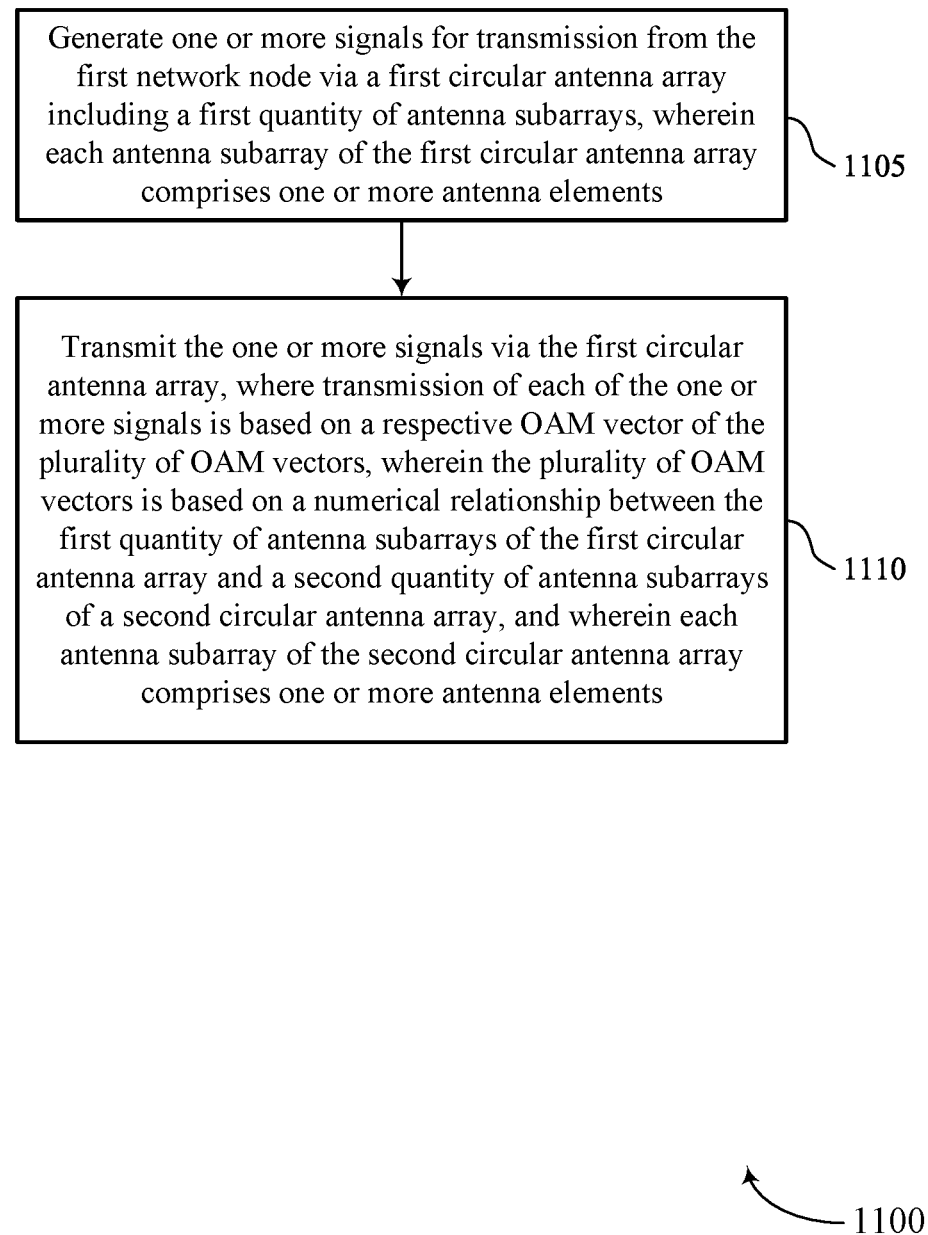
FIGS. 11 through 15 show flowcharts illustrating methods that support OAM multiplexing based on a common factor between quantities of transmit and receive antenna subarrays in accordance with one or more aspects of the present disclosure.

FIG. 11 shows a flowchart illustrating a method 1100 that supports OAM multiplexing based on a common factor between quantities of transmit and receive antenna subarrays in accordance with one or more aspects of the present disclosure. The operations of the method 1100 may be implemented by first network node, such as a UE or a network entity, or its components as described herein. For example, the operations of the method 1100 may be performed by a network node as described with reference to FIGS. 1 through 10. In some aspects, a network node may execute a set of instructions to control the functional elements of the network node to perform the described functions. Additionally, or alternatively, the network node may perform aspects of the described functions using special-purpose hardware.

At 1105, the method may include generating one or more signals for transmission from the first network node via a first circular antenna array including a first quantity of antenna subarrays, where each antenna subarray of the first circular antenna array includes one or more antenna elements. The operations of 1105 may be performed in accordance with examples as disclosed herein. In some aspects, aspects of the operations of 1105 may be performed by a OAM signal generation component 825 as described with reference to FIG. 8.

At 1110, the method may include transmitting the one or more signals via the first circular antenna array, where transmission of each signal of the one or more signals is based on a respective OAM vector of a set of multiple OAM vectors, where the set of multiple OAM vectors is based on a numerical relationship between the first quantity of antenna subarrays of the first circular antenna array and a second quantity of antenna subarrays of a second circular antenna array, and where each antenna subarray of the second circular antenna array includes one or more antenna elements. In some aspects, the numerical relationship may include the first quantity being equal to a product of the second quantity and a non-integer rational number and a greatest common divisor of the first quantity and the second quantity being an integer that is greater than one. The operations of 1110 may be performed in accordance with examples as disclosed herein. In some aspects, aspects of the operations of 1110 may be performed by a OAM component 830 as described with reference to FIG. 8.

Figure 12:
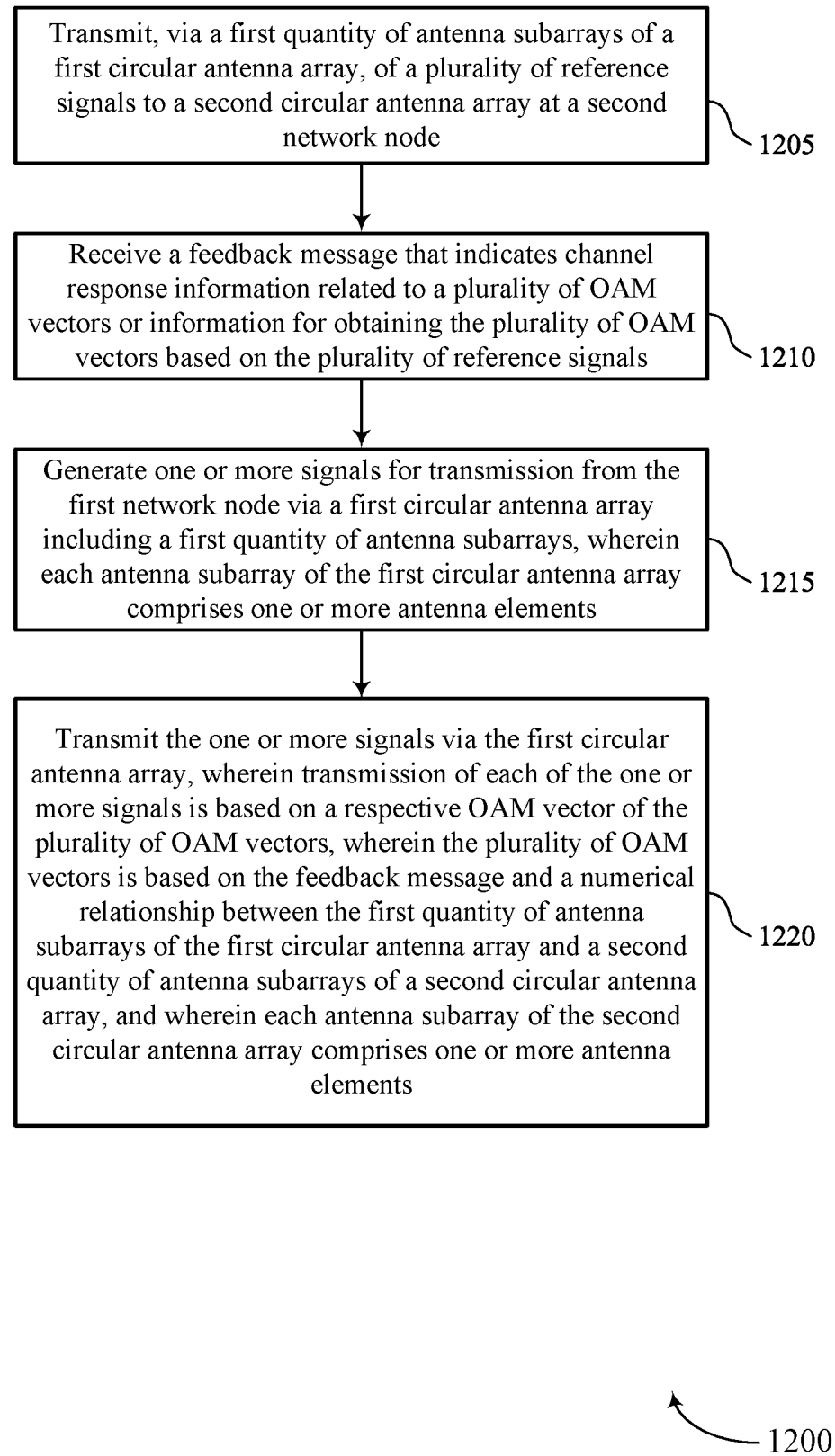

FIG. 12 shows a flowchart illustrating a method 1200 that supports OAM multiplexing based on a common factor between quantities of transmit and receive antenna subarrays in accordance with one or more aspects of the present disclosure. The operations of the method 1200 may be implemented by first network node, such as a UE or a network entity, or its components as described herein. For example, the operations of the method 1200 may be performed by a network node as described with reference to FIGS. 1 through 10. In some aspects, a network node may execute a set of instructions to control the functional elements of the network node to perform the described functions. Additionally, or alternatively, the network node may perform aspects of the described functions using special-purpose hardware.

At 1205, the method may include transmitting, via a first quantity of antenna subarrays of a first circular antenna array of the first network node, a set of multiple reference signals to a second circular antenna array at a second network node. The operations of 1205 may be performed in accordance with examples as disclosed herein. In some aspects, aspects of the operations of 1205 may be performed by a reference signal component 845 as described with reference to FIG. 8.

At 1210, the method may include receiving a feedback message that indicates channel response information related to a set of multiple OAM vectors or information for obtaining the set of multiple OAM vectors based on the set of multiple reference signals. The operations of 1210 may be performed in accordance with examples as disclosed herein. In some aspects, aspects of the operations of 1210 may be performed by a feedback component 850 as described with reference to FIG. 8.

At 1215, the method may include generating one or more signals for transmission from the first network node via a first circular antenna array including a first quantity of antenna subarrays, where each antenna subarray of the first circular antenna array includes one or more antenna elements. The operations of 1215 may be performed in accordance with examples as disclosed herein. In some aspects, aspects of the operations of 1215 may be performed by a OAM signal generation component 825 as described with reference to FIG. 8.

At 1220, the method may include transmitting the one or more signals via the first circular antenna array, where transmission of each signal of the one or more signals is based on a respective OAM vector of a set of multiple OAM vectors, where the set of multiple OAM vectors is based on a numerical relationship between the first quantity of antenna subarrays of the first circular antenna array and a second quantity of antenna subarrays of a second circular antenna array, and where each antenna subarray of the second circular antenna array includes one or more antenna elements. In some aspects, the numerical relationship may include the first quantity being equal to a product of the second quantity and a non-integer rational number and a greatest common divisor of the first quantity and the second quantity being an integer that is greater than one. The operations of 1220 may be performed in accordance with examples as disclosed herein. In some aspects, aspects of the operations of 1220 may be performed by a OAM component 830 as described with reference to FIG. 8.

Figure 13:
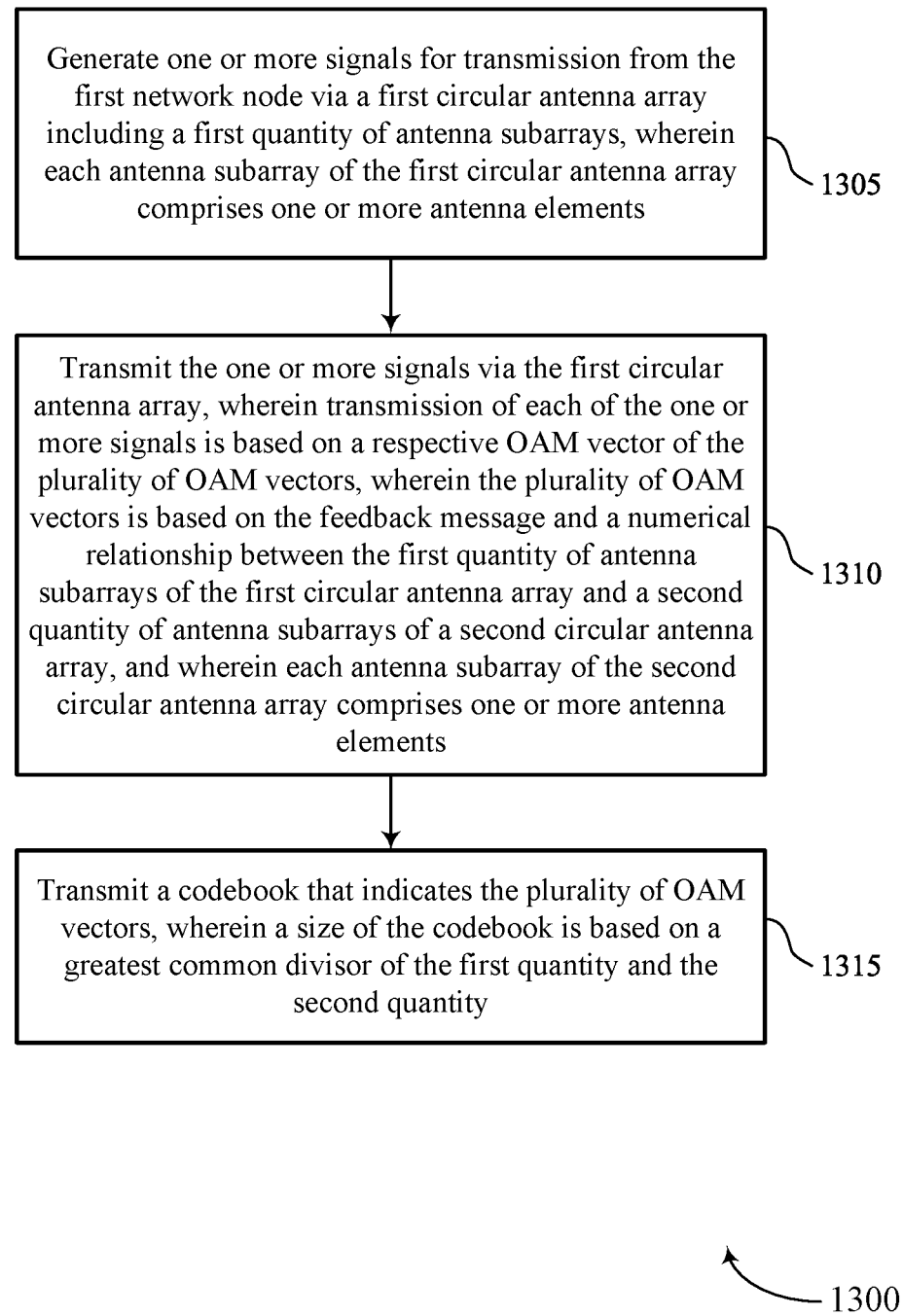

FIG. 13 shows a flowchart illustrating a method 1300 that supports OAM multiplexing based on a common factor between quantities of transmit and receive antenna subarrays in accordance with one or more aspects of the present disclosure. The operations of the method 1300 may be implemented by a network node, such as a UE or a network entity, or its components as described herein. For example, the operations of the method 1300 may be performed by a network node as described with reference to FIGS. 1 through 10. In some aspects, a network node may execute a set of instructions to control the functional elements of the network node to perform the described functions. Additionally, or alternatively, the network node may perform aspects of the described functions using special-purpose hardware.

At 1305, the method may include generating one or more signals for transmission from the first network node via a first circular antenna array including a first quantity of antenna subarrays, where each antenna subarray of the first circular antenna array includes one or more antenna elements. The operations of 1305 may be performed in accordance with examples as disclosed herein. In some aspects, aspects of the operations of 1305 may be performed by a OAM signal generation component 825 as described with reference to FIG. 8.

At 1310, the method may include transmitting the one or more signals via the first circular antenna array, where transmission of each signal of the one or more signals is based on a respective OAM vector of a set of multiple OAM vectors, where the set of multiple OAM vectors is based on a numerical relationship between the first quantity of antenna subarrays of the first circular antenna array and the second quantity of antenna subarrays of the second circular antenna array, and where each antenna subarray of the second circular antenna array includes one or more antenna elements. In some aspects, the numerical relationship may include the first quantity being equal to a product of the second quantity and a non-integer rational number and a greatest common divisor of the first quantity and the second quantity being an integer that is greater than one. The operations of 1310 may be performed in accordance with examples as disclosed herein. In some aspects, aspects of the operations of 1310 may be performed by a OAM component 830 as described with reference to FIG. 8.

At 1315, the method may include transmitting a codebook that indicates the set of multiple OAM vectors, where a size of the codebook is based on the greatest common divisor of the first quantity and the second quantity. The operations of 1315 may be performed in accordance with examples as disclosed herein. In some aspects, aspects of the operations of 1315 may be performed by a control message component 855 as described with reference to FIG. 8.

Figure 14:
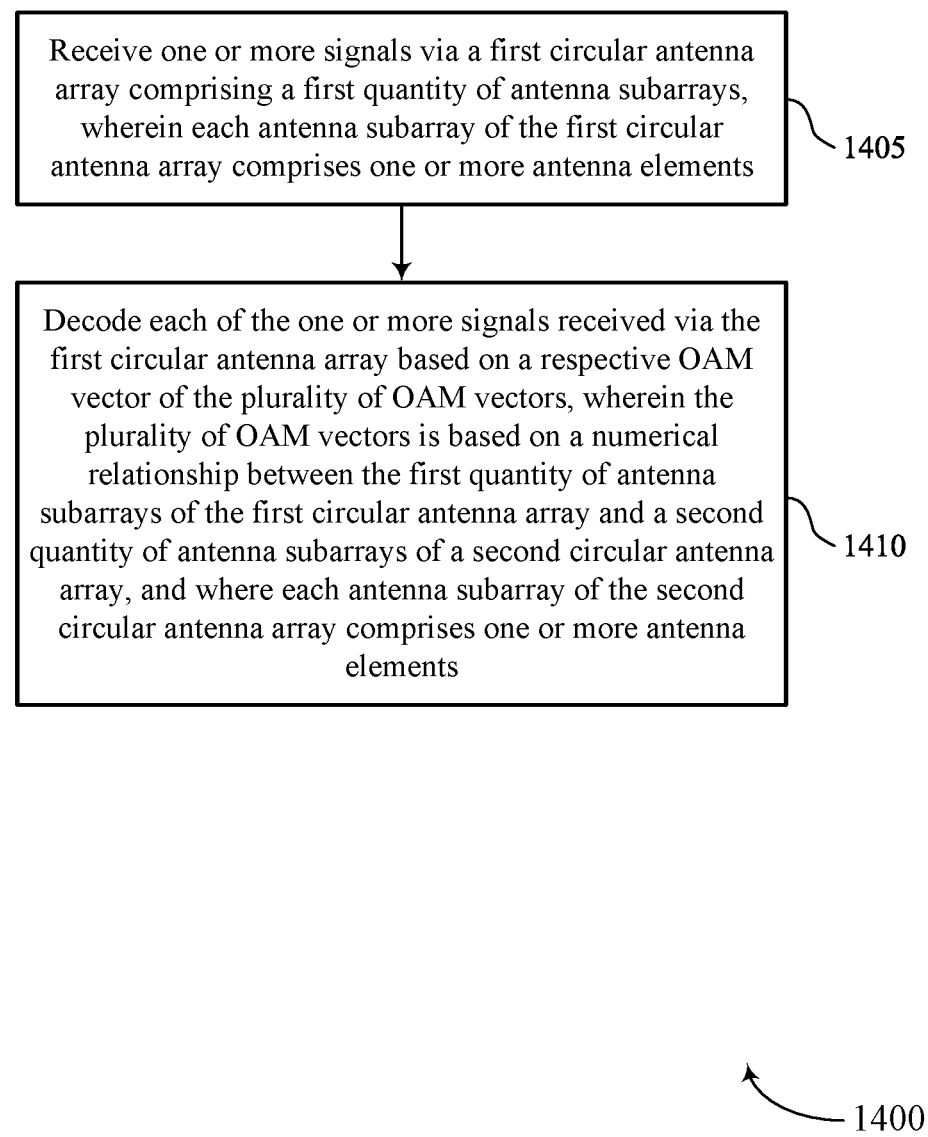

FIG. 14 shows a flowchart illustrating a method 1400 that supports OAM multiplexing based on a common factor between quantities of transmit and receive antenna subarrays in accordance with one or more aspects of the present disclosure. The operations of the method 1400 may be implemented by a network node, such as a UE or a network entity, or its components as described herein. For example, the operations of the method 1300 may be performed by a network node as described with reference to FIGS. 1 through 10. In some aspects, a network node may execute a set of instructions to control the functional elements of the network node to perform the described functions. Additionally, or alternatively, the network node may perform aspects of the described functions using special-purpose hardware.

At 1405, the method may include receiving one or more signals via a first circular antenna array including a first quantity of antenna subarrays, where each antenna subarray of the first circular antenna array includes one or more antenna elements. The operations of 1405 may be performed in accordance with examples as disclosed herein. In some aspects, aspects of the operations of 1405 may be performed by an OAM signal reception component 835 as described with reference to FIG. 8.

At 1410, the method may include decoding each of the one or more signals received via the first circular antenna array based on a respective OAM vector of the set of multiple OAM vectors, where the set of multiple OAM vectors is based on a numerical relationship between the first quantity of antenna subarrays of the first circular antenna array and a second quantity of antenna subarrays of a second circular antenna array, and where each antenna subarray of the second circular antenna array includes one or more antenna elements. In some aspects, the numerical relationship may include the first quantity being equal to a product of the second quantity and a non-integer rational number and a greatest common divisor of the first quantity and the second quantity being an integer that is greater than one. The operations of 1410 may be performed in accordance with examples as disclosed herein. In some aspects, aspects of the operations of 1410 may be performed by a decoding component 840 as described with reference to FIG. 8.

Figure 15:
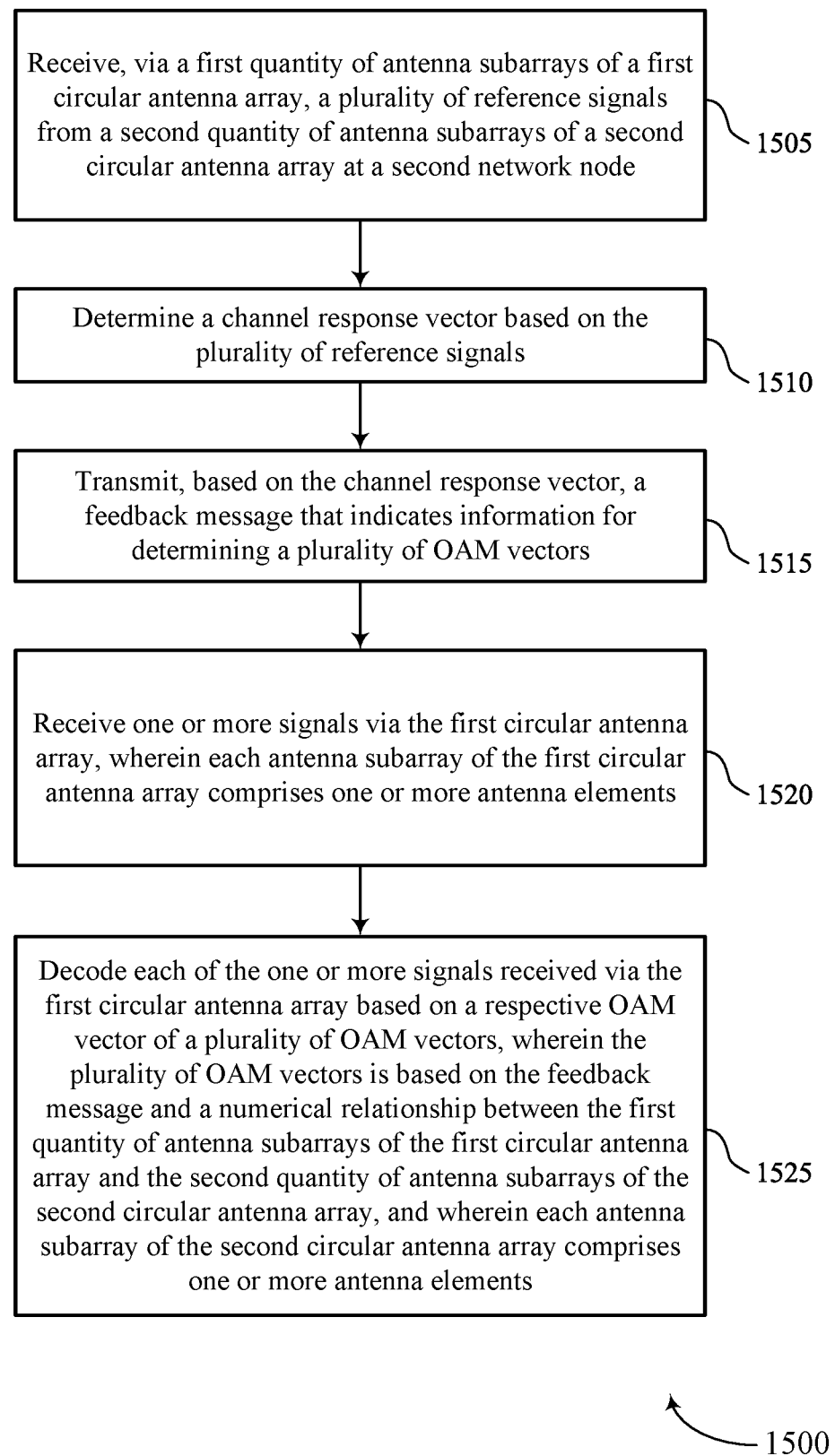

FIG. 15 shows a flowchart illustrating a method 1500 that supports OAM multiplexing based on a common factor between quantities of transmit and receive antenna subarrays in accordance with one or more aspects of the present disclosure. The operations of the method 1500 may be implemented by a network node, such as a UE or a network entity, or its components as described herein. For example, the operations of the method 1300 may be performed by a network node as described with reference to FIGS. 1 through 10. In some aspects, a network node may execute a set of instructions to control the functional elements of the network node to perform the described functions. Additionally, or alternatively, the network node may perform aspects of the described functions using special-purpose hardware.

At 1505, the method may include receiving, via a first quantity of antenna subarrays of a first circular antenna array of the first network node, a set of multiple reference signals from a second quantity of antenna subarrays of a second circular antenna array at a second network node. The operations of 1505 may be performed in accordance with examples as disclosed herein. In some aspects, aspects of the operations of 1505 may be performed by a reference signal component 845 as described with reference to FIG. 8.

At 1510, the method may include determining a channel response vector based on the set of multiple reference signals. The operations of 1510 may be performed in accordance with examples as disclosed herein. In some aspects, aspects of the operations of 1510 may be performed by a channel response component 860 as described with reference to FIG. 8.

At 1515, the method may include transmitting, based on the channel response vector, a feedback message that indicates information for determining a set of multiple OAM vectors. The operations of 1515 may be performed in accordance with examples as disclosed herein. In some aspects, aspects of the operations of 1515 may be performed by a feedback component 850 as described with reference to FIG. 8.

At 1520, the method may include receiving one or more signals via the first circular antenna array, where each antenna subarray of the first circular antenna array includes one or more antenna elements. The operations of 1520 may be performed in accordance with examples as disclosed herein. In some aspects, aspects of the operations of 1520 may be performed by an OAM signal reception component 835 as described with reference to FIG. 8.

At 1525, the method may include decoding each of the one or more signals received via the first circular antenna array based on a respective OAM vector of a set of multiple OAM vectors, where the set of multiple OAM vectors is based on the feedback message and a numerical relationship between the first quantity of antenna subarrays of the first circular antenna array and the second quantity of antenna subarrays of the second circular antenna array, and where each antenna subarray of the second circular antenna array includes one or more antenna elements. In some aspects, the numerical relationship may include the first quantity being equal to a product of the second quantity and a non-integer rational number and a greatest common divisor of the first quantity and the second quantity being an integer that is greater than one. The operations of 1525 may be performed in accordance with examples as disclosed herein. In some aspects, aspects of the operations of 1525 may be performed by a decoding component 840 as described with reference to FIG. 8.

The following provides an overview of aspects of the present disclosure:

Aspect 1: A method for wireless communication at a first network node, comprising: generating one or more signals for transmission from the first network node via a first circular antenna array, the first circular antenna array comprising a first quantity of antenna subarrays, wherein each antenna subarray of the first circular antenna array comprises one or more antenna elements; and transmitting the one or more signals via the first circular antenna array, wherein each signal of the one or more signals is based on a respective OAM vector of a plurality of OAM vectors, wherein the plurality of OAM vectors is based on a numerical relationship between the first quantity of antenna subarrays of the first circular antenna array and a second quantity of antenna subarrays of a second circular antenna array, wherein each antenna subarray of the second circular antenna array comprises one or more antenna elements, and wherein the numerical relationship comprises the first quantity being equal to a product of the second quantity and a non-integer rational number; and the first quantity and the second quantity having a greatest common divisor that is an integer that is greater than one.

Aspect 2: The method of aspect 1, further comprising: transmitting, via the first quantity of antenna subarrays, of a plurality of reference signals to the second circular antenna array at a second network node; and receiving a feedback message that indicates a channel response vector based on the plurality of reference signals, wherein a quantity of elements in the channel response vector is equal to a least common multiple of the first quantity of antenna subarrays of the first circular antenna array and the second quantity of antenna subarrays of the second circular antenna array.

Aspect 3: The method of aspect 2, further comprising: determining, based on the channel response vector, an upsampled matrix, the upsampled matrix having at least two identical entries based on the greatest common divisor of the first quantity and the second quantity being the integer greater than one; transmitting information based on a DFT matrix, wherein the DFT matrix is associated with the plurality of OAM vectors, wherein the DFT matrix is based on the upsampled matrix, and wherein the DFT matrix comprises a quantity of null entries based on the upsampled matrix having at least two identical entries.

Aspect 4: The method of aspect 1, further comprising: transmitting, via the first quantity of antenna subarrays, a plurality of reference signals to the second circular antenna array at a second network node; and receiving a feedback message that indicates channel response information related to the plurality of OAM vectors or information for obtaining the plurality of OAM vectors based on the plurality of reference signals.

Aspect 5: The method of aspect 4, wherein the feedback message indicates a DFT matrix comprising a quantity of DFT values, the quantity of DFT values equal to a least common multiple of the first quantity of antenna subarrays of the first circular antenna array and the second quantity of antenna subarrays of the second circular antenna array, and the plurality of OAM vectors is based on the quantity of DFT values.

Aspect 6: The method of aspect 5, further comprising: determining a quantity of submatrices of the DFT matrix, the quantity equal to the greatest common divisor of the first quantity and the second quantity; and determining an SVD of each submatrix of the quantity of submatrices, wherein the plurality of OAM vectors is based on a combination of the SVDs of the quantity of submatrices.

Aspect 7: The method of any of aspects 1 through 6, further comprising: transmitting a codebook that indicates the plurality of OAM vectors, wherein a size of the codebook is based on the greatest common divisor of the first quantity and the second quantity.

Aspect 8: The method of aspect 1, wherein the first quantity of antenna subarrays of the first circular antenna array comprises a set of first antenna groups and the second quantity of antenna subarrays of the second circular antenna array comprises a set of second antenna groups, the set of second antenna groups and the set of first antenna groups both comprising a quantity of antenna groups that is equal to the greatest common divisor of the first quantity and the second quantity, and wherein the method further comprises: transmitting, via each first antenna group of the set of first antenna groups, a respective set of one or more reference signals to a respective second antenna group of the set of second antenna groups.

Aspect 9: The method of aspect 8, wherein transmitting each of the respective sets of one or more reference signals is based on a respective subset of OAM vectors of the plurality of OAM vectors; and a quantity of OAM vectors in each respective subset of OAM vectors is equal to the greatest common devisor of the first quantity and the second quantity.

Aspect 10: The method of any of aspects 8 through 9, further comprising: receiving, via the first circular antenna array and based on the sets of reference signals, a feedback message that indicates a DFT matrix associated with the plurality of OAM vectors, wherein a quantity of entries in the DFT matrix is less than a product of the first quantity of antenna subarrays of the first circular antenna array and the second quantity of antenna subarrays of the second circular antenna array based on the greatest common divisor of the first quantity and the second quantity being the integer greater than one.

Aspect 11: The method of any of aspects 8 through 10, further comprising: transmitting each respective set of reference signals at a different time than each other respective set of reference signals.

Aspect 12: The method of any of aspects 8 through 10, further comprising: transmitting each respective set of reference signals concurrently and based on a respective subset of OAM vectors of the plurality of OAM vectors.

Aspect 13: A method for wireless communication at a first network node, comprising: receiving one or more signals via a first circular antenna array comprising a first quantity of antenna subarrays, wherein each antenna subarray of the first circular antenna array comprises one or more antenna elements; and decoding each of the one or more signals received via the first circular antenna array based on a respective OAM vector of the plurality of OAM vectors, wherein the plurality of OAM vectors is based on a numerical relationship between the first quantity of antenna subarrays of the first circular antenna array and a second quantity of antenna subarrays of a second circular antenna array, wherein each antenna subarray of the second circular antenna array comprises one or more antenna elements, and wherein the numerical relationship comprises: the first quantity being equal to a product of the second quantity and a non-integer rational number; and the first quantity and the second quantity having a greatest common divisor that is an integer that is greater than one.

Aspect 14: The method of aspect 13, further comprising: receiving, via the first quantity of antenna subarrays, a plurality of reference signals from the second quantity of antenna subarrays of the second circular antenna array at a second network node; determining a channel response vector based on the plurality of reference signals; and transmitting, based on the channel response vector, a feedback message that indicates information for determining the plurality of OAM vectors.

Aspect 15: The method of aspect 14, wherein determining the channel response vector further comprises: determining a plurality of channel response values based on receiving the plurality of reference signals via the first circular antenna array, wherein each channel response value of the plurality of channel response values is associated with a respective pair of antenna subarrays comprising a first antenna subarray of the first quantity of antenna subarrays and a second antenna subarray of the second quantity of antenna subarrays; and grouping the plurality of channel response values into a quantity of groups, wherein each group of the quantity of groups corresponds to a respective element in the channel response vector, wherein the quantity of groups is equal to a least common multiple of the first quantity of antenna subarrays of the first circular antenna array and the second quantity of antenna subarrays of the second circular antenna array, and wherein the feedback message indicates the channel response vector.

Aspect 16: The method of any of aspects 14 through 15, further comprising: determining, based on the channel response vector, an upsampled matrix, the upsampled matrix having at least two identical entries based on the greatest common divisor of the first quantity and the second quantity being the integer greater than one; and determining a DFT matrix based on the upsampled matrix, wherein the DFT matrix comprises a quantity of null entries based on the at least two entries in the upsampled matrix being identical.

Aspect 17: The method of aspect 16, wherein the feedback message indicates the DFT matrix, the DFT matrix comprising a quantity of DFT values that is equal to a least common multiple of the first quantity of antenna subarrays of the first circular antenna array and the second quantity of antenna subarrays of the second circular antenna array; and the DFT matrix is associated with the plurality of OAM vectors.

Aspect 18: The method of aspect 16, further comprising: determining a quantity of submatrices of the DFT matrix, the quantity equal to the greatest common divisor of the first quantity and the second quantity; and determining a respective SVD for each submatrix of the quantity of submatrices, wherein the plurality of OAM vectors is based on a combination of the respective SVDs.

Aspect 19: The method of aspect 14, wherein the feedback message indicates the channel response vector, the method further comprising: receiving, based on the channel response vector indicated via the feedback message, a control message that indicates a DFT matrix comprising a quantity of DFT values, the quantity of DFT values equal to a least common multiple of the first quantity of antenna subarrays of the first circular antenna array and the second quantity of antenna subarrays of the second circular antenna array; and determining an inverse Fourier transform of the DFT matrix, wherein the plurality of OAM vectors is based on the inverse Fourier transform of the DFT matrix.

Aspect 20: The method of aspect 19, wherein the inverse Fourier transform of the DFT matrix corresponds to a plurality of mode vectors comprising a quantity of elements that is less than the first quantity of antenna subarrays in the first circular antenna array, the method further comprising: determining the plurality of OAM vectors based on upsampling the plurality of mode vectors to increase the quantity of elements in each of the plurality of mode vectors.

Aspect 21: The method of any of aspects 13 through 20, further comprising: receiving a codebook that indicates the plurality of OAM vectors, wherein a size of the codebook is based on the greatest common divisor of the first quantity and the second quantity.

Aspect 22: The method of aspect 13, wherein the first quantity of antenna subarrays of the first circular antenna array comprises a set of first antenna groups and the second quantity of antenna subarrays of the second circular antenna array comprises a set of second antenna groups, the set of second antenna groups and the set of first antenna groups both comprising a quantity of antenna groups that is equal to the greatest common divisor of the first quantity and the second quantity, the method further comprising: receiving, via each first antenna group of the set of first antenna groups, a respective set of one or more reference signals from a respective second antenna group of the set of second antenna groups.

Aspect 23: The method of aspect 22, wherein receiving each of the respective sets of one or more reference signals is based on a respective subset of OAM vectors of the plurality of OAM vectors; and a quantity of OAM vectors in each respective subset of OAM vectors is equal to the greatest common divisor of the first quantity and the second quantity.

Aspect 24: The method of any of aspects 22 through 23, further comprising: determining a plurality of channel response values based on receiving the sets of reference signals via the first circular antenna array; determining a plurality of matrices based on the plurality of channel response values, wherein each matrix of the plurality of matrices comprises one or more channel response values associated with a respective pair of antenna groups comprising a first antenna group of the quantity of first antenna groups and a second antenna group of the quantity of second antenna groups; concatenating DFTs of each matrix of the plurality of matrices; and transmitting a feedback message that indicates a DFT matrix based on concatenating the DFTs.

Aspect 25: A first network node for wireless communication, comprising a memory; a first circular antenna array comprising a first quantity of antenna subarrays, wherein each antenna subarray of the first circular antenna array comprises one or more antenna elements; and at least one processor coupled to the memory, wherein the at least one processor is configured to perform a method of any of aspects 1 through 12.

Aspect 26: An apparatus for wireless communication at a first network node, comprising at least one means for performing a method of any of aspects 1 through 12.

Aspect 27: A non-transitory computer-readable medium storing code for wireless communication at a first network node, the code comprising instructions executable by a processor to perform a method of any of aspects 1 through 12.

Aspect 28: A first network node for wireless communication, comprising a memory; a first circular antenna array comprising a first quantity of antenna subarrays, wherein each antenna subarray of the first circular antenna array comprises one or more antenna elements; and at least one processor coupled to the memory, wherein the at least one processor is configured to perform a method of any of aspects 13 through 24.

Aspect 29: An apparatus for wireless communication at a first network node, comprising at least one means for performing a method of any of aspects 13 through 24.

Aspect 30: A non-transitory computer-readable medium storing code for wireless communication at a first network node, the code comprising instructions executable by a processor to perform a method of any of aspects 13 through 24.

The methods described herein describe possible implementations, and the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, the term "or" is an inclusive "or" unless limiting language is used relative to the alternatives listed. For example, reference to "X being based on A or B" shall be construed as including within its scope X being based on A, X being based on B, and X being based on A and B. In this regard, reference to "X being based on A or B" refers to "at least one of A or B" or "one or more of A or B" due to "or" being inclusive. Similarly, reference to "X being based on A, B, or C" shall be construed as including within its scope X being based on A, X being based on B, X being based on C, X being based on A and B, X being based on A and C, X being based on B and C, and X being based on A, B, and C. In this regard, reference to "X being based on A, B, or C" refers to "at least one of A, B, or C" or "one or more of A, B, or C" due to "or" being inclusive. As an example of limiting language, reference to "X being based on only one of A or B" shall be construed as including within its scope X being based on A as well as X being based on B, but not X being based on A and B. Also, as used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently. Also, as used herein, the phrase "a set" shall be construed as including the possibility of a set with one member. That is, the phrase "a set" shall be construed in the same manner as "one or more" or "at least one of".

The term "determine" or "determining" encompasses a variety of actions and, therefore, "determining" can include calculating, generating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the drawings, describes example configurations and does not represent all the examples that may be implemented or that are within the scope of the claims. The term "aspect" or "example" used herein means "serving as an aspect, example, instance, or illustration," and not "preferred" or "advantageous over other aspects." The detailed description includes specific details for the purpose of providing an understanding of the described techniques. These techniques, however, may be practiced without these specific details. In some instances, structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A first network node for wireless communication, comprising:
   a memory;
   a first circular antenna array comprising a first quantity of antenna subarrays, wherein each antenna subarray of the first circular antenna array comprises one or more antenna elements; and
   at least one processor coupled to the memory, wherein the at least one processor is configured to:
      generate one or more signals for transmission from the first network node via the first circular antenna array; and
      cause transmission of the one or more signals via the first circular antenna array, wherein each signal of the one or more signals is based on a respective orbital angular momentum vector of a plurality of orbital angular momentum vectors, wherein the plurality of orbital angular momentum vectors is based on a numerical relationship between the first quantity of antenna subarrays of the first circular antenna array and a second quantity of antenna subarrays of a second circular antenna array, wherein each antenna subarray of the second circular antenna array comprises one or more antenna elements, and wherein the numerical relationship comprises:
         the first quantity being equal to a product of the second quantity and a non-integer rational number; and
         the first quantity and the second quantity having a greatest common divisor that is an integer that is greater than one.

2. The first network node of claim 1, wherein the at least one processor is further configured to:
   cause transmission, via the first quantity of antenna subarrays, of a plurality of reference signals to the second circular antenna array at a second network node; and
   receive a feedback message that indicates a channel response vector based on the plurality of reference signals, wherein a quantity of elements in the channel response vector is equal to a least common multiple of the first quantity of antenna subarrays of the first circular antenna array and the second quantity of antenna subarrays of the second circular antenna array.

3. The first network node of claim 2, wherein the at least one processor is further configured to:
   determine, based on the channel response vector, an upsampled matrix, the upsampled matrix having at least two identical entries based on the greatest common divisor of the first quantity and the second quantity being the integer greater than one; and
   cause transmission of information based on a discrete Fourier transform matrix, wherein the discrete Fourier transform matrix is associated with the plurality of orbital angular momentum vectors, wherein the discrete Fourier transform matrix is based on the upsampled matrix, and wherein the discrete Fourier transform matrix comprises a quantity of null entries based on the upsampled matrix having at least two identical entries.

4. The first network node of claim 1, wherein the at least one processor is further configured to:
   cause transmission, via the first quantity of antenna subarrays, of a plurality of reference signals to the second circular antenna array at a second network node; and
   receive a feedback message that indicates channel response information related to the plurality of orbital angular momentum vectors or information for obtaining the plurality of orbital angular momentum vectors based on the plurality of reference signals.

5. The first network node of claim 4, wherein:
   the feedback message indicates a discrete Fourier transform matrix comprising a quantity of discrete Fourier transform values, the quantity of discrete Fourier transform values equal to a least common multiple of the first quantity of antenna subarrays of the first circular antenna array and the second quantity of antenna subarrays of the second circular antenna array, and
   the plurality of orbital angular momentum vectors is based on the quantity of discrete Fourier transform values.

6. The first network node of claim 5, wherein the at least one processor is further configured to:
   determine a quantity of submatrices of the discrete Fourier transform matrix, the quantity equal to the greatest common divisor of the first quantity and the second quantity; and
   determine a singular value decomposition of each submatrix of the quantity of submatrices, wherein the plurality of orbital angular momentum vectors is based on a combination of the singular value decompositions of the quantity of submatrices.

7. The first network node of claim 1, wherein the at least one processor is further configured to:
   cause transmission of a codebook that indicates the plurality of orbital angular momentum vectors, wherein a size of the codebook is based on the greatest common divisor of the first quantity and the second quantity.

8. The first network node of claim 1, wherein the first quantity of antenna subarrays of the first circular antenna array comprises a set of first antenna groups and the second quantity of antenna subarrays of the second circular antenna array comprises a set of second antenna groups, the set of second antenna groups and the set of first antenna groups both comprising a quantity of antenna groups that is equal to the greatest common divisor of the first quantity and the second quantity, and wherein the at least one processor is further configured to:
   cause transmission, via each first antenna group of the set of first antenna groups, of a respective set of one or more reference signals to a respective second antenna group of the set of second antenna groups.

9. The first network node of claim 8, wherein:
   the at least one processor is configured to cause transmission of each of the respective sets of one or more reference signals based on a respective subset of orbital angular momentum vectors of the plurality of orbital angular momentum vectors; and a quantity of orbital angular momentum vectors in each respective subset of orbital angular momentum vectors is equal to the greatest common divisor of the first quantity and the second quantity.

10. The first network node of claim 8, wherein the at least one processor is configured to:

receive, via the first circular antenna array and based on the respective sets of one or more reference signals, a feedback message that indicates a discrete Fourier transform matrix associated with the plurality of orbital angular momentum vectors, wherein a quantity of entries in the discrete Fourier transform matrix is less than a product of the first quantity of antenna subarrays of the first circular antenna array and the second quantity of antenna subarrays of the second circular antenna array based on the greatest common divisor of the first quantity and the second quantity being the integer greater than one.

11. The first network node of claim 8, wherein the at least one processor is configured to:

cause transmission of each respective set of reference signals at a different time than each other respective set of reference signals.

12. The first network node of claim 8, wherein the at least one processor is configured to:

cause transmission of each respective set of reference signals concurrently and based on a respective subset of orbital angular momentum vectors of the plurality of orbital angular momentum vectors.

13. A first network node for wireless communication, comprising:

a memory;

a first circular antenna array comprising a first quantity of antenna subarrays, wherein each antenna subarray of the first circular antenna array comprises one or more antenna elements; and at least one processor coupled to the memory, wherein the at least one processor is configured to:

receive one or more signals via the first circular antenna array; and decode each of the one or more signals received via the first circular antenna array based on a respective orbital angular momentum vector of a plurality of orbital angular momentum vectors, wherein the plurality of orbital angular momentum vectors is based on a numerical relationship between the first quantity of antenna subarrays of the first circular antenna array and a second quantity of antenna subarrays of a second circular antenna array, wherein each antenna subarray of the second circular antenna array comprises one or more antenna elements, and wherein the numerical relationship comprises:

the first quantity being equal to a product of the second quantity and a non-integer rational number; and the first quantity and the second quantity having a greatest common divisor that is an integer that is greater than one.

14. The first network node of claim 13, wherein the at least one processor is further configured to:

receive, via the first quantity of antenna subarrays, a plurality of reference signals from the second quantity of antenna subarrays of the second circular antenna array at a second network node;

determine a channel response vector based on the plurality of reference signals; and cause transmission, based on the channel response vector, of a feedback message that indicates information for determining the plurality of orbital angular momentum vectors.

15. The first network node of claim 14, wherein, to determine the channel response vector, the at least one processor is configured to:

determine a plurality of channel response values based on receiving the plurality of reference signals via the first circular antenna array, wherein each channel response value of the plurality of channel response values is associated with a respective pair of antenna subarrays comprising a first antenna subarray of the first quantity of antenna subarrays and a second antenna subarray of the second quantity of antenna subarrays; and group the plurality of channel response values into a quantity of groups, wherein each group of the quantity of groups corresponds to a respective element in the channel response vector, wherein the quantity of groups is equal to a least common multiple of the first quantity of antenna subarrays of the first circular antenna array and the second quantity of antenna subarrays of the second circular antenna array, and wherein the feedback message indicates the channel response vector.

16. The first network node of claim 14, wherein the at least one processor is further configured to:

determine, based on the channel response vector, an upsampled matrix, the upsampled matrix having at least two identical entries based on the greatest common divisor of the first quantity and the second quantity being the integer greater than one; and determine a discrete Fourier transform matrix based on the upsampled matrix, wherein the discrete Fourier transform matrix comprises a quantity of null entries based on the upsampled matrix having at least two identical entries.

17. The first network node of claim 16, wherein:

the feedback message indicates the discrete Fourier transform matrix, the discrete Fourier transform matrix comprising a quantity of discrete Fourier transform values that is equal to a least common multiple of the first quantity of antenna subarrays of the first circular antenna array and the second quantity of antenna subarrays of the second circular antenna array; and the discrete Fourier transform matrix is associated with the plurality of orbital angular momentum vectors.

18. The first network node of claim 16, wherein the at least one processor is further configured to:

determine a quantity of submatrices of the discrete Fourier transform matrix, the quantity equal to the greatest common divisor of the first quantity and the second quantity; and determine a respective singular value decomposition for each submatrix of the quantity of submatrices, wherein the plurality of orbital angular momentum vectors is based on a combination of the respective singular value decompositions.

19. The first network node of claim 14, wherein the feedback message indicates the channel response vector, and wherein the at least one processor is further configured to:

receive, based on the channel response vector indicated via the feedback message, a control message that indicates a discrete Fourier transform matrix comprising a quantity of discrete Fourier transform values, the quantity of discrete Fourier transform values equal to a least common multiple of the first quantity of antenna subarrays of the first circular antenna array and the second quantity of antenna subarrays of the second circular antenna array; and
determine an inverse Fourier transform of the discrete Fourier transform matrix, wherein the plurality of orbital angular momentum vectors is based on the inverse Fourier transform of the discrete Fourier transform matrix.

20. The first network node of claim 19, wherein the inverse Fourier transform of the discrete Fourier transform matrix corresponds to a plurality of mode vectors comprising a quantity of elements that is less than the first quantity of antenna subarrays in the first circular antenna array, and wherein the at least one processor is further configured to:
determine the plurality of orbital angular momentum vectors based on upsampling the plurality of mode vectors to increase the quantity of elements in each of the plurality of mode vectors.

21. The first network node of claim 13, wherein the at least one processor is further configured to:
receive a codebook that indicates the plurality of orbital angular momentum vectors, wherein a size of the codebook is based on the greatest common divisor of the first quantity and the second quantity.

22. The first network node of claim 13, wherein the first quantity of antenna subarrays of the first circular antenna array comprises a set of first antenna groups and the second quantity of antenna subarrays of the second circular antenna array comprises a set of second antenna groups, the set of second antenna groups and the set of first antenna groups both comprising a quantity of antenna groups that is equal to the greatest common divisor of the first quantity and the second quantity, and wherein the at least one processor is further configured to:
receive, via each first antenna group of the set of first antenna groups, a respective set of one or more reference signals from a respective second antenna group of the set of second antenna groups.

23. The first network node of claim 22, wherein:
the at least one processor is configured to receive each of the respective sets of one or more reference signals based on a respective subset of orbital angular momentum vectors of the plurality of orbital angular momentum vectors; and
a quantity of orbital angular momentum vectors in each respective subset of orbital angular momentum vectors is equal to the greatest common divisor of the first quantity and the second quantity.

24. The first network node of claim 22, wherein the at least one processor is further configured to:
determine a plurality of channel response values based on receiving the respective sets of one or more reference signals via the first circular antenna array;
determine a plurality of matrices based on the plurality of channel response values, wherein each matrix of the plurality of matrices comprises one or more channel response values associated with a respective pair of antenna groups comprising a first antenna group of the quantity of first antenna groups and a second antenna group of the quantity of second antenna groups;
concatenate discrete Fourier transforms of each matrix of the plurality of matrices; and
cause transmission of a feedback message that indicates a discrete Fourier transform matrix based on concatenating the discrete Fourier transforms.

25. A method for wireless communication at a first network node, comprising:
generating one or more signals for transmission from the first network node via a first circular antenna array comprising a first quantity of antenna subarrays, wherein each antenna subarray of the first circular antenna array comprises one or more antenna elements; and
transmitting the one or more signals via the first circular antenna array, wherein each signal of the one or more signals is based on a respective orbital angular momentum vector of a plurality of orbital angular momentum vectors, wherein the plurality of orbital angular momentum vectors is based on a numerical relationship between the first quantity of antenna subarrays of the first circular antenna array and a second quantity of antenna subarrays of a second circular antenna array, wherein each antenna subarray of the second circular antenna array comprises one or more antenna elements, and wherein the numerical relationship comprises:
the first quantity being equal to a product of the second quantity and a non-integer rational number; and
the first quantity and the second quantity having a greatest common divisor that is an integer that is greater than one.

26. The method of claim 25, further comprising:
transmitting, using the first quantity of antenna subarrays, a plurality of reference signals to the second circular antenna array at a second network node; and
receiving a feedback message that indicates a channel response vector based on the plurality of reference signals, wherein a quantity of elements in the channel response vector is equal to a least common multiple of the first quantity of antenna subarrays of the first circular antenna array and the second quantity of antenna subarrays of the second circular antenna array.

27. The method of claim 25, further comprising:
transmitting, via the first quantity of antenna subarrays, a plurality of reference signals to the second circular antenna array at a second network node; and
receiving a feedback message that indicates channel response information related to the plurality of orbital angular momentum vectors or information for obtaining the plurality of orbital angular momentum vectors based on the plurality of reference signals.

28. A method for wireless communication at a first network node, comprising:
receiving one or more signals via a first circular antenna array comprising a first quantity of antenna subarrays, wherein each antenna subarray of the first circular antenna array comprises one or more antenna elements; and
decoding each of the one or more signals received via the first circular antenna array based on a respective orbital angular momentum vector of a plurality of orbital angular momentum vectors, wherein the plurality of orbital angular momentum vectors is based on a numerical relationship between the first quantity of antenna subarrays of the first circular antenna array and a second quantity of antenna subarrays of a second circular antenna array, wherein each antenna subarray of the second circular antenna array comprises one or more antenna elements, and wherein the numerical relationship comprises:
the first quantity being equal to a product of the second quantity and a non-integer rational number; and the first quantity and the second quantity having a greatest common divisor that is an integer that is greater than one.

29. The method of claim 28, further comprising:

receiving, via the first quantity of antenna subarrays, a plurality of reference signals from the second quantity of antenna subarrays of the second circular antenna array at a second network node;

determining a channel response vector based on the plurality of reference signals; and transmitting, based on the channel response vector, a feedback message that indicates information for determining the plurality of orbital angular momentum vectors.

30. The method of claim 29, wherein determining the channel response vector further comprises:

determining a plurality of channel response values based on receiving the plurality of reference signals via the first circular antenna array, wherein each channel response value of the plurality of channel response values is associated with a respective pair of antenna subarrays comprising a first antenna subarray of the first quantity of antenna subarrays and a second antenna subarray of the second quantity of antenna subarrays; and grouping the plurality of channel response values into a quantity of groups, wherein each group of the quantity of groups corresponds to a respective element in the channel response vector, wherein the quantity of groups is equal to a least common multiple of the first quantity of antenna subarrays of the first circular antenna array and the second quantity of antenna subarrays of the second circular antenna array, and wherein the feedback message indicates the channel response vector.

\* \* \* \* \*